United States Patent
Gao et al.

(10) Patent No.: US 11,477,494 B2
(45) Date of Patent: Oct. 18, 2022

(54) RELATION BETWEEN PARTITION CONSTRAINT ELEMENTS

(71) Applicant: Huawei Technologies Co., Ltd., Shenzhen (CN)

(72) Inventors: Han Gao, Munich (DE); Semih Esenlik, Munich (DE); Jianle Chen, Santa Clara, CA (US); Anand Meher Kotra, Munich (DE); Biao Wang, Shenzhen (CN); Zhijie Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/169,175

(22) Filed: Feb. 5, 2021

(65) Prior Publication Data

US 2021/0258618 A1    Aug. 19, 2021

Related U.S. Application Data

(63) Continuation of application No. PCT/CN2019/104260, filed on Sep. 3, 2019.

(Continued)

(51) Int. Cl.
*H04N 19/96*    (2014.01)
*H04N 19/119*   (2014.01)
(Continued)

(52) U.S. Cl.
CPC ........... *H04N 19/96* (2014.11); *H04N 19/119* (2014.11); *H04N 19/132* (2014.11); *H04N 19/176* (2014.11); *H04N 19/70* (2014.11)

(58) Field of Classification Search
CPC .... H04N 19/70; H04N 19/119; H04N 19/132; H04N 19/186; H04N 19/96; H04N 19/176
See application file for complete search history.

(56) References Cited

U.S. PATENT DOCUMENTS 10,609,414 B2 *   3/2020   Zhang ................... H04N 19/70
2014/0254661 A1   9/2014   Saxena et al.
(Continued)

FOREIGN PATENT DOCUMENTS

CN   103430545 A   12/2013
CN   107005718 A   8/2017
(Continued)

OTHER PUBLICATIONS

Gao et al., "Syntax and Semantics Changes of Relation Between QT/BT/TT Split Constraint Syntax Elements," JVET-L0217, Joint Video Experts Team (JVET) of ITU-T SG 16 WP 3 and ISO/IEC JTC 1/SC 29/WG11,12th Meeting: Macao, CN, total 5 pages (Oct. 3-12, 2018).

(Continued)

*Primary Examiner* — Neil R Mikeska
(74) *Attorney, Agent, or Firm* — Leydig, Voit & Mayer, Ltd.

(57) ABSTRACT

The present disclosure relates generally to video coding and picture partitioning methods. In particular, the disclosure is concerned with relations between partition constraint elements, by setting partitioning rules for different picture partitioning methods. The disclosure provides devices and corresponding methods for generating or processing a bitstream including encoded pictures, particularly for setting and including partition constraint element into the bitstream. One of the devices is configured to determine a minimum luma size of a leaf block resulting from quadtree splitting (MinQtSizeY), determine a maximum luma size of a coding block where partitioning using a binary tree splitting is allowed (MaxBtSizeY) based on the MinQtSizeY, and include information for the determined MinQtSizeY into the bitstream.

12 Claims, 28 Drawing Sheets

Related U.S. Application Data

(60) Provisional application No. 62/818,996, filed on Mar. 15, 2019, provisional application No. 62/733,053, filed on Sep. 18, 2018, provisional application No. 62/726,423, filed on Sep. 3, 2018.

(51) Int. Cl.
*H04N 19/132* (2014.01)
*H04N 19/176* (2014.01)
*H04N 19/70* (2014.01)

(56) References Cited

U.S. PATENT DOCUMENTS

| | | | |
|---|---|---|---|
| 2014/0286403 | A1 | 9/2014 | Nishitani et al. |
| 2020/0195924 | A1* | 6/2020 | Hsiang .......... H04N 19/176 |
| 2021/0037255 | A1* | 2/2021 | Choi .............. H04N 19/176 |
| 2021/0152830 | A1* | 5/2021 | Bossen ............ H04N 19/119 |
| 2021/0274175 | A1* | 9/2021 | Lim ................ H04N 19/96 |
| 2021/0314630 | A1* | 10/2021 | Misra ............. H04N 19/186 |

FOREIGN PATENT DOCUMENTS

| | | |
|---|---|---|
| CN | 107566848 A | 1/2018 |
| CN | 107836117 A | 3/2018 |
| JP | 2018085660 A | 5/2018 |
| WO | 2016090568 A1 | 6/2016 |
| WO | 2016091161 A1 | 6/2016 |
| WO | 2017123980 A1 | 7/2017 |
| WO | 2017157249 A1 | 9/2017 |
| WO | 2018001207 A1 | 1/2018 |
| WO | 2018038492 A1 | 3/2018 |
| WO | 2018064948 A1 | 4/2018 |

OTHER PUBLICATIONS

Gao et al., "Non-CE1: Relation Between QT/BT/TT Split Constraint Syntax Elements," JVET-L0217, Joint Video Experts Team (JVET) of ITU-T SG 16 WP 3 and ISO/IEC JTC 1/SC 29/WG11, 12th Meeting: Macao, CN, total 3 pages (Oct. 3-12, 2018).

Li et al., "Multi-Type-Tree," Joint Video Exploration Team (JVET) of ITU-T SG 16 WP 3 and ISO/IEC JTC 1/SC 29/WG 11,4th Meeting: Chengdu, CN, Document: JVET-D0117r1, pp. 1-3 (Oct. 15-21, 2016).

Wieckowski et al., "CE1-related: Joint proposal for picture boundary partitioning by Fraunhofer HHI and Huawei," Joint Video Experts Team (JVET) of ITU-T SG 16 WP 3 and ISO/IEC JTC 1/SC 29/WG 11, 11th Meeting: Ljubljana, SI, Document: JVET-K0554-v1, pp. 1-2 (Jul. 10-18, 2018).

Ma et al., "Description of Core Experiment: Partitioning," Joint Video Exploration Team (JVET) of ITU-T SG 16 WP 3 and ISO/IEC JTC 1/SC 29/WG 11, 10th Meeting: San Diego, US, Document: JVET-J1021-r5, pp. 1-32 (Apr. 10-20, 2018).

MA et al., "CE1: QTBTS partitioning and boundary handling (1.0.5, 1.0.6, 1.0.7, 1.0.8, 2.0.7)," Joint Video Experts Team (JVET) of ITU-T SG 16 WP 3 and ISO/IEC JTC 1/SC 29/WG 11, 11th Meeting: Ljubljana, SI, Document: JVET-K0280-v2, pp. 1-5 (Jul. 10-18, 2018).

Li et al., "CE1-2.0.9: Picture Boundary Handling," Joint Video Experts Team (JVET) of ITU-T SG 16 WP 3 and ISO/IEC JTC 1/SC 29/WG 11, 11th Meeting: Ljubljana, SI, Document: JVET-K0376-v1, pp. 1-4 (Jul. 10-18, 2018).

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Document: JVET-K1001-v4, Total 85 pages (Jul. 10-18, 2018).

Korean Patent Application No. 10-2018-0074318, as filed on Jun. 27, 2018.

English language machine translation of Korean Patent Application No. 10-2018-0074318, as filed on Jun. 27, 2018.

Chen et al., "Algorithm description for Versatile Video Coding and Test Model 1 (VTM 1)," Joint Video Experts Team (JVET) of ITU-T SG 16 WP 3 and ISO/IEC JTC 1/SC 29/WG 11, 10th Meeting: San Diego, US, Document: JVET-J1002-v2, Total 13 pages (Apr. 10-20, 2018).

J. An et al., "Block partitioning structure for next generation video coding," COM 16—C 966 R3—E, Telecommunication Standardization Sector, Study Period 2013-2016, pp. 1-8, International Telecommunication Union (Sep. 2015).

"Line Transmission of Non-Telephone Signals, Video Codec for Audiovisual Services AT p x 64 kbits," ITU-T Recommendation H.261, ITU-T Telecommunication Standardization Sector of ITU, Total 29 pages, International Telecommunication Union, Geneva, Switzerland (Mar. 1993).

"Series H: Audiovisual and Multimedia Systems, Infrastructure of audiovisual services—Coding of moving Video, Advanced video coding for generic audiovisual services," Recommendation ITU-T H.264, ITU-T Telecommunication Standardization Sector of ITU, Total 812 pages, International Telecommunication Union, Geneva, Switzerland (Apr. 2017).

"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, Total 692 pages, International Telecommunication Union, Geneva, Switzerland (Feb. 2018).

Bossen et al., "HM Software Manual," Joint Collaborative Team on Video Coding (JCT-VC) of ITU-T SG16 WP3 and SC/IEC JTC1/SC29/WG11, Document: JCTVC-Software Manual, pp. 1-31 (Nov. 2016).

RU/2021106768/07, Office Action, dated Jun. 22, 2022.

* cited by examiner

| | Descriptor |
|---|---|
| seq_parameter_set_rbsp() { | |
| sps_seq_parameter_set_id | ue(v) |
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| ~~max_mtt_hierarchy_depth_inter_slices~~ | |
| diff_max_mtt_hierarchy_depth_log2_min_qt_size_inter_slices | ue(v) |
| ~~max_mtt_hierarchy_depth_intra_slices~~ | |
| diff_max_mtt_hierarchy_depth_log2_min_qt_size_intra_slices | |
| sps_cclm_enabled_flag | ue(1) |
| sps_mts_intra_enabled_flag | ue(1) |
| sps_mts_inter_enabled_flag | ue(1) |
| rbsp_trailing_bits() | |
| } | |

200

201 — diff_max_mtt_hierarchy_depth_log2_min_qt_size_inter_slices
202 — diff_max_mtt_hierarchy_depth_log2_min_qt_size_intra_slices

FIG. 2

| slice_header( ) { | Descriptor |
|---|---|
| slice_pic_parameter_set_id | ue(v) |
| slice_address | u(v) |
| slice_type | ue(v) |
| if( slice_type != I ) | |
| ~~log2_diff_ctu_max_bt_size~~ | ue(v) |
| log2_diff_max_bt_size_min_qt_size | |
| dep_quant_enabled_flag | u(1) |
| if( !dep_quant_enabled_flag ) | |
| sign_data_hiding_enabled_flag | u(1) |
| byte_alignment( ) | |
| } | |

FIG. 3

| seq_parameter_set_rbsp() { | Descriptor |
|---|---|
| sps_seq_parameter_set_id | ue(v) |
| chroma_format_idc | ue(v) |
| if( chroma_format_idc = = 3 ) | |
| separate_colour_plane_flag | u(1) |
| ~~pic_width_in_luma_samples~~ | ue(v) |
| ~~pic_height_in_luma_samples~~ | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| log2_diff_pic_width_min_Qt_intra_slices | ue(v) |
| log2_diff_pic_height_min_Qt_intra_slices | ue(v) |
| log2_diff_pic_width_min_Qt_inter_slices | ue(v) |
| log2_diff_pic_height_min_Qt_inter_slices | ue(v) |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits() | |
| } | |

| slice_header( ) { | Descriptor |
|---|---|
| slice_pic_parameter_set_id | ue(v) |
| slice_address | u(v) |
| slice_type | ue(v) |
| if( slice_type != I && max_mtt_hierarchy_depth_inter_slices !=0) | |
| log2_diff_ctu_max_bt_size | ue(v) |
| dep_quant_enabled_flag | u(1) |
| if(!dep_quant_enabled_flag ) | |
| sign_data_hiding_enabled_flag | u(1) |
| byte_alignment( ) | |
| } | |

FIG. 5

| | Descriptor |
|---|---|
| slice_header( ) { | |
|   slice_pic_parameter_set_id | ue(v) |
|   slice_address | u(v) |
|   slice_type | ue(v) |
|   if ( slice_type != I ) { | |
|     log2_diff_ctu_max_bt_size | ue(v) |
|     log2_diff_ctu_max_tt_size | ue(v) |
|   } | |
|   if (log2_diff_ctu_max_bt_size!=0 \|\| log2_diff_ctu_max_tt_size!=0) | |
|     max_mtt_hierarchy_depth | ue(v) |
|   dep_quant_enabled_flag | u(1) |
|   if( !dep_quant_enabled_flag ) | |
|     sign_data_hiding_enabled_flag | u(1) |
|   byte_alignment( ) | |
| } | |

FIG. 6

| seq_parameter_set_rbsp( ) { | Descriptor |
|---|---|
| sps_seq_parameter_set_id | ue(v) |
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits( ) | |
| } | |

FIG. 8

| slice_header( ) { | Descriptor |
|---|---|
| slice_pic_parameter_set_id | ue(v) |
| slice_address | u(v) |
| slice_type | ue(v) |
| if( slice_type != I ) | |
| log2_diff_ctu_max_bt_size | ue(v) |
| dep_quant_enabled_flag | u(1) |
| if( !dep_quant_enabled_flag ) | |
| sign_data_hiding_enabled_flag | u(1) |
| byte_alignment( ) | |
| } | |

FIG. 9

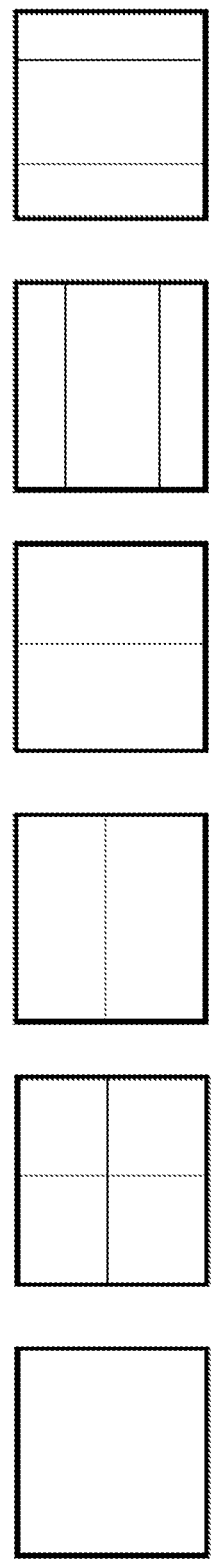

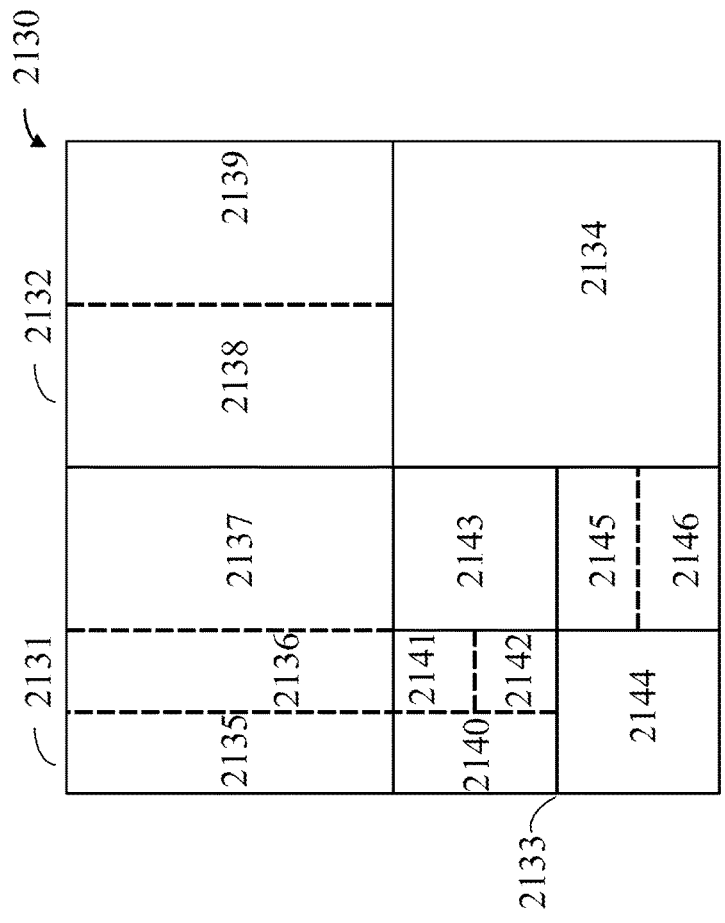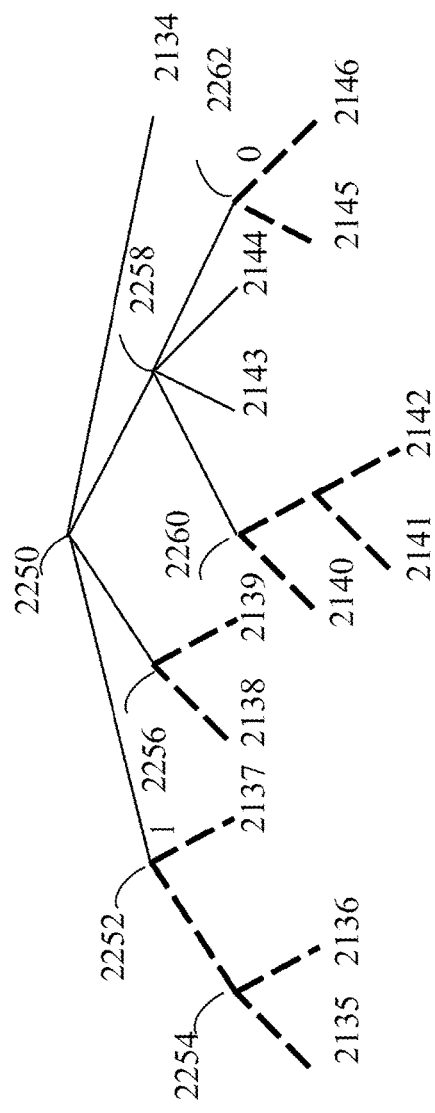
FIG. 21
FIG. 22

RELATION BETWEEN PARTITION CONSTRAINT ELEMENTS

CROSS-REFERENCE TO RELATED APPLICATIONS

This application is a continuation of International Patent Application No. PCT/CN2019/104260, filed on Sep. 3, 2019. The International Application claims priority to U.S. Provisional Application No. 62/733,053, filed on Sep. 18, 2018, U.S. Provisional Application No. 62/726,423, filed on Sep. 3, 2018, and U.S. Provisional Application No. 62/818, 996, filed on Mar. 15, 2019. All of the afore-mentioned parent applications are hereby incorporated by reference in their entireties.

TECHNICAL FIELD

The present disclosure relates generally to video coding, decoding and picture partitioning methods.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that increase the compression ratio with little to no sacrifice in image quality are desirable.

Conventionally, there exist a multitude of partition constraint elements, each element constraining the partitioning of pictures (like of a video) with respect to different types of partitioning methods. These different types of partitioning methods include particularly binary tree partitioning, quadtree partitioning, and ternary tree partitioning. The partition constraint elements are typically signalled included in the bitstream including the encoded pictures. In the following, some important partition constraint elements are described.

A minimum coding block size (MinCbSizeY) may be defined. As an example, the MinCbSizeY can be equal to 8, which means that a parent block that has a size 8×8 cannot be split using any of the partitioning (splitting) methods, since the resulting child block is guaranteed to be smaller than the MinCbSizeY (in either width or height). According to a second example, if the MinCbSizeY is equal to 8, a parent block that has a size 8×16 cannot be partitioned using e.g. quadtree splitting (partitioning), since the resulting four child blocks would have a size of 4×8 (width equal to 4 and height equal to 8), and the width of the resulting child blocks would be smaller than the MinCbSizeY. In the second example it was assumed that the MinCbSizeY applies to both width and height of the block, although two different syntax elements can be used to independently to limit the width and height.

A maximum coding tree block size (CtbSizeY) may indicate the size of a maximum coding block in terms of a number of luma samples.

A maximum binary tree size (MaxBtSizeY) may be defined as the maximum luma size (width or height), in terms of a number of samples, of a coding block that can be split using a binary partitioning method. As an example, if the MaxBtSizeY is equal to 64, a coding block that is bigger in size, either in width or height, cannot be split using binary splitting. This means that a block that has a size 128×128 cannot be split using binary splitting, whereas a block that has a size 64×64 can be split using binary splitting.

A minimum binary tree size (MinBtSizeY) may be defined as the minimum luma size (width or height), in terms of a number of samples, of a coding block that can be split using a binary partitioning method. As an example, if the MinBtSizeY is equal to 16, a coding block that is smaller or equal in size, either in width or height, cannot be split using binary splitting. This means that a block that has a size 8×8 cannot be split using binary splitting, whereas a block that has a size 32×32 can be split using binary splitting.

A minimum quadtree size (MinQtSizeY) may be defined as the minimum luma size of a leaf block resulting from quadtree splitting of a Coding Tree Unit (CTU). The size can indicate either the width or height of the block in number of samples. It might also indicate the width and the height together in the case of square blocks. As an example, if the MinQtSizeY is equal to 16, a coding block that has a size smaller than or equal to 16 cannot be partitioned into child blocks using the quadtree splitting method. Conventionally, MinQtSizeY (and its signalled syntax elements 'log2_min_qt_size_intra_slices_minus2' and 'log2 min_qt_size_inter_slices_minus2' are used to indicate the minimum quadtree block size. Notably, the syntax element of the size can be an indirect syntax element, meaning that log2_min_qt_size_intra_slices_minus2 might be the binary logarithm (base 2) of the number of luma samples of the minimum quadtree block.

A minimum transform block size (MinTbSizeY) may be defined as the minimum transform block size, in terms of a number of samples, of a coding block that can be split using a ternary partitioning method. As an example, if the MinTbSizeY is equal to 16, a coding block that is smaller or equal in size either in width or height cannot be split using ternary splitting. This means that a block that has a size 8×8 cannot be split using ternary splitting, whereas a block that has a size 32×32 can be split using ternary splitting.

A maximum multi-type tree depth (MaxMttDepth) may be defined as the maximum hierarchy depth for coding units resulting from multi-type tree splitting of a quadtree leaf or a CTU. A CTU or Coding Tree Block (CTB) describes the maximum block size that is used to partition a picture frame. The MaxMttDepth describes the upper limit for the number of consecutive binary or ternary splitting that can be applied to obtain a child block. As an example, assuming that a CTU size is 128×128 (width equal to 128 and height equal to 128), and that MaxMttDepth is equal to 1, each parent block (128×128 in size) can first be split into two 128×64 child blocks using binary splitting. However, the child blocks cannot apply any consecutive binary splitting (to result in either 128×32 or 64×64 child blocks), since the maximum number of allowed binary splitting is reached. It is noted that MaxMttDepth can control a maximum binary splitting depth or a maximum ternary splitting depth, or both at the same time. If it controls both binary and ternary splitting depths at the same time, one binary split followed by one ternary split can be counted as two hierarchical splits. Conventionally, the MaxMttDepth (and its syntax elements 'max_mtt_hierarchy_depth_inter_slices' and 'max_mtt_hierarchy_depth_intra_slices') is used to indicate the maximum hierarchy depth for coding units resulting from multi-type tree.

Further, 'pic_width_in_luma_samples' is a syntax element specifying a picture size element, namely the width of each decoded picture in units of luma samples. Pic_width_in_luma_samples shall conventionally not be equal to 0, and shall be an integer multiple of the MinCbSizeY.

Likewise, 'pic_height_in_luma_samples' is a syntax element specifying a picture size element, namely the height of each decoded picture in units of luma samples. Pic_height_in_luma_samples shall conventionally not be equal to 0, and shall be an integer multiple of MinCbSizeY.

One of the aims in video coding is to provide possibly high quality with possibly low rate. One of the contributing factors which may contribute to this aim is increasing efficiency of the bitstream structure.

SUMMARY

In view of the above-mentioned problem, embodiments of the disclosure aim to improve the current implementation of picture partitioning. In particular, an objective is to increase the availability and flexibility of the different picture partition methods, i.e. binary tree, quadtree, and ternary tree partitioning methods. A goal is to allow the encoding and decoding of more picture sizes.

Embodiments of the disclosure are provided in the enclosed independent claims. Advantageous implementations of the disclosure are further defined in the dependent claims.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

In the embodiments of the disclosure, new partitioning rules are established, particularly by setting relations between partition constraint elements, and signaling them in a bitstream together with encoded pictures. These may be used for encoding video data into a bitstream and decoding the bitstream into the decoded video data.

According to a first aspect the disclosure relates to a device for decoding or processing a bitstream including encoded pictures. The device includes a circuitry configured to obtain, from the bitstream 101, a syntax element; obtain information for a minimum size in luma samples of a luma leaf block resulting from quadtree splitting (e.g., MinQtSizeY 105); determine a maximum size in luma samples of a luma root block can be split using a binary tree splitting (e.g., MaxBtSizeY 102) based on the information for the minimum size in luma samples of the luma leaf block resulting from quadtree splitting and the obtained syntax element.

By defining new partitioning rules through setting relations between these partition constraint elements, the decoding device facilitates an increase in availability and flexibility of the different picture partition methods, particularly quadtree and binary tree splitting.

In a possible implementation form of the method according to the first aspect, the circuitry is configured to determine the MaxBtSizeY considering that its lower limit is the MinQtSizeY.

In a possible implementation form of the method according to the first aspect or the above-mentioned implementation, the syntax element is an syntax element 301 of a difference between the base 2 logarithm of the MinQtSizeY 105 and the base 2 logarithm of the MaxBtSizeY 102.

Thus, the relevant partition constraint elements can be easily inferred, e.g., at the decoder side, while at the same time reducing information overhead in the bitstream. A difference is an example of a relation. However, the relation can also be a proportionality factor, calculation scheme, or the like, which allows inferring the MaxBtSizeY from the MinQtSizeY.

In a possible implementation form of the method according to the first aspect or the above-mentioned implementation, the syntax element is an syntax element 301 of a difference between the MinQtSizeY 105 and the MaxBtSizeY 102, the syntax element of the difference may be, i.e., log2_diff_max_bt_size_min_qt_size, signaling said difference in logarithmic scale with base 2. Such difference syntax element provides for a compact way to signal the difference between the MinQtSizeY and the MaxBtSizeY.

In a possible implementation form of the method according to the first aspect or the above-mentioned implementation, the circuitry is configured to obtain the syntax element from the bitstream dependent on a maximum hierarchy depth for coding units resulting from multi-type tree splitting of a quadtree leaf block (e.g., MaxMttDepth). Thus, the relevant partition constraint elements can be inferred, e.g., at the decoder side, with at the same time reduced information overhead in the bitstream.

In addition or alternatively, the circuitry may be configured not to obtain any syntax element of the MaxBtSizeY from the bitstream, if the MaxMttDepth equals zero.

In addition or alternatively, the circuitry may be configured not to obtain the syntax element from the bitstream 101, if the MaxMttDepth 103 is not equal to zero.

According to a second aspect the disclosure, a device is described for generating or processing a bitstream including encoded pictures, the device being configured to: determine a minimum luma size of a leaf block resulting from quadtree splitting (e.g., MinQtSizeY), determine a maximum luma size of a coding block to be split using a binary tree splitting (e.g., MaxBtSizeY) based on the minimum luma size of the leaf block resulting from quadtree splitting, and include information for the determined minimum luma size of the leaf block resulting from quadtree splitting into the bitstream.

This method enables an efficient encoder implementation in which the generated stream has a compact syntax and enabled decoder to infer the constraint parameters efficiently. The advantages mentioned above for the decoder side also apply for the encoder side, at which the bitstream is generated.

In a possible implementation form of the method according to the second aspect or the above-mentioned implementation, the device (e.g., processing circuitry) is configured to determine the MaxBtSizeY considering that a lower limit of the MaxBtSizeY is the MinQtSizeY.

In a possible implementation form of the method according to the second aspect or the above-mentioned implementation, the device for generating or processing a bitstream may be further configured to include a syntax element of a difference between the base 2 logarithm of the MinQtSizeY

105 and the base 2 logarithm of the MaxBtSizeY 102 into the bitstream 101 into the bitstream.

In a possible implementation form of the method according to the second aspect or the above-mentioned implementation, the syntax element is a syntax element 301 of a difference between the MinQtSizeY 105 and the MaxBtSizeY 102, where the syntax element of the difference is signaling said difference in logarithmic scale with base 2.

In a possible implementation form of the method according to the second aspect or the above-mentioned implementation, the device is configured to include a syntax element of a MaxBtSizeY, dependent on a maximum hierarchy depth for coding units resulting from multi-type tree splitting (e.g., MaxMttDepth), into the bitstream.

In addition or alternatively, the device is configured to not include any syntax element of the MaxBtSizeY into the bitstream, if the MaxMttDepth equals zero. In addition or alternatively, the device is configured to include any syntax element of the MaxBtSizeY into the bitstream, if the MaxMttDepth is not equal to zero.

According to a third aspect the disclosure relates to a method provided for generating or processing a bitstream (including encoded pictures), the method including the steps of determining a minimum luma size of a leaf block resulting from quadtree splitting (e.g., MinQtSizeY), determining a maximum luma size of a coding block to be split using a binary tree splitting (e.g., MaxBtSizeY) based on the minimum luma size of the leaf block resulting from quadtree splitting, and including information for the determined minimum luma size of the leaf block resulting from quadtree splitting into the bitstream.

According to a fourth aspect the disclosure relates to a method provided for decoding or processing a bitstream including encoded pictures, the method including the steps of: obtaining, from the bitstream 101, a syntax element; obtaining information for a minimum size in luma samples of a luma leaf block resulting from quadtree splitting (e.g., MinQtSizeY 105); determining a maximum size in luma samples of a luma root block to be split using a binary tree splitting (e.g., MaxBtSizeY 102) based on the information for the minimum size in luma samples of the luma leaf block resulting from quadtree splitting and the obtained syntax element.

Wherein the method may further include determining whether binary splitting is allowed to be applied to a picture block based on the MaxBtSizeY; obtaining a coding block of the picture block based on the result of the determining; and obtaining the reconstructed sample values of the coding block.

Wherein the picture block may be a luma block of the encoded pictures.

Wherein the syntax element may specify a difference between the base 2 logarithm of the MaxBtSizeY 102 and the base 2 logarithm of the MinQtSizeY 105; or the syntax element may specify the difference between the MaxBtSizeY and the MinQtSizeY.

Wherein the syntax element may be obtained from a slice header of the bitstream.

The method according to the third aspect of the disclosure can be performed by the apparatus according to the first aspect of the disclosure. Further features and implementation forms of the method according to the first aspect of the disclosure correspond to the features and implementation forms of the apparatus according to the third aspect of the disclosure.

The method according to the fourth aspect of the disclosure can be performed by the apparatus according to the second aspect of the disclosure. Further features and implementation forms of the method according to the second aspect of the disclosure correspond to the features and implementation forms of the apparatus according to the fourth aspect of the disclosure.

The method according to the second aspect can be extended into implementation forms corresponding to the implementation forms of the first apparatus according to the first aspect. Hence, an implementation form of the method comprises the feature(s) of the corresponding implementation form of the first apparatus.

The advantages of the methods according to the fourth aspect are the same as those for the corresponding implementation forms of the method according to the third aspect.

According to a fifth aspect of the disclosure, an apparatus is described for decoding a video stream, where the apparatus includes a processor and a memory storing instructions that cause the processor to perform the method according to the third aspect.

According to a sixth aspect of the disclosure, an apparatus is described for encoding a video stream, where the apparatus includes a processor and a memory storing instructions that cause the processor to perform the method according to the fourth aspect.

According to a seventh aspect of the disclosure, a computer-readable storage medium is proposed having stored thereon instructions that when executed cause one or more processors to code video data. The instructions cause the one or more processors to perform a method according to the third or fourth aspect or any possible embodiment of the third or fourth aspect.

According to an eighth aspect of the disclosure, a computer program comprising program code for performing the method according to the third or fourth aspect or any possible embodiment of the third or fourth aspect when executed on a computer is described.

Details of one or more embodiments are set forth in the accompanying drawings and the description below. Other features, objects, and advantages will be apparent from the description, drawings, and claims.

According to an embodiment, a computer program product is provided comprising program code for controlling a device to perform any of the above-mentioned methods when the program code is executed by one or more processors of the device.

For the purpose of clarity, any one of the embodiments disclosed herein may be combined with any one or more of the other embodiments to create a new embodiment within the scope of the present disclosure.

These and other features will be more clearly understood from the following detailed description taken in conjunction with the accompanying drawings and claims.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which

FIG. 2 shows a SPS RBSP syntax for a device according to a second specific embodiment of the disclosure.

FIG. 3 shows a slice header syntax for a device according to a second specific embodiment of the disclosure.

FIG. 4 shows a SPS RBSP syntax for a device according to a third specific embodiment of the disclosure.

FIG. 5 shows a slice header syntax for a device according to a fourth specific embodiment of the disclosure.

FIG. 6 shows a slice header syntax for a device according to a fifth specific embodiment of the disclosure.

FIG. 8 shows a conventional SPS RBSP syntax.

FIG. 9 shows a conventional slice header syntax.

FIGS. 16A-16F show different CU splitting modes in VVC.

FIG. 21 is an illustrative diagram of an example of block partitioning using a quad-tree-binary-tree (QTBT) structure.

FIG. 22 is an illustrative diagram of an example of tree structure corresponding to the block partitioning using the QTBT structure of FIG. 6.

DETAILED DESCRIPTION OF EMBODIMENTS

Figure 1:
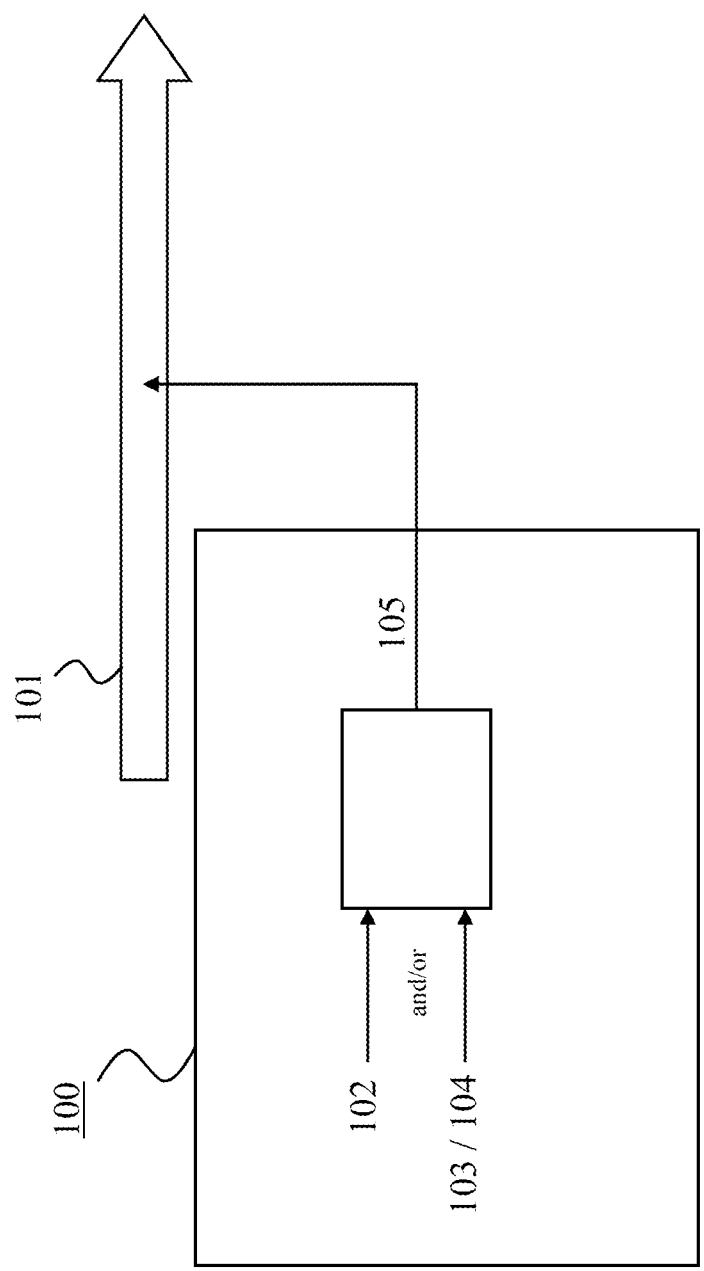
FIG. 1 shows a device according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g., by compression) the original video pictures to reduce the amount of data required for representing the video pictures (e.g., for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for a video sequence. The combination of the encoding part and the decoding part is also referred to as a CODEC (Coding and Decoding).

In the case of lossless video coding, the original video pictures can be reconstructed without loss (i.e., the reconstructed video pictures have the same quality as the original video pictures, assuming no transmission loss or other data loss during storage or transmission). In case of lossy video coding, further compression, e.g., by quantization, is performed, to reduce the amount of data representing the video pictures, which cannot be completely reconstructed at the decoder (i.e., the quality of the reconstructed video pictures is lower or worse compared to the quality of the original video pictures).

Several video coding standards since H.261 belong to the group of "lossy hybrid video codecs" (i.e., combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed (i.e. encoded) on a block (e.g., video block) level, e.g., by using spatial (e.g., intra picture) prediction and temporal (e.g., inter picture) prediction to generate a prediction block, subtracting the prediction block from the current block (i.e., a block currently processed/to be processed) to obtain a residual block, transforming the residual block and quantizing the residual block in the transform domain to reduce the amount of data to be transmitted (via compression), whereas at the decoder the inverse processing compared to the encoder is partially applied to the encoded or compressed block to reconstruct the current block for representation. Furthermore, the encoder duplicates the decoder processing loop such that both will generate identical predictions (e.g., intra- and inter predictions) and/or re-constructions for processing (i.e., coding) the subsequent blocks.

As used herein, the term "block" may refer to a portion of a picture or a frame. For convenience of description, embodiments of the disclosure are described herein in reference to High-Efficiency Video Coding (HEVC) or the reference software of Versatile Video Coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC. It may refer to a CU (coding unit), PU (prediction unit), and TU (transform unit). In HEVC, a CTU (coding tree unit) is split into CUs by using a quad-tree structure denoted as a coding tree. The decision whether to code a picture area using inter-picture (i.e., temporal) or intra-picture (i.e., spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, a Quad-Tree and Binary Tree (QTBT) partitioning frame is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiple partition, for example, Ternary Tree (TT) partition was also proposed to be used together with the QTBT block structure. The term "device" may also be "apparatus", "decoder", or "encoder".

In the following embodiments of an encoder 20, a decoder 30 and a coding system 40 are described based on FIGS. 11 to 13.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figures 11A, 11B:
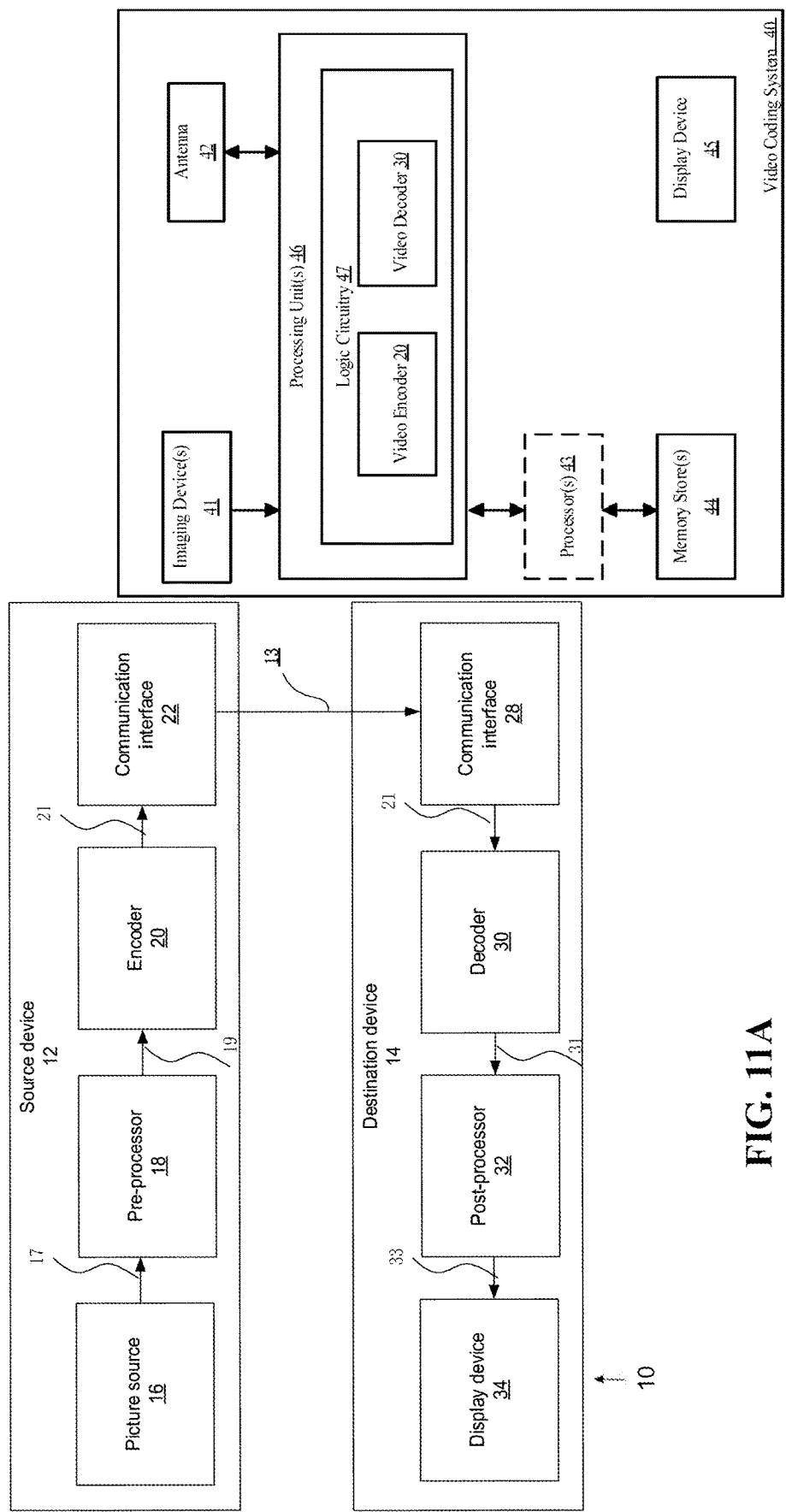
FIG. 11A is a block diagram illustrating an example coding system that may implement embodiments of the disclosure.
FIG. 11B is a block diagram illustrating another example coding system that may implement embodiments of the disclosure.

FIG. 11A is a conceptional or schematic block diagram illustrating an example coding system 10, e.g. a video coding system 10 that may utilize techniques of this present application (present disclosure). Encoder 20 (e.g., video encoder 20) and decoder 30 (e.g., video decoder 30) of video coding system 10 represent examples of devices that may be configured to perform techniques in accordance with various examples described in the present application. As shown in FIG. 11A, the coding system 10 comprises a source device 12 configured to provide encoded data 13, e.g., an encoded picture 13, e.g., to a destination device 14 for decoding the encoded data 13.

The source device 12 comprises an encoder 20, and may additionally (i.e., optionally) comprise a picture source 16, a pre-processing unit 18, e.g., a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture). The picture source may be any kind of memory or storage storing any of the aforementioned pictures.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed (i.e., the picture may be represented or include three sample arrays). In an RBG format or color space, a picture comprises corresponding red, green, and blue sample arrays. However, in video coding, each pixel is typically represented in a luminance/chrominance format or color space (e.g., YCbCr), which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g., video source 16) may be, for example, a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g., video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g., from RGB to YCbCr), color correction, or de-noising. It can be understood that the pre-processing unit 18 may be an optional component.

The encoder 20 (e.g., video encoder 20) is configured to receive the pre-processed picture data 19 and provide encoded picture data 21 (further details will be described below, e.g., based on FIG. 12 or FIG. 14).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

Communication interface 22 of the source device 12 may be configured to receive the encoded picture data 21 and to transmit it to another device, e.g., the destination device 14 or any other device, for storage or direct reconstruction, or to process the encoded picture data 21 for respectively before storing the encoded data 13 and/or transmitting the encoded data 13 to another device, e.g., the destination device 14 or any other device for decoding or storing.

The destination device 14 comprises a decoder 30 (e.g., a video decoder 30), and may additionally (i.e., optionally) comprise a communication interface or communication unit 28, a post-processing unit 32 and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 28 of the destination device 14 is configured receive the encoded picture data 21 or the encoded data 13, e.g., directly from the source device 12 or from any other source, e.g., a storage device, e.g., an encoded picture data storage device.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to de-package the encoded data 13 to obtain the encoded picture data 21.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the encoded picture data 13 in FIG. 11A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 13 or FIG. 15).

The post-processor 32 of destination device 14 is configured to post-process the decoded picture data 31 (also called reconstructed picture data), e.g., the decoded picture 31, to obtain post-processed picture data 33, e.g. a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g. an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 11A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 11A may vary depending on the actual device and application.

The encoder 20 (e.g., a video encoder 20) and the decoder 30 (e.g., a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 12:
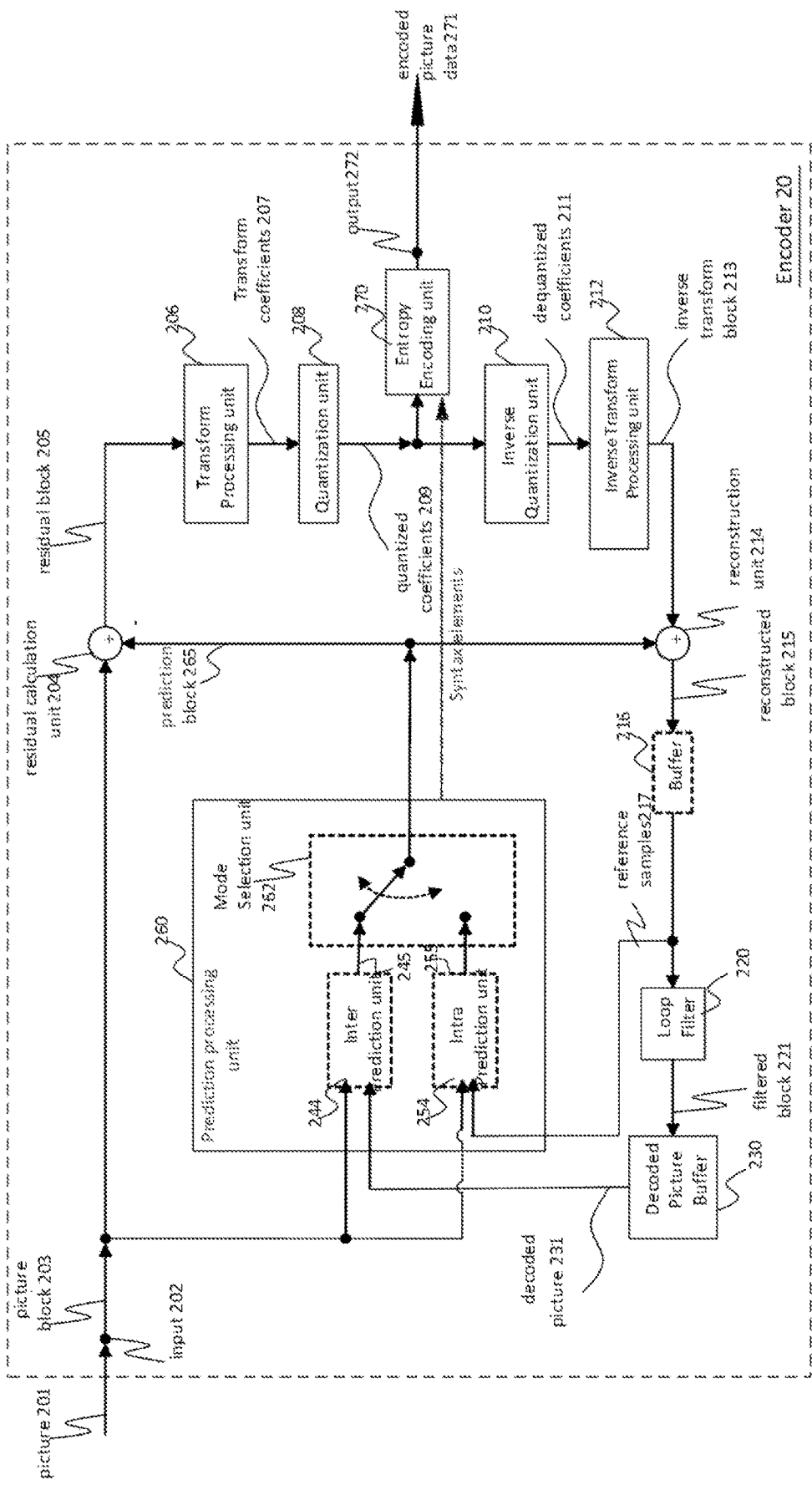
FIG. 12 is a block diagram illustrating an example video encoder that may implement embodiments of the disclosure.

The encoder 20 may be implemented via processing circuitry 46 to embody the various modules as discussed with respect to encoder 20 of FIG. 12 and/or any other encoder system or subsystem described herein. The decoder 30 may be implemented via processing circuitry 46 to embody the various modules as discussed with respect to decoder 30 of FIG. 13 and/or any other decoder system or subsystem described herein. The processing circuitry may be configured to perform the various operations as discussed later. As shown in FIG. 15, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 11B.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 11A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video Coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC. It should be understood that, for each of the above examples described with reference to video encoder 20, video decoder 30 may be configured to perform a reciprocal process. With regard to signaling syntax elements, video decoder 30 may be configured to receive and parse such syntax elements and decode the associated video data accordingly. In some examples, video encoder 20 may entropy encode one or more syntax elements into the encoded video bitstream. In such examples, video decoder 30 may parse such syntax element and decode the associated video data accordingly.

Figure 13:
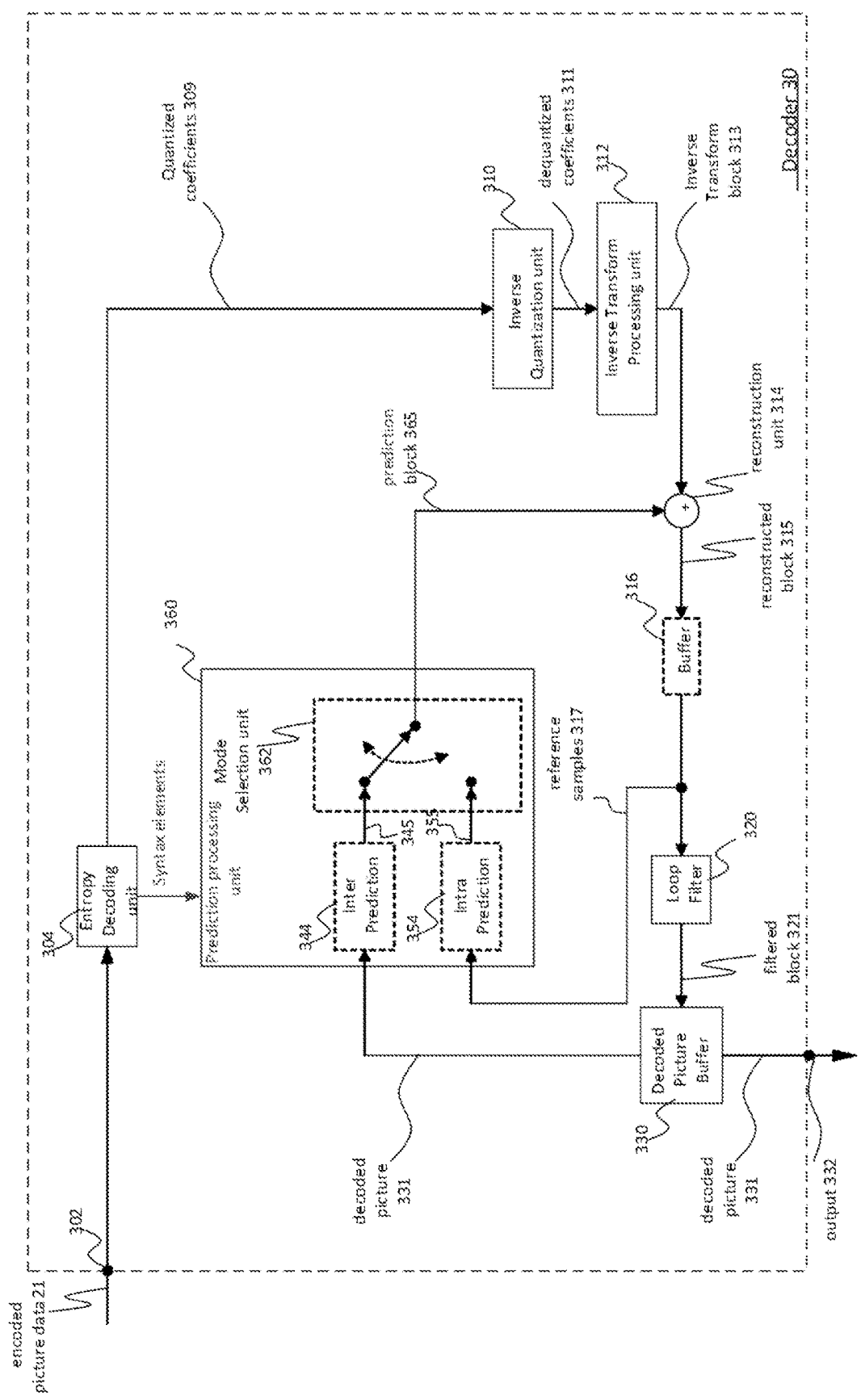
FIG. 13 is a block diagram illustrating an example of a video decoder that may implement embodiments of the disclosure.

FIG. 11B is an illustrative diagram of another example video coding system 40 including encoder 20 of FIG. 12 and/or decoder 30 of FIG. 13, according to an exemplary embodiment. The system 40 can implement techniques in accordance with various examples described in the present application. In the illustrated implementation, video coding system 40 may include imaging device(s) 41, video encoder 20, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30, in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 12 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 13 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 13 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

FIG. 12 shows a schematic/conceptual block diagram of an example video encoder 20 that is configured to implement the techniques of the present application. In the example of FIG. 12, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 12 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see, e.g., decoder 30 in FIG. 13).

The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20. The encoder 20 is configured to receive, e.g., by input 202, a picture 201 or a block 203 of the picture 201, e.g., a picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g., previously encoded and/or decoded pictures of the same video sequence, i.e., the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed (i.e., the picture may be represented or include three sample arrays). In an RBG format or color space, a picture comprises corresponding red, green, and blue sample arrays. However, in video coding, each pixel is typically represented in a luminance and chrominance format or color space (e.g. YCbCr), which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Partitioning

Embodiments of the encoder 20 may comprise a partitioning unit (not depicted in FIG. 12) configured to partition the picture 201 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 201 (e.g., one, several, or all blocks forming the picture 201). The picture block 203 may also be referred to as current picture block or picture block to be coded. In one example, the prediction processing unit 260 of video encoder 20 may be configured to perform any combination of the partitioning techniques described above.

Like the picture 201, the block 203 again is or can be regarded as a two-dimensional array or matrix of samples with intensity values (i.e., sample values), although of smaller dimension than the picture 201. In other words, the block 203 may comprise, e.g., one sample array (e.g., a luma array in the case of a monochrome picture 201) or three sample arrays (e.g., a luma and two chroma arrays in the case of a color picture 201) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Encoder 20 as shown in FIG. 12 is configured encode the picture 201 block by block (e.g., the encoding and prediction is performed per block 203).

Embodiments of the video encoder 20 as shown in FIG. 12 may be further configured to partition and/or encode the picture by using slices (also referred to as video slices), wherein a picture may be partitioned into or encoded using one or more slices (typically non-overlapping), and each slice may comprise one or more blocks (e.g., CTUs) or one or more groups of blocks (e.g., tiles (H.265/HEVC and VVC) or bricks (VVC)).

Embodiments of the video encoder 20 as shown in FIG. 12 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g., CTUs) or one or more tiles, wherein each tile, e.g., may be of rectangular shape and may comprise one or more blocks (e.g., CTUs), including, for example, complete or fractional blocks.

Residual Calculation

The residual calculation unit 204 is configured to calculate a residual block 205 based on the picture block 203 and a prediction block 265 (further details about the prediction block 265 are provided later), e.g., by subtracting sample values of the prediction block 265 from sample values of the picture block 203, sample by sample (e.g., pixel by pixel) to obtain the residual block 205 in the sample domain.

Transform

The transform processing unit 206 is configured to apply a transform (e.g., a discrete cosine transform (DCT) or discrete sine transform (DST)) on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g., by inverse transform processing unit 212, at a decoder 30 (and the corresponding inverse transform, e.g., by inverse transform processing unit 212 at an encoder 20) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 is configured to quantize the transform coefficients 207 to obtain quantized transform coefficients 209, e.g., by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization (e.g., by inverse quantization 210) may include multiplication by the quantization step size. Embodiments according to some standards (e.g., HEVC) may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signalled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206 (e.g., an inverse discrete cosine transform (DCT) or inverse discrete sine transform (DST)) to obtain an inverse transform block 213 in the sample domain. The inverse transform block 213 may also be referred to as inverse transform dequantized block 213 or inverse transform residual block 213.

The reconstruction unit 214 (e.g., summer 214) is configured to add the inverse transform block 213 (i.e., reconstructed residual block 213) to the prediction block 265 to obtain a reconstructed block 215 in the sample domain, e.g., by adding the sample values of the reconstructed residual block 213 and the sample values of the prediction block 265.

Optional, the buffer unit 216 (or short "buffer" 216), e.g., a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g., intra prediction.

Embodiments of the encoder 20 may be configured such that, e.g., the buffer unit 216 is not only used for storing the reconstructed blocks 215 for intra prediction 254 but also for the loop filter unit 220 (not shown in FIG. 12), and/or such that, e.g., the buffer unit 216 and the decoded picture buffer unit 230 form one buffer. Further embodiments may be configured to use filtered blocks 221 and/or blocks or samples from the decoded picture buffer 230 (both not shown in FIG. 12) as input or basis for intra prediction 254.

The loop filter unit 220 (or short "loop filter" 220) is configured to filter the reconstructed block 215 to obtain a filtered block 221, e.g., to smooth pixel transitions, or otherwise improve the video quality. The loop filter unit 220 is intended to represent one or more loop filters such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 220 is shown in FIG. 12 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

The loop filter unit 220 (or short "loop filter" 220) is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g., affine sub-blocks edges, ATMVP sub-blocks edges, sub-block transform (SBT) edges and intra sub-partition (ISP) edges. Although the loop filter unit 220 is shown in FIG. 12 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g., directly or encoded via the entropy encoding unit 270, so that, e.g., a decoder 30 may receive and apply the same loop filter parameters or respective loop filters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example, for inter prediction. In some example, if the reconstructed block 215 is reconstructed but without in-loop filtering, the decoded picture buffer (DPB) 230 is configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

The prediction processing unit 260, also referred to as block prediction processing unit 260, is configured to receive or obtain the block 203 (current block 203 of the current picture 201) and reconstructed picture data, e.g., reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g., an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g., from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e., select the prediction mode which provides a minimum rate distortion optimization or which associated rate distortion at least fulfills a prediction mode selection criterion.

In the following the prediction processing (e.g., by prediction processing unit 260) and mode selection (e.g., by mode selection unit 262) performed by an example encoder 20 will be explained in more detail.

Figure 25:
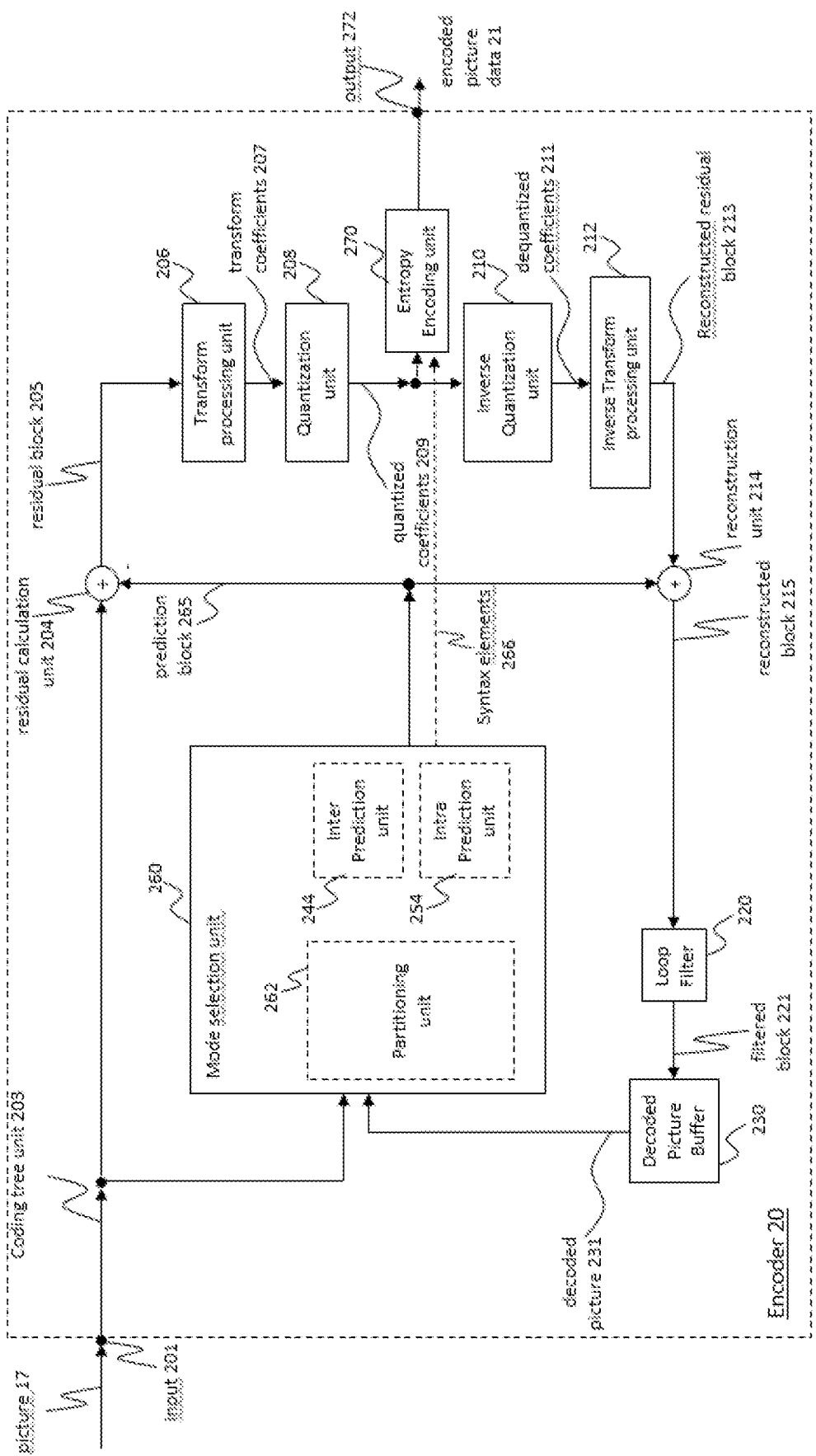
FIG. 25 is a block diagram showing an example of a video encoder configured to implement embodiments of the disclosure.

In addition or alternatively to the above-mentioned embodiments, in other embodiments according to FIG. 25, the mode selection unit 260 comprises partitioning unit 262, inter-prediction unit 244, and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g. line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e., select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g., smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (e.g., temporal) or intra-picture (e.g., spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree nested multi-type tree using binary and ternary splits segmentation structure for example, used to partition a coding tree unit. In the coding tree structure within a coding tree unit, a CU can have either a square or rectangular shape. For example, the coding tree unit (CTU) is first partitioned by a Quad-tree. Then the Quad-tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU. VVC develops a unique signaling mechanism of the partition splitting information in Quad-tree with nested multi-type tree coding tree structure. In the signalling mechanism, a coding tree unit (CTU) is treated as the root of a Quad-tree and is first partitioned by a Quad-tree structure. Each Quad-tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree splitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs sizes.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein. As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g., non-directional modes like DC (or mean) mode and planar mode, or directional modes, e.g., as defined in H.265, or may comprise 67 different intra-prediction modes, e.g., non-directional modes like DC (or mean) mode and planar mode, or directional modes, e.g., as defined for VVC. As an example, several conventional angular intra prediction modes are adaptively replaced with wide-angle intra prediction modes for the non-square blocks, e.g., as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

The set of (or possible) inter-prediction modes depends on the available reference pictures (i.e., previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or, e.g., whether pixel interpolation is applied, e.g., half/semi-pel, quarter-pel and/or 1/16 pel interpolation, or not.

Additional to the above prediction modes, skip mode, direct mode and/or other inter prediction mode may be applied.

For example, in an extended merge prediction mode, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signalled right after sending a skip flag and merge flag to specify whether MMVD mode is used for a CU, and a CU-level adaptive motion vector resolution (AMVR) scheme may be applied. AMVR allows MD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

Additional to the above prediction modes, skip mode and/or direct mode may be applied.

The prediction processing unit 260 may be further configured to partition the block 203 into smaller block partitions or sub-blocks, e.g., iteratively using quad-tree-partitioning (QT), binary partitioning (BT) or ternary-tree-partitioning (TT) or any combination thereof, and to perform, e.g., the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 12) and motion compensation (MC) unit (not shown in FIG. 12). The motion estimation unit is configured to receive or obtain the picture block 203 (current picture block 203 of the current picture 201) and a decoded picture 231, or at least one or a plurality of previously reconstructed blocks, e.g., reconstructed blocks of one or a plurality of other/different previously decoded pictures 231, for motion estimation. For example, a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 12). This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The intra prediction unit 254 is configured to obtain (e.g., receive) the picture block 203 (current picture block) and one or a plurality of previously reconstructed blocks (e.g., reconstructed neighbor blocks) of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g. minimum residual (e.g., the intra-prediction mode providing the prediction block 255 most similar to the current picture block 203) or minimum rate distortion.

The intra prediction unit 254 is further configured to determine based on intra prediction parameter, e.g., the selected intra prediction mode, the intra prediction block 255. In any case, after selecting an intra prediction mode for a block, the intra prediction unit 254 is also configured to provide intra prediction parameter, i.e., information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g., in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 13 shows an example video decoder 30 that is configured to implement the techniques of this present application. The video decoder 30 configured to receive encoded picture data (e.g., encoded bitstream) 21, e.g. encoded by encoder 100, to obtain a decoded picture 131. During the decoding process, video decoder 30 receives video data, e.g., an encoded video bitstream that represents picture blocks of an encoded video slice and associated syntax elements, from video encoder 100.

In the example of FIG. 13, the decoder 30 comprises an entropy decoding unit 304, an inverse quantization unit 310, an inverse transform processing unit 312, a reconstruction unit 314 (e.g., a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 20 from FIG. 12.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to perform entropy decoding to the encoded picture data 21 to obtain, e.g., quantized coefficients 309 and/or decoded coding parameters (not shown in FIG. 13), e.g., (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 13), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

Embodiments of the decoder 30 may comprise a partitioning unit (not depicted in FIG. 13). In one example, the prediction processing unit 360 of video decoder 30 may be configured to perform any combination of the partitioning techniques described above.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g., from the entropy decoding unit 304.

When the video slice is coded as an intra coded (I) slice, intra prediction unit 354 of prediction processing unit 360 is configured to generate prediction block 365 for a picture block of the current video slice based on a signalled intra prediction mode and data from previously decoded blocks of the current frame or picture. When the video frame is coded as an inter coded (i.e., B, or P) slice, inter prediction unit 344

(e.g., motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize (i.e., dequantize) the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g. by entropy decoding unit 304) to determine the transform to be applied to the dequantized coefficients 311.

The reconstruction unit 314 (e.g., summer 314) is configured to add the inverse transform block 313 (i.e., reconstructed residual block 313) to the prediction block 365 to obtain a reconstructed block 315 in the sample domain, e.g., by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a deblocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g., affine sub-blocks edges, ATMVP sub-blocks edges, sub-block transform (SBT) edges and intra sub-partition (ISP) edges. Although the loop filter unit 320 is shown in FIG. 13 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 331, e.g., via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 26:
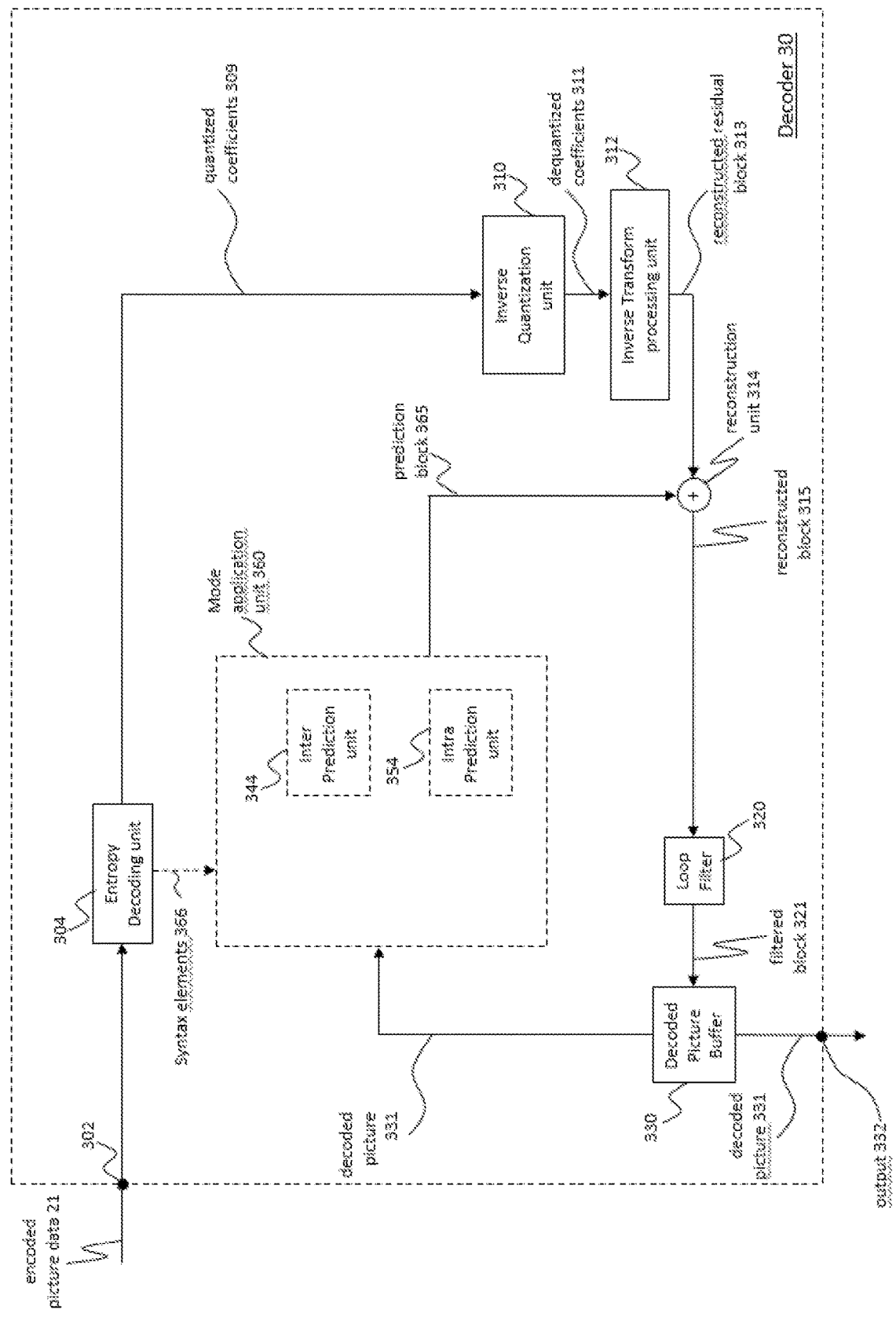
FIG. 26 is a block diagram showing an example structure of a video decoder configured to implement embodiments of the disclosure.

In addition or alternatively to the above-mentioned embodiments, in another embodiments according to FIG. 26, the inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode application unit 360 may be configured to perform the prediction (e.g., intra or inter prediction) per block based on reconstructed pictures, blocks or respective samples (e.g., filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signalled intra prediction mode and data from previously decoded blocks of the current picture. When the video picture is coded as an inter coded (i.e., B, or P) slice, inter prediction unit 344 (e.g., motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Prediction processing unit 360 is configured to determine the prediction information for a video block of the current video slice by parsing the motion vectors or related information and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Embodiments of the video decoder 30 as shown in FIG. 13 may be configured to partition and/or decode the picture by using slices (also referred to as video slices), wherein a picture may be partitioned into or decoded using one or more slices (typically non-overlapping), and each slice may comprise one or more blocks (e.g., CTUs) or one or more groups of blocks (e.g., tiles (H.265/HEVC and VVC) or bricks (VVC)).

Embodiments of the video decoder 30 as shown in FIG. 13 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g., one or more blocks (e.g., CTUs) or one or more tiles, wherein each tile, e.g. may be of rectangular shape and may comprise one or more blocks (e.g., CTUs), e.g., complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Figure 14:
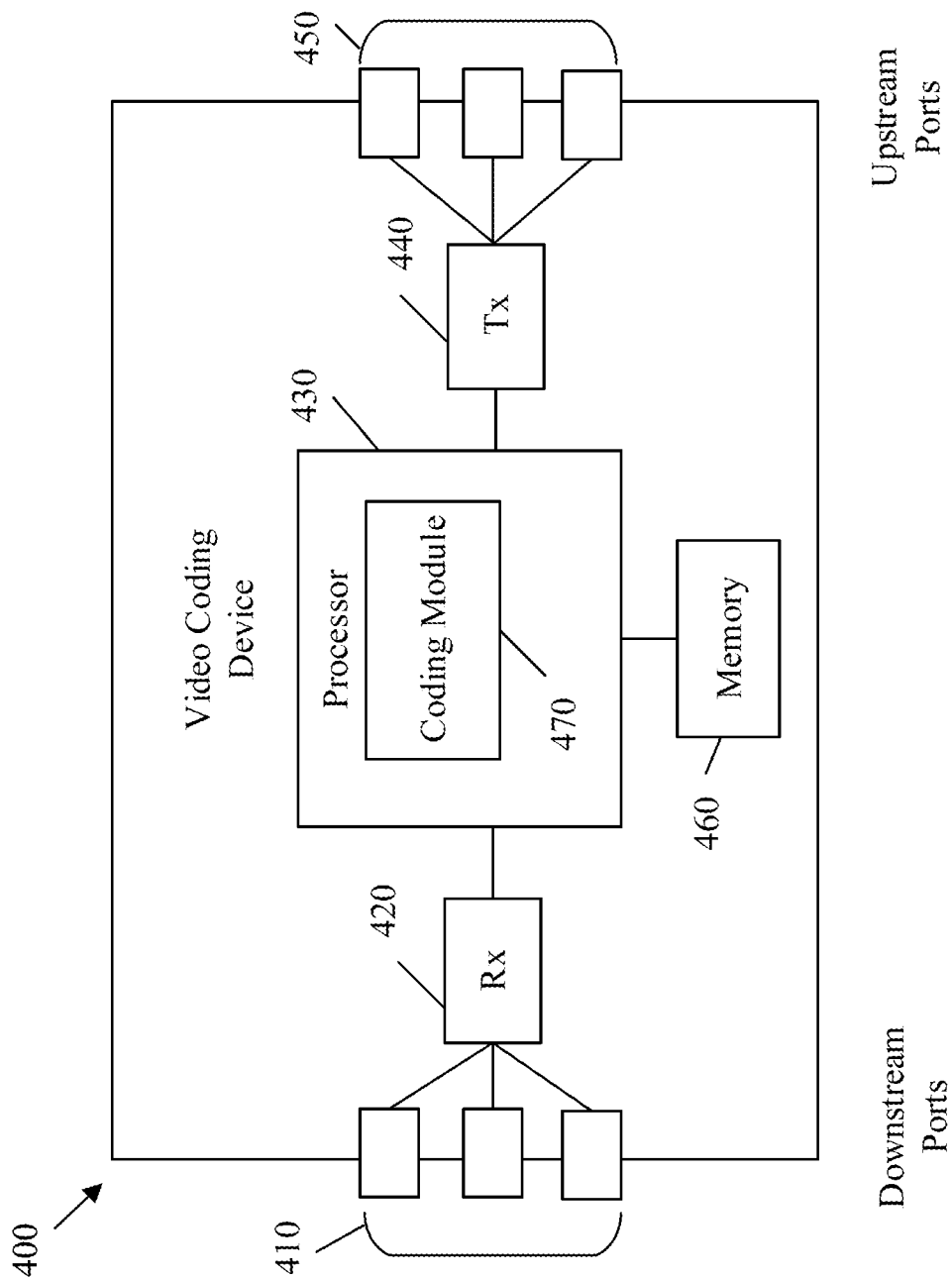
FIG. 14 is a schematic diagram of a network device according to an embodiment of the disclosure.

FIG. 14 is a schematic diagram of a video coding device 400 according to an embodiment of the disclosure. The video coding device 400 is suitable for implementing the disclosed embodiments as described herein. In an embodiment, the video coding device 400 may be a decoder, such as video decoder 30 of FIG. 11A, or an encoder, such as video encoder 20 of FIG. 11A. In an embodiment, the video coding device 400 may be one or more components of the video decoder 30 of FIG. 11A or the video encoder 20 of FIG. 11A, as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 15:
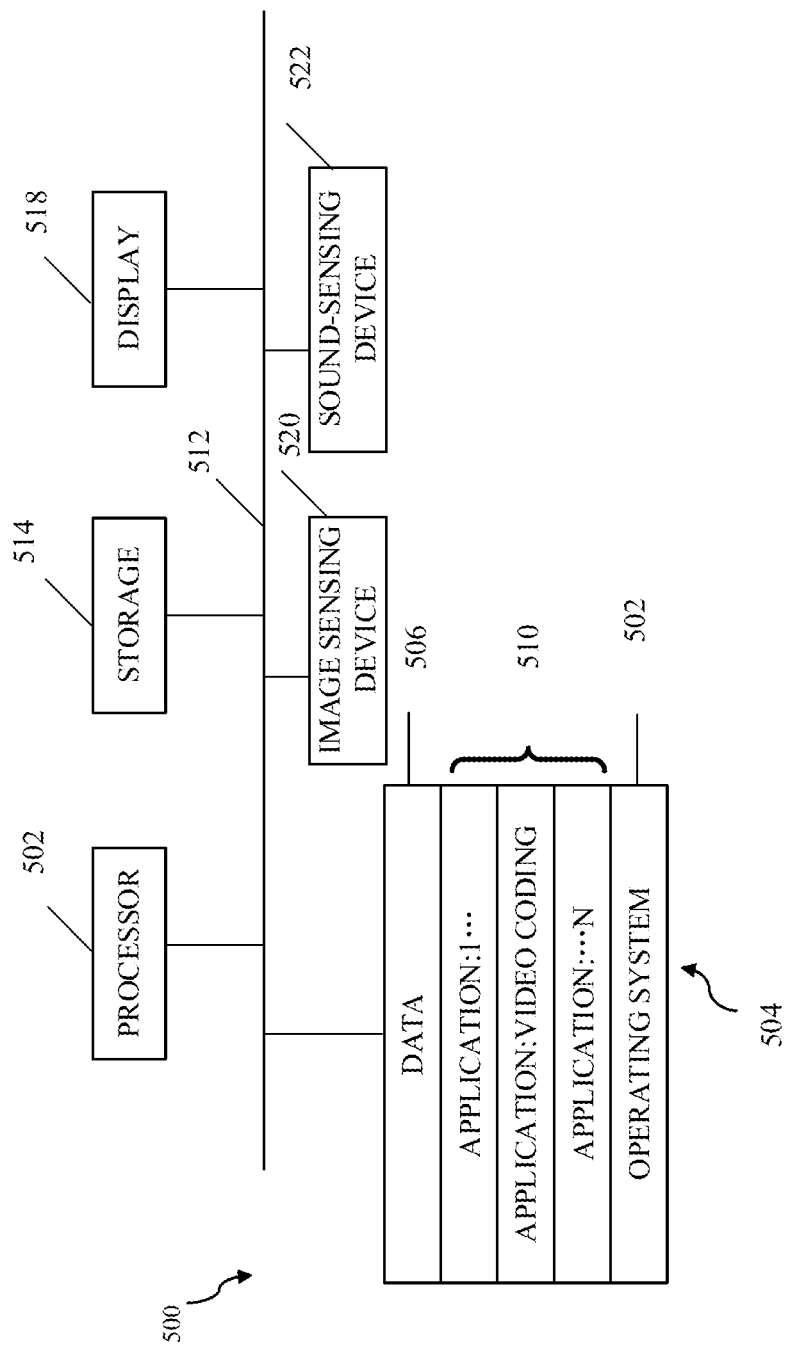
FIG. 15 is a simplified block diagram of an apparatus that may be used as either or both of the source device 12 and the destination device 14 from FIG. 11A according to an exemplary embodiment.

FIG. 15 is a simplified block diagram of an apparatus 500 that may be used as either or both of the source device 12 and the destination device 14 from FIG. 11A according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit (CPU). Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing. The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 15 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Embodiments Concerning Relation Between Partition Constraint Elements

The disclosure is concerned with relations between partition constraint elements (setting partitioning rules for different picture partitioning methods), and the constraint elements may be signalled via a bitstream that includes a plurality of encoded pictures. Accordingly, the disclosure provides devices and methods for generating, decoding, or processing such a bitstream, particularly including partition constraint elements into the bitstream and extracting partition constraints according to new partitioning rules.

It is noted that the names of the above-described syntax elements are used (throughout this document) as they are conventionally used. However it should be clear that these names could be changed without changing the technical context. Therefore, what should be considered important is the logical meaning of the syntax elements.

Currently, the partition constraint elements (e.g., the MaxBtSizeY, MaxMttDepth, and MinQtSizeY) are signalled individually in their definition range. In particular, currently, the syntax element of CtbSizeY (i.e., log2_ctu_size_minus2), and the syntax elements of the MinQtSizeY (i.e., log2_min_qt_size_intra_slices_minus2 and log2_min_qt_size_inter_slices_minus2), and the syntax elements of the MaxMttDepth (i.e., max_mtt_hierarchy_depth_inter_slices and max_mtt_hierarchy_depth_intra_slices) are signalled in a Sequence Parameter Set (SPS). Further, the syntax element of a difference between the luma CTB size and the MaxBtSizeY (i.e., log2_diff_ctu_max_bt_size) is signalled in a slice header. The SPS and slice header may be included in the picture bitstream.

An exemplary SPS syntax, particularly a SPS Raw Byte Sequence Payload (RBSP) syntax, is shown in FIG. 8. The SPS RBSP semantics of this syntax are as follows.

'pic_width_in_luma_samples' specifies the width of each decoded picture in units of luma samples, shall not be equal to 0, and shall be an integer multiple of MinCbSizeY.

'pic_height_in_luma_samples' specifies the height of each decoded picture in units of luma samples, shall not be equal to 0, and shall be an integer multiple of MinCbSizeY.

'log2_ctu_size_minus2' plus 2 specifies the luma CTB size of each CTU.

The elements CtbLog2SizeY, CtbSizeY, MinCbLog2SizeY, MinCbSizeY, MinTbLog2SizeY, MaxTbLog2SizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are usually derived as follows:

CtbLog2SizeY=log2_ctu_size_minus2+2
CtbSizeY=1<<CtbLog2SizeY
MinCbLog2SizeY=2
MinCbSizeY=1<<MinCbLog2SizeY
MinTbSizeY=4
MaxTbSizeY=64

PicWidthInCtbsY=Ceil
  (pic_width_in_luma_samples÷CtbSizeY)
PicHeightInCtbsY=Ceil
  (pic_height_in_luma_samples÷CtbSizeY)
PicSizeInCtbsY=PicWidthInCtbsY*PicHeightInCtbsY
PicWidthInMinCbsY=pic_width_in_luma_samples/
  MinCbSizeY
PicHeightInMinCbsY=picheight_in_luma_samples/
  MinCbSizeY
PicSizeInMinCbsY=PicWidthInMinCbsY*PicHeight
  InMinCbsY
PicSizeInSamplesY=pic_width_in_luma_samples*
  pic_height_in_luma_samples
PicWidthInSamplesC=pic_width_in_luma_samples/Sub-
  WidthC
PicHeightInSamplesC=pic_height_in_luma_samples/
  SubHeightC 'log2_min_qt_size_intra_slices_minus2' plus 2 specifies the minimum luma size of a leaf block resulting from quadtree splitting of a CTU in slices with slice_type equal to 2 (I). The value of log2_min_qt_size_intra_slices_minus2 shall be in the range of 0 to CtbLog2SizeY−2, inclusive.
  MinQtLog2SizeIntraY=log2_mm_qt_size_intra_slices_
    minus2+2

'log2_min_qt_size_inter_slices_minus2' plus 2 specifies the minimum luma size of a leaf block resulting from quadtree splitting of a CTU in slices with slice_type equal to 0 (B) or 1 (P). The value of log2_min_qt_size_inter_ slices_minus2 shall be in the range of 0 to CtbLog2SizeY−2, inclusive.
  MinQtLog2SizeInterY=log2_min_qt_size_inter_slices_
    minus2+2

'max_mtt_hierarchy_depth_inter_slices' specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to CtbLog2SizeY−MinTbLog2SizeY, inclusive.

'max_mtt_hierarchy_depth_intra_slices' specifies the maximum hierarchy depth for coding units resulting from multi-type tree splitting of a quadtree leaf in slices with slice_type equal to 2 (I). The value of max_mtt_hierarchy_depth_intra_slices shall be in the range of 0 to CtbLog2SizeY−MinTbLog2SizeY, inclusive.

Further, FIG. 9 shows an exemplary slice header syntax. The slice header semantics of this syntax are as follows.

'log2_diff_ctu_max_bt_size' specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive.

When log2_diff_ctu_max_bt_size is not present, the value of log2_diff_ctu_max_bt_size is inferred to be equal to 2.

The elements MinQtLog2SizeY, MaxBtLog2SizeY, MinBtLog2SizeY, MaxTtLog2SizeY, MinTtLog2SizeY, MaxBtSizeY, MinBtSizeY, MaxTtSizeY, MinTtSizeY and MaxMttDepth are usually derived as follows:
  MinQtLog2SizeY=(slice_type==I)?
    MinQtLog2SizeIntraY:MinQtLog2SizeInterY
  MaxBtLog2SizeY=CtbLog2SizeY−
    log2_diff_ctu_max_bt_size
  MinBtLog2SizeY=MinCbLog2SizeY
  MaxTtLog2SizeY=(slice_type==I)?5:6
  MinTtLog2SizeY=MinCbLog2SizeY
  MinQtSizeY=1<<MinQtLog2SizeY
  MaxBtSizeY=1<<MaxBtLog2SizeY
  MinBtSizeY=1<<MinBtLog2SizeY
  MaxTtSizeY=1<<MaxTtLog2SizeY
  MinTtSizeY=1<<MinTtLog2SizeY
  MaxMttDepth=(slice_type==I)?    max_mtt_hierarchy_
    depth_intra_slices:    max_mtt_hierarchy_depth_inter_slices As shown in FIG. 8, currently the width and height of a picture sequence (e.g., the pictures of a video sequence) are indicated using the syntax elements 'pic_width_in_luma_samples' and 'pic_height_in_luma_samples'. Conventionally, these syntax elements need to be multiples of the MinCbSizeY, in order to ensure that a picture can be partitioned into coding blocks with minimum size. However, although the pic_height_in_luma_samples and pic_width_in_luma_samples must be multiples of the MinCbSizeY, it is still not guaranteed that a picture can be fully partitioned into blocks using the available quadtree, binary tree and ternary tree splitting methods, respectively. An example of this problem is explained as follows:

It is exemplarily assumed that:
  MinCbSizeY is equal to 4
  MinQtSizeY is equal to 32
  MaxBtSizeY is equal to 16

In this example, if the pic_width_in_luma_samples=132 and pic_width_in_luma_samples=132, although the width and the height of the picture are multiples of 4, it is still not possible to completely partition the picture. The reason is that a parent block with, e.g., a size of 32×32 cannot be partitioned using binary split or quadtree split, because if quadtree splitting would be applied, the MinQtSizeY limitation would be violated, and if binary splitting would be applied, the MaxBtSizeY limitation would be violated. In other words, it is not possible to generate a block with a width or height equal to 4, which is, however, necessary for complete partitioning of the picture.

Thus, as exemplified above, there is currently a problem of partitioning a picture completely respecting the conventional partitioning rules. This is actually a major problem, since it means that some picture sizes cannot be encoded and cannot be decoded.

FIG. 1 shows a device 100 according to a general embodiment of the disclosure. The device 100 is suitable for generating or processing (i.e., manipulating) a bitstream 101 including encoded pictures, e.g., a video bitstream. The device 100 may be included in, or may comprise, an encoder configured to encode the pictures and generate the bitstream 101. The device 100 may determine relations between partition constraint elements, and may include these partition constraint elements and/or their relations into the bitstream 101. Thereby, the device 100 may add the partition constraint elements and/or relations to a SPS syntax and/or slice header syntax in the bitstream 101.

In a similar manner, a decoder device parses the bitstream and/or infers from the bitstream and by applying predefined rules the constraint parameters related to partitioning. The constraint parameter then help decoding and restoring correctly the partitions. The encoder and the decoder operate on (process) the same syntax.

In particular, the device 100 is configured to determine a MaxBtSizeY 102 and/or to determine a MaxMttDepth 103 and a MinCbSizeY 104. Then, the device 100 is configured to determine a MinQtSizeY 105 based on the MaxBtSizeY 102 and/or based on the MaxMttDepth 103 and MinCbSizeY 104. Finally, the device 100 is configured to include the determined MinQtSizeY 105 into the bitstream 101, either indirectly (i.e., by including information from which the MinQtSizeY 105 can be derived) or directly.

In a device 100 according to a first specific embodiment of the disclosure, which builds on the device 100 shown in FIG. 1, the MinQtSizeY 105 value range may be limited based on the value of the MaxBtSizeY 102. For example, the higher bound of the MinQtSizeY 105 may be limited to the MaxBtSizeY 102. In other words, in the device 100 according to the first specific embodiment, the minimum value of the MinQtSizeY 105 cannot be greater than the MaxBtSizeY 102.

Alternatively, or in addition to the above, in the device 100 according to the first specific embodiment, the MinQtSizeY 105 value range may be limited based on the MaxMttDepth 103. In this case, for instance:

If the MaxMttDepth 103 is equal to 0, the MinQtSizeY 105 may be equal to (or may be inferred as) the MinCbSizeY 104.

If the MaxMttDepth 103 is larger than 0, the higher bound of MinQtSizeY 105 may be equal to (MinCbSizeY 104<<MaxMttDepth 103). In other words, the MinQtSizeY 105 should not be larger than (MinCbSizeY 104<<MaxMttDepth 103).

Notably, throughout this document, the operation x<<y can be mathematically described as x·2$^y$, wherein x is multiplied by 2 to the power of y, with y being a non-negative integer number. In other words, x<<y represents a left shift operation of x by y bits.

The device 100 according to the first specific embodiment is thus configured to set a relationship between the MinQtSizeY 105 and the MinCbSizeY 104, the MaxBtSizeY 102 and/or the MaxMttDepth 103, particularly such that the smallest partition block can be achieved by recursively splitting a parent block using a combination of quadtree or binary splitting methods. Since the smallest block (whose size is indicated by the MinCbSizeY 104) can be generated with the available splitting methods, it is possible to completely partition a picture that has a size which is a multiple of MinCbSizeY 104.

FIG. 2 and FIG. 3 show a SPS RPBS syntax 200 and a slice header syntax 300 for a device according to a second specific embodiment of the disclosure. In particular, the conventional SPS RBSP syntax shown in FIG. 8 is changed to the syntax 200 shown in FIG. 2 (new elements are marked in bold, removed elements are crossed out). Further, the conventional slice header syntax shown in FIG. 9 is changed to the syntax 300 shown in FIG. 3 (new elements are marked in bold, removed elements are crossed out). The device according to the second specific embodiment may build on the device 100 shown in FIG. 1, or may be a separate embodiment of the disclosure. In the device according to the second specific embodiment, the following is implemented:

The MaxBtSizeY 102 is signalled in the bitstream 101 relative to the MinQtSizeY 105. In other words, as is shown in FIG. 3, a syntax element 301 of the difference between the MaxBtSizeY 102 and the MinQtSizeY 105 may signalled in the bitstream 101 (using, e.g., a syntax element such as log2_diff_max_bt_size_min_qt_size), and the MaxBtSizeY 102 can be derived (e.g., at a decoder of the bitstream 101) based on the MinQtSizeY 105 and log2_diff_max_bt_size_min_qt_size. In this case, in an example:

MaxBtSizeY 102=MinQtSizeY 105<<log2_diff_max_bt_size_min_qt_size

Notably, in this example the syntax element 301 of the difference between the MaxBtSizeY 102 and the MinQtSizeY 105 is signalled in logarithmic scale (particularly in base 2). In this example, log2_diff_max_bt_size_min_qt_size can only have positive integer values or zero value.

The MaxMttDepth 103 is signalled in the bitstream 101 relative to the MinQtSizeY 105 and the MinCbSizeY 104. As is shown in FIG. 2, a syntax element 201 of the difference between the MaxMttDepth 103 and a log-2 value of the MinQtSizeY 105 may be signalled in the bitstream 101, (for example, using a syntax element: diff_max_mtt_hierarchy_depth_log2_min_qt_size). Two such syntax elements 201 are shown in FIG. 2, one for inter_slices and one for intra_slices. In this case, in the example:

MaxMttDepth 103=diff_max_mtthierarchy_depth_log2_min_qt_size+log 2(MinQtSizeY)−log 2(MinCbSizeY).

Notably, in this example, it is again assumed that diff_max_mtt_hierarchy_depth_log2_min_qt_size is signalled in logarithmic scale. The function log 2(x) corresponds to logarithm of x in base 2.

In FIG. 3, 'log2_diff_max_bt_size_min_qt_size' specifies the difference between the maximum luma size (width or height) of a coding block that can be split using a binary split and the minimum luma size (width or height) of a coding block can be split using a quadtree split. The value of log2_diff_ctu_max_bt_size shall be in the range of 0 to CtbLog2SizeY−MinQtLog2SizeY, inclusive.

FIG. 4 shows a SPS RPBS syntax 400 for a device according to a third specific embodiment of the disclosure. The device according to the third specific embodiment may build on the device 100 shown in FIG. 1, or may be a separate embodiment of the disclosure. As mentioned earlier, conventionally the signalled picture size elements 405 and 406 (pic_width_in_luma_samples and pic_height_in_luma_samples), are each specified to be a value of an integer multiple of the MinCbSizeY 104.

In contrast, in a first implementation of the device according to the third specific embodiment, the picture size elements 405 and 406 may be constrained to have only values that are integer multiples of the MinQtSizeY 105. The benefit thereof is that a boundary block can always have quadtree splitting as an available partitioning method.

In a second implementation of the device according to the third specific embodiment, the width and the height of the picture may be signalled in the bitstream 101 based on the MinQtSizeY 105. In particular, the conventional SPS RBSP syntax shown in FIG. 8 is changed according to the syntax 400 shown in FIG. 4 (new elements are marked in bold, removed elements are crossed out).

In this case, in the SPS syntax 400 shown in FIG. 4, four syntax elements 401-404 may be signalled (e.g., log2_diff_pic_height_min_Qt and log2_diffpic_width_min_Qt), particularly two syntax elements (height/width) per intra_slice, and two syntax elements (height/width) per inter_slice. Preferably, these syntax elements 401-404 are signalled instead of the actual picture size elements 405 and 406, and the width and height of the picture may be determined using the following relations:

Picture width in luma samples=MinQtSizeY 105<<log2_diff_pic_width_min_Qt

Picture height in luma samples=MinQtSizeY 105<<log2_diff_pic_height_min_Qt

The syntax elements 401-404, particularly the differences, can be indicated in the SPS syntax 400 based on logarithmic scale.

FIG. 5 and FIG. 6 show two slice header syntax 5000 and 600, respectively, for a device according to a fourth specific embodiment of the disclosure. The device according to the fourth specific embodiment may build on the device 100 shown in FIG. 1, or may be a separate embodiment of the disclosure.

The device according to the fourth specific embodiment of the disclosure is concerned with the problem that if the MaxMttDepth 103 is inferred, signalled or indicated to be equal to 0, the MaxBtSizeY 102 (or the MaxTtSizeY) can still be present in the bitstream 101, and can have a value greater than the MinCbSizeY 104, and the MinBtSizeY (or the MinTtSizeY) can still have a value equal to the MinCbSizeY 104. This condition may create an ambiguity in the operation of an encoder and/or decoder, so that a complete partitioning of a picture frame may still not be possible.

In a first implementation of the device according to the fourth specific embodiment, the MaxBtSizeY 102 (or the MaxTtSizeY) is signalled or indicated in the bitstream 101 based on the value of the MaxMttDepth 103. In particular, the conventional slice header syntax shown in FIG. 9 is changed to the syntax 5000 shown in FIG. 5 (new elements are marked in bold). That is, the device is configured to include an syntax element 5001 of the MaxBtSizeY 102 (or the MaxTtSizeY) dependent on the MaxMttDepth 103 into the bitstream 101.

Specifically, when the MaxMttDepth 103 is equal to 0, the MaxBtSizeY 102 (or the MaxTtSizeY) may not be signalled in the bitstream 101, but may be inferred (e.g., at the decoder) to be equal to the MinCbSizeY 104. Alternatively, the MaxBtSizeY 102 (or the MaxTtSizeY) is inferred (e.g., at the decoder) to be equal to a default predefined value, such as, e.g., 4 or 8, if the MaxMttDepth 103 is equal to 0.

The syntax element 'log2_diff_ctu_max_bt_size' again specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive.

When log2_diff_ctu_max_bt_size is not present the following may apply: If the slice_type equal to 2 (I) and max_mt_hierarchy_depth_intra_slices is equal to 1, the value of log2_diff_ctu_max_bt_size may be inferred to be equal to 2. Otherwise, the value of log2_diff_ctu_max_bt_size may be inferred to be equal to CtbLog2SizeY−MinCbLog2SizeY.

In a second implementation of the device according to the fourth specific embodiment, the MaxMttDepth 103 is signalled or indicated in the bitstream 101 based on the value of the MaxBtSizeY 102 (or the MaxTtSizeY). In particular, the conventional slice header syntax shown in FIG. 9 is changed to the syntax 600 shown in FIG. 6 (new elements are marked in bold). That is, the device is configured to include an syntax element 601 of the MaxMttDepth 103 dependent on the MaxBtSizeY 102 or the MaxTtSizeY into the bitstream 101.

Specifically, when the MaxBtSizeY 102 (or the MaxTtSizeY) are equal to 0, the MaxMttDepth 103 may not be signalled, but may be inferred, e.g., at the decoder, to be equal to 0. If the value of the MaxMttDepth 103 is equal to 0, it means that binary splitting is not allowed to be applied. In this solution the syntax element of the MaxBtSizeY 102 and the MaxTtSizeY should be signalled before the MaxMttDepth 103, but not limited in any parameter set header.

The syntax element 'MaxTtSizeY' is defined as the maximum luma size (width or height), in terms of number of samples, of a coding block that can be split using a ternary split. The syntax element 'MinTtSizeY' is defined as the minimum luma size (width or height), in terms of number of samples, of a coding block that can be split using a ternary split.

In FIG. 6, 'max_mt_hierarchy_depth' specifies the maximum hierarchy depth for coding units resulting from multi-type tree splitting of a quadtree leaf in slice. The value of max_mtt_hierarchy_depth_inter_slices shall be in the range of 0 to CtbLog2SizeY−MinTbLog2SizeY, inclusive. When the max_mtt_hierarchy_depth is not present, the value of max_mtt_hierachiy_depth is inferred to 0.

Figure 7:
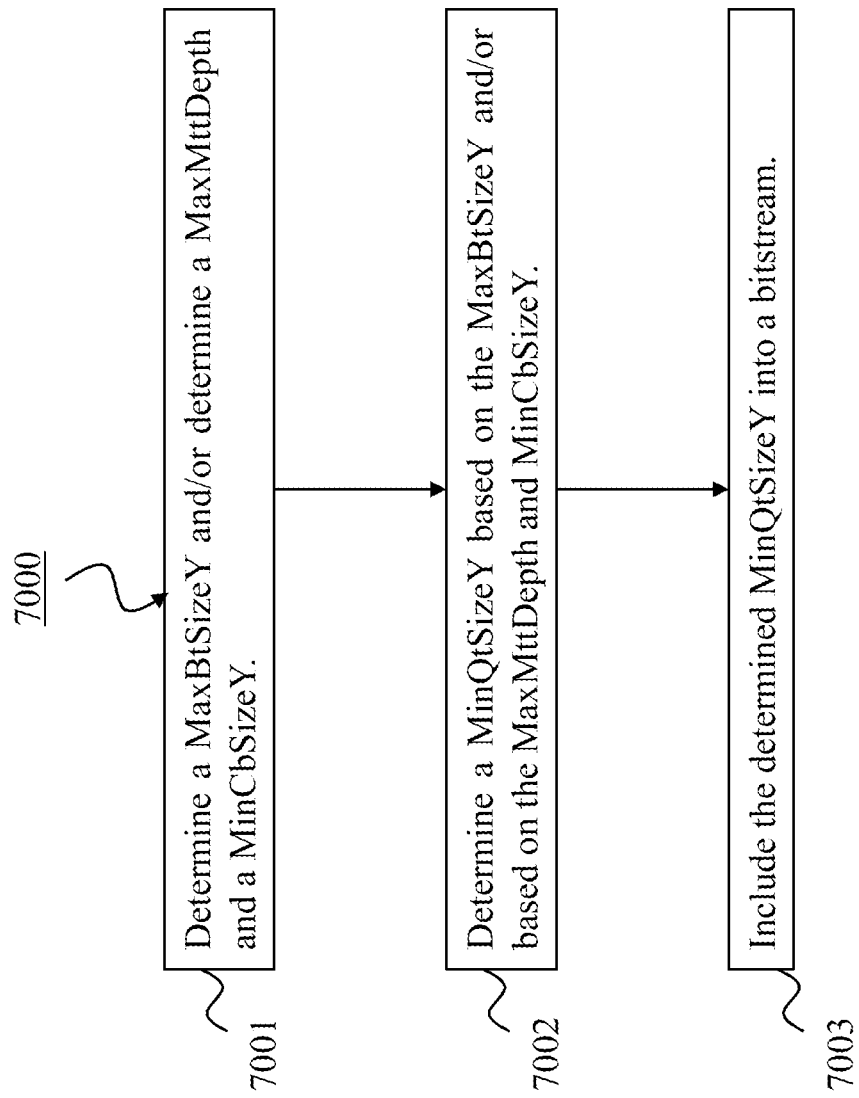
FIG. 7 shows a method according to an embodiment of the disclosure.

FIG. 7 shows a method 7000 according to an embodiment of the disclosure. The method 7000 is specifically for manipulating a bitstream 101, and may be carried out by the device 100 shown in FIG. 1. The method 7000 may also be carried out by an encoder encoding the pictures of the bitstream 101 into the bitstream 101, i.e., generating the bitstream 101.

The method 7000 comprises a step 7001 of determining a MaxBtSizeY 102 and/or of determining a MaxMttDepth 103 and a MinCbSizeY 104. Further, the method 7000 comprises a step 7002 of determining a MinQtSizeY 105 based on the MaxBtSizeY 102 and/or based on the MaxMttDepth 103 and MinCbSizeY 104. Finally, the method 7000 comprises a step 7003 of including the determined MinQtSizeY 105 into the bitstream 101.

Figure 10:
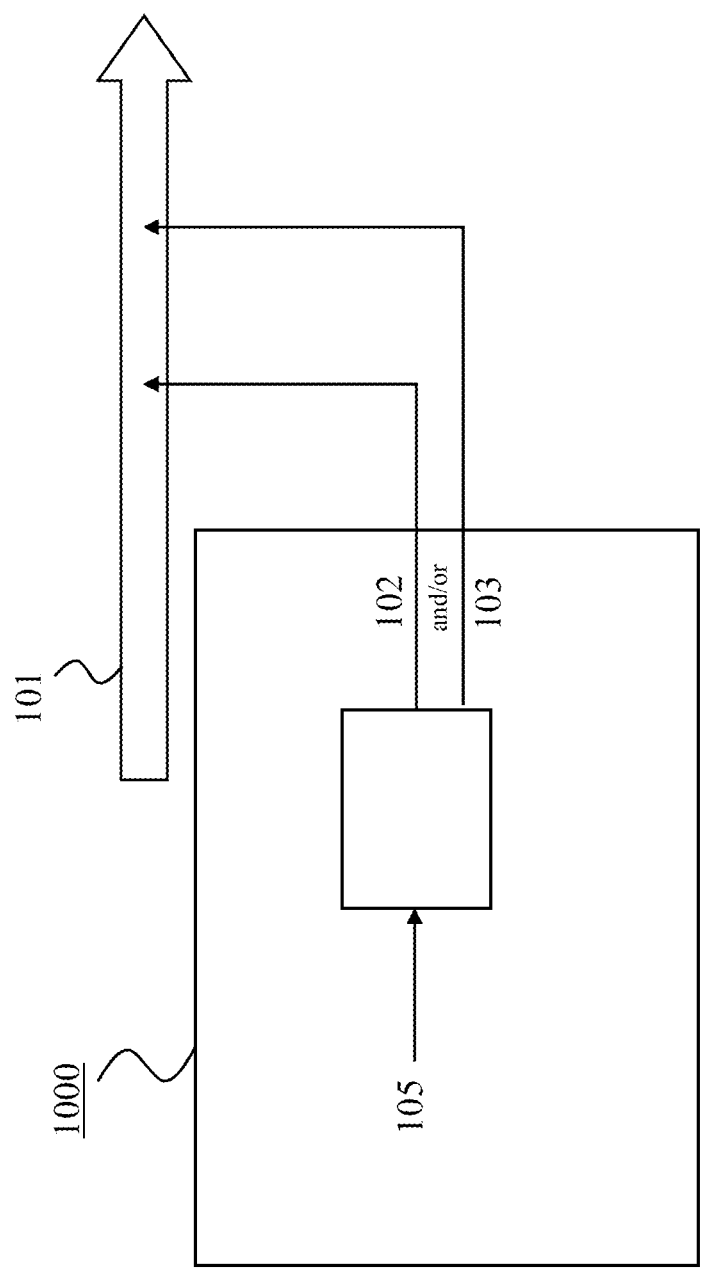
FIG. 10 shows a device according to an embodiment of the disclosure.

FIG. 10 shows a device 1000 according to a general embodiment of the disclosure. The device 1000 is suitable for generating or processing, i.e., manipulating, a bitstream 101 including encoded pictures, e.g., a video bitstream. The device 1000 may be included in, or may comprise, an encoder configured to encode the pictures and generate the bitstream 101. The device 1000 may determine relations between partition constraint elements, and may include these partition constraint elements and/or their relations into the bitstream 101. Thereby, the device 1000 may add the partition constraint elements and/or relations to a SPS syntax and/or slice header syntax in the bitstream 101. The device 1000 is an alternative to the device 100 shown in FIG. 1. However, the features of the device 1000 explained below with respect to FIG. 10 may be combined with the above-described features of the devices according to the first, second, third, or fourth specific embodiments (if they do not build on the device 100 of FIG. 1).

In particular, the device 1000 is configured to determine a MinQtSizeY 105. Further, it is configured to determine a MaxBtSizeY 102 and/or determine a MaxMttDepth 103 based on the MinQtSizeY 105. Finally, it is configured to include the determined MaxBtSizeY 102 and/or the determined MaxMttDepth 103 into the bitstream 101, either indirectly (i.e., by including information from which the MaxBtSizeY 102 and/or MaxMttDepth 103 can be derived) or directly.

For example, the device 1000 may determine the MaxBtSizeY 102 considering that its lower limit is the MinQtSizeY 105. That is the MaxBtSizeY 102 value range may be limited by the value of MinQtSizeY 105. For example, the lower bound of the MaxBtSizeY 102 may be limited to the MinQtSizeY 105. In other words, in the device 1000, the minimum value of the MaxBtSizeY 102 cannot be smaller than the MinQtSizeY 105.

Alternatively, or in addition to the above, in the device 1000 the MaxMttDepth 103 may be determined considering that its upper limit is the difference of the log 2 value of the MinQtSizeY 105 and the log 2 value of a MinCbSizeY 104. That is, the maximum value of the MaxMttDepth 103 cannot be larger than the difference of the log 2 value of the MinQtSizeY 105 and the log 2 value of the MinCbSizeY 104.

In summary, a first aspect of the disclosure provides a device for generating or processing a bitstream including encoded pictures, the device being configured to determine a MaxBtSizeY and/or determine a MaxMttDepth and a MinCbSizeY, determine a MinQtSizeY based on the MaxBtSizeY and/or based on the MaxMttDepth and MinCbSizeY, and include the determined MinQtSizeY into the bitstream.

By determining the MinQtSizeY based on the MaxBtSizeY and/or based on the MaxMttDepth and MinCbSizeY, i.e., by defining new partitioning rules through setting relations between these partition constraint elements, the device of the first aspect achieves an increase in availability and flexibility of the different picture partition methods, particularly quadtree and binary tree splitting.

In an implementation form of the first aspect, the device is configured to determine the MinQtSizeY considering that its upper limit is the MaxBtSizeY, and/or determine the MinQtSizeY considering that its upper limit is the MinCbSizeY to the power of the MaxMttDepth.

By setting such relations between the partition constraint elements MinQtSizeY, MinCbSizeY, MaxBtSizeY and MaxMttDepth, respectively, it is guaranteed that the smallest partition block can be achieved by recursively splitting a parent block using a combination of quadtree or binary splitting methods. Since the smallest block (whose size is indicated by MinCbSizeY) can be generated with the available splitting methods, it is possible to completely partition a picture that has a size being a multiple of MinCbSizeY.

In a further implementation form of the first aspect, the device is configured to determine the MinQtSizeY to be the MinCbSizeY, if the MaxMttDepth equals zero, and determine the MinQtSizeY to be the MinCbSizeY to the power of the MaxMttDepth, if the MaxMttDepth is larger than zero.

This provides an efficient implementation form of the previous implementation form, in order to allow a complete partitioning of the picture using quadtree and binary tree partitioning, respectively.

A second aspect of the disclosure provides a device for generating or processing a bitstream including encoded pictures, the device being configured to: determine a MinQtSizeY, determine a MaxBtSizeY and/or determine a MaxMttDepth based on the MinQtSizeY, and include the determined MaxBtSizeY and/or the determined MaxMttDepth into the bitstream.

In an implementation form of the second aspect, the device is configured to determine the MaxBtSizeY considering that its lower limit is the MinQtSizeY, and/or determine the MaxMttDepth considering that its upper limit is the difference of the log 2 value of the MinQtSizeY and the log 2 value of a MinCbSizeY.

Like for the first aspect, the second aspect defines new partitioning rules through setting relations between the partition constraint elements. Thus, the device of the second aspect achieves an increase in availability and flexibility of the different picture partition methods, particularly quadtree and binary tree splitting.

In a further implementation form of the first or second aspect, the device is configured to include an indication of a relation, particularly of a difference, between a MinQtSizeY and a MaxBtSizeY into the bitstream.

Thus, the relevant partition constraint elements can be easily inferred, e.g., at the decoder side, with at the same time reduces information overhead in the bitstream. A difference is an example of a relation. However, the relation can also be a proportionality factor, calculation scheme, or the like, which allows inferring the MaxBtSizeY from the MinQtSizeY.

In a further implementation form of the first or second aspect, the device is configured to include an indication of a relation, particularly of a difference, between a log 2 value of MinQtSizeY and MaxMttDepth into the bitstream.

Thus, the relevant partition constraint elements can be inferred, e.g., at the decoder side, with at the same time reduced information overhead in the bitstream.

In a further implementation form of the first or second aspect, the device is configured to determine one or more picture size elements, which are indicative of a size, particularly a height and width, of the pictures of the bitstream, to be an integer multiple of the MinQtSizeY, and include the one or more picture size elements into the bitstream.

As a consequence, a boundary block can always have quadtree splitting as an available partitioning method.

In a further implementation form of the first or second aspect, the device is configured to determine one or more picture size elements, which are indicative of a size, particularly a height and width, of the pictures of the bitstream, and include an indication of a relation between the picture size elements and the MinQtSizeY into the bitstream.

Thus, the relevant partition constraint elements can be inferred, e.g., at the decoder side, with at the same time reduced information overhead in the bitstream.

In a further implementation form of the first or second aspect, the indication of the relation between the picture size elements and the MinQtSizeY is based on a logarithmic scale.

In a further implementation form of the first or second aspect, the device is configured to include an indication of the MaxBtSizeY or of a MaxTtSizeY dependent on MaxMttDepth into the bitstream.

In this way, an ambiguity conventionally created in the operation of the encoder and/or decoder is eliminated, and a complete partitioning of a picture frame becomes possible.

In a further implementation form of the first or second aspect, the device is configured to not include any indication of the MaxBtSizeY or the MaxTtSizeY into the bitstream, if the MaxMttDepth equals zero.

This allows reducing the information overhead in the bitstream.

In a further implementation form of the first or second aspect, the device is configured to include an indication of the MaxMttDepth dependent on the MaxBtSizeY or the MaxTtSizeY into the bitstream.

In this way, an ambiguity conventionally created in the operation of the encoder and/or decoder is eliminated, and a complete partitioning of a picture frame becomes possible.

In a further implementation form of the first or second aspect, the device is configured to not include any indication of the MaxMttDepth into the bitstream, if the MaxBtSizeY or MaxTtSizeY equals zero.

This allows reducing the information overhead in the bitstream.

In a further implementation form of the first or second aspect, the device comprises or is included in an encoder configured to encode the pictures of the bitstream.

A third aspect of the disclosure provides a method for generating or processing a bitstream including encoded pictures, the method comprising: determining a MaxBtSizeY and/or determining a MaxMttDepth and a MinCbSizeY, determining a MinQtSizeY based on the MaxBtSizeY and/or based on the MaxMttDepth and MinCbSizeY, and including the determined MinQtSizeY into the bitstream.

In an implementation form of the third aspect, the method comprises determining the MinQtSizeY considering that its upper limit is the MaxBtSizeY, and/or determining the MinQtSizeY considering that its upper limit is the MinCbSizeY to the power of the MaxMttDepth.

In a further implementation form of the third aspect, the method comprises determining the MinQtSizeY to be the MinCbSizeY, if the MaxMttDepth equals zero, and determining the MinQtSizeY to be the MinCbSizeY to the power of the MaxMttDepth, if the MaxMttDepth is larger than zero.

In a further implementation form of the third aspect, the method comprises including an indication of a relation, particularly of a difference, between the MinQtSizeY and the MaxBtSizeY into the bitstream.

In a further implementation form of the third aspect, the method comprises including an indication of a relation, particularly of a difference, between the MinQtSizeY and the MaxMttDepth into the bitstream.

In a further implementation form of the third aspect, the method comprises determining one or more picture size elements, which are indicative of a size, particularly a height and width, of the pictures of the bitstream, to be an integer multiple of the MinQtSizeY, and including the one or more picture size elements into the bitstream.

In a further implementation form of the third aspect, the method comprises determining one or more picture size elements, which are indicative of a size, particularly a height and width, of the pictures of the bitstream, and including an indication of a relation between the picture size elements and the MinQtSizeY into the bitstream.

In a further implementation form of the third aspect, the indication of the relation between the picture size elements and the MinQtSizeY is based on a logarithmic scale.

In a further implementation form of the third aspect, the method comprises including an indication of the MaxBtSizeY or of a MaxTtSizeY dependent on MaxMttDepth into the bitstream.

In a further implementation form of the third aspect, the method comprises not including any indication of the MaxBtSizeY or the MaxTtSizeY into the bitstream, if the MaxMttDepth equals zero.

In a further implementation form of the third aspect, the method comprises including an indication of the MaxMttDepth dependent on the MaxBtSizeY or the MaxTtSizeY into the bitstream.

In a further implementation form of the third aspect, the method comprises not including any indication of the MaxMttDepth into the bitstream, if the MaxBtSizeY or MaxTtSizeY equals zero.

In a further implementation form of the third aspect, the method is performed in an encoder encoding the pictures of the bitstream.

With the method of the third aspect and its implementation forms, all advantages and effects described above for the corresponding device of the first aspect and its respective implementation forms can be achieved. A further aspect of the disclosure is a method for generating or processing a bitstream corresponding to the device of the second aspect.

A fourth aspect of the disclosure provides a device for generating or processing a bitstream including encoded pictures, the device being configured to include an indication of a relation, particularly of a difference, between a MinQtSizeY and a MaxBtSizeY into the bitstream, and/or include an indication of a relation, particularly of a difference, between a MinQtSizeY and a MaxMttDepth into the bitstream.

With the device of the fourth aspect, relevant partition constraint elements can be signalled with at the same time reduced information overhead in the bitstream. The partition constraint elements can be inferred, e.g., at the decoder side. The device of the fourth aspect achieves an increase in availability and flexibility of the different picture partition methods, particularly quadtree and binary tree splitting.

A fifth aspect of the disclosure provides a device for generating or processing a bitstream including encoded pictures, the device being configured to: determine one or more picture size elements, which are indicative of a size, particularly a height and width, of the pictures of the bitstream, to be an integer multiple of a MinQtSizeY, and include the one or more picture size elements into the bitstream; or to determine one or more picture size elements, which are indicative of a size, particularly a height and width, of the pictures of the bitstream, and include an indication of a relation between the picture size elements and a MinQtSizeY into the bitstream.

With the device of the fifth aspect, a boundary block can always have a quadtree splitting as an available partitioning method. Further, relevant partition constraint elements can be inferred, e.g., at the decoder side, with at the same time reduced information overhead in the bitstream. The device of the fifth aspect achieves an increase in availability and flexibility of the different picture partition methods, particularly quadtree and binary tree splitting.

A sixth aspect of the disclosure provides a device for generating or processing a bitstream including encoded pictures, the device being configured to: include an indication of a MaxBtSizeY or of a MaxTtSizeY dependent on a MaxMttDepth into the bitstream; or to include an indication of a MaxMttDepth dependent on a MaxBtSizeY or a MaxTtSizeY into the bitstream.

The device of the sixth aspect reduces or eliminates an ambiguity conventionally created in the operation of the encoder and/or decoder, and thus supports a complete partitioning of a picture frame. The device of the sixth aspect achieves an increase in availability and flexibility of the different picture partition methods, particularly quadtree and binary tree splitting.

A seventh aspect of the disclosure provides a computer program product comprising program code for controlling a device to perform the method of the third aspect and its respective implementation forms, when the program code is executed by one or more processors of the device. The device may be a device of the first, second, fourth, fifth, or sixth aspect, or any implementation form thereof.

An eighth aspect of the disclosure provides a device for decoding a bitstream generated or processed by a device according to the first, second, fourth, fifth, or sixth aspect, or any implementation form thereof.

Embodiments Related to Boundary Partitioning

The Versatile Video Coding (VVC) next generation standard is the most recent joint video project of the International Telecommunications Union Telecommunication Standardization Sector (ITU-T) Video Coding Experts Group (VCEG) and the International Organization for Standardization/International Electrotechnical Commission (ISO/IEC) Moving Picture Experts Group (MPEG) standardization organizations, working together in a partnership known as the Joint Video Exploration Team (JVET). In VVC, a multi-type (binary/ternary/quaternary) tree (BT/TT/QT or binary tree/ternary tree/quarternary tree) segmentation structure shall replace, or may replace, the concept of multiple partition unit types, i.e., it removes the separation of the CU, PU, and TU concepts except as needed for CUs that have a size too large for the maximum transform length and supports more flexibility for CU partition shapes. [JVET-J1002].

FIGS. 16A-16F illustrate, as an example, the partition modes currently used in VTM. FIG. 16A shows an unsplit block (no split), FIG. 16B shows quaternary or quadtree (QT) partitioning, FIG. 16C shows a horizontal binary or binary tree (BT) partitioning, FIG. 16D shows a vertical binary or binary tree (BT) partitioning, FIG. 16E shows a horizontal ternary or ternary tree (TT) partitioning, and FIG. 16F shows a vertical ternary or ternary tree (TT) partitioning of a block such as a CU or CTU. Embodiments may be configured to implement the partition modes as shown in FIGS. 16A to 16F.

In embodiments the following parameters may be defined and specified by sequence parameter set (SPS) syntax elements for the BT/TT/QT coding tree scheme:

CTU size: the root node size of a quaternary tree

MinQTSize: the minimum allowed quaternary tree leaf node size

MaxBTTSize: the maximum allowed binary and ternary tree root node size

MaxBTTDepth: the maximum allowed binary and ternary tree depth, and

MinBTTSize: the minimum allowed binary and ternary tree leaf node size

In other embodiments the minimum allowed quaternary tree leaf node size MinQTSize parameter might also be comprised in other headers or sets, for example, the slice header (SH) or picture parameter set (PPS).

In the HEVC standard, the coding tree units (CTU) or coding units (CU), which are located on the slice/picture boundaries, will be forced split using quadtree (QT) until the right-bottom sample of the leaf node is located within the slice/picture boundary. The forced QT partition or partitioning does not need to be signalled in the bitstream because both encoder and decoder, e.g., both video encoder 20 and video decoder 30, know when to apply forced QT. The purpose of forced partition is to make the boundary CTU/CU possible by the video encoder 20/video decoder 30.

International patent publication number WO 2016/090568 discloses a QTBT (quadtree plus binary tree) structure, and also in VTM 1.0, the boundary CTU/CU forced partitioning process is inherited from HEVC. That means the CTU/CU located on the frame boundary is forced partitioned by a quadtree (QT) structure without considering rate-distortion (RD) optimization until the whole current CU lies inside the picture boundary. These forced partitions are not signalled in the bitstream.

Figure 17A:
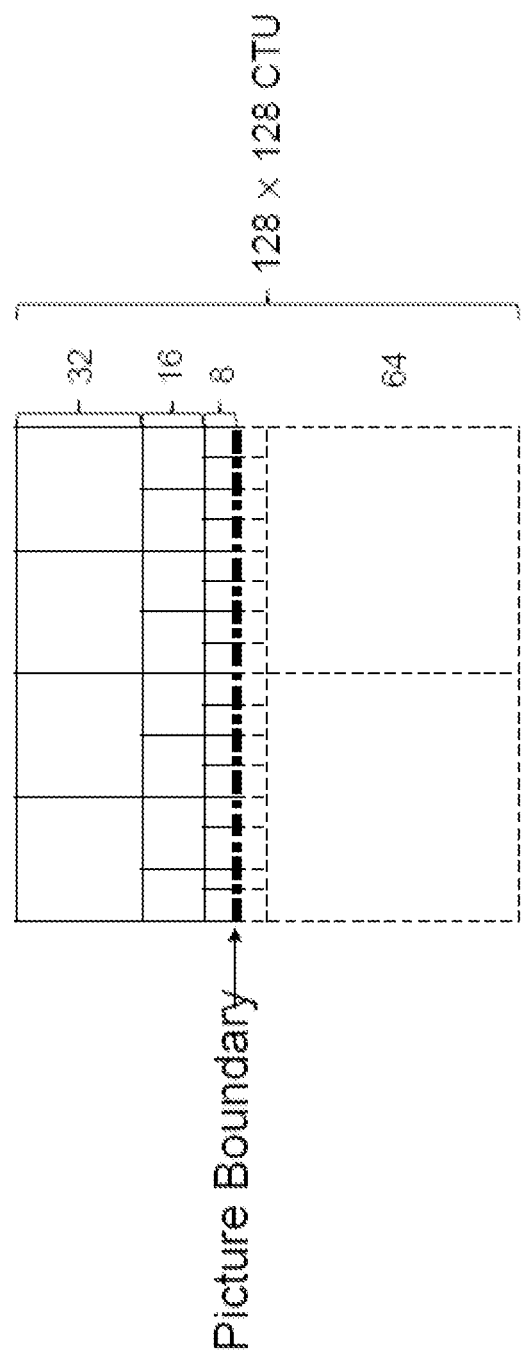
FIG. 17A shows an HD (1920×1080) bottom boundary CTU (128×128) forced QT partition.

FIG. 17A shows a forced partition example for a high definition (HD) (1920×1080 pixels) bottom boundary CTU (128×128) partitioned by forced QT. In FIG. 17A, the HD picture has or is 1920×1080 pixels, and the CTU has or is 128×128 pixels.

Figure 18:
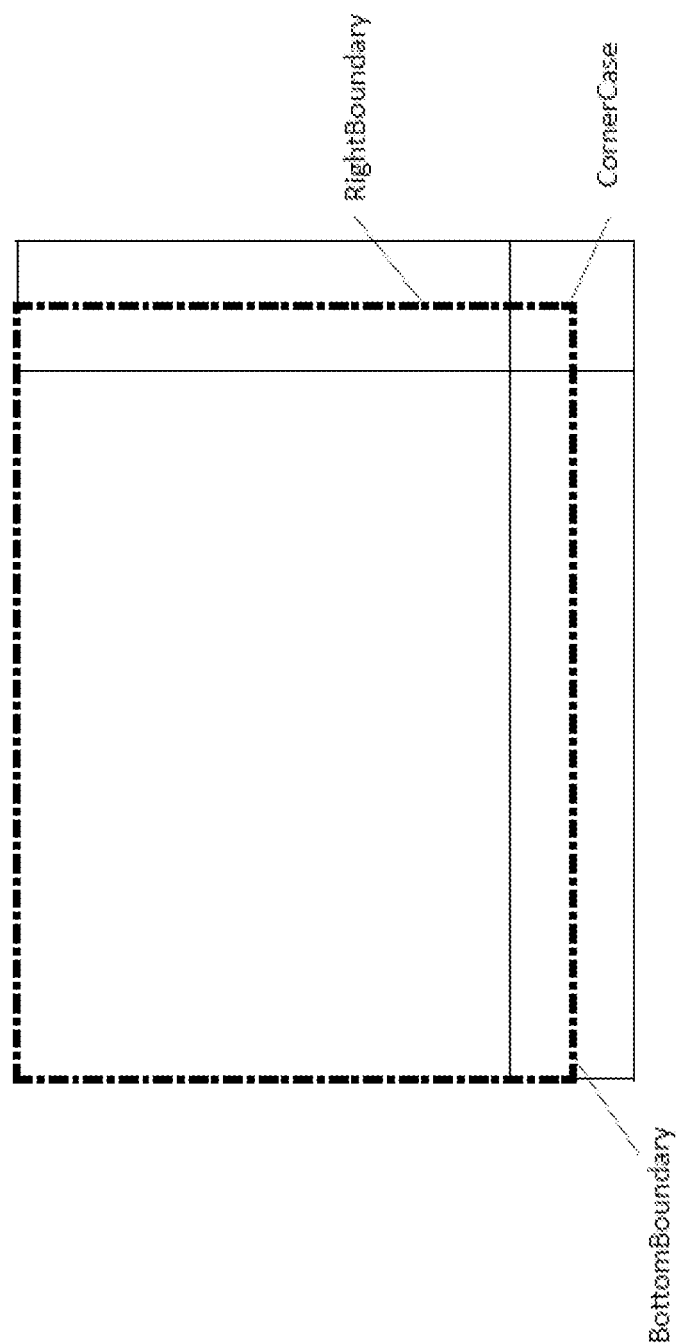
FIG. 18 shows an example boundary definition.

In SubCE2 (picture boundary handling) of CE1 (partitioning) at the San Diego meeting (04.2018) [JVET-J1021], 15 tests were proposed for picture boundary handling using BT, TT, or ABT (Asymmetric BT). In JVET-K0280 and JVET-K0376 for instance, the boundary is defined as shown in FIG. 18. FIG. 18 shows the borders of a picture by dot-hashed lines and areas of boundary cases in straight lines, namely a bottom boundary case, a corner boundary case and a right boundary case. A bottom boundary can be partitioned by horizontal forced BT or forced QT, a right boundary can be partitioned by vertical forced BT or forced QT, and a corner case can only be split by forced QT, wherein the decision whether to use any of the forced BT or forced QT partitioning is based on a rate distortion optimization criterion and is signalled in the bitstream. Forced partitioning means the block must be partitioned, e.g., forced partitioning is applied to boundary blocks which may not be coded using "no-split" as shown in FIG. 16A.

If the forced QT split is used in a forced boundary partitioning, the partitioning constraint of MinQTSize is ignored. For example, in FIG. 19A, if the MinQTSize is signalled as 32 in the SPS, to match the boundary with a forced QT method, a QT split down to a block size 8×8 would be necessary, which ignores the constraint of MinQTSize being 32.

According to embodiments of the disclosure, if the forced QT is used for picture boundary partitioning, the forced QT split obeys (e.g., does not ignore) a splitting constraint as signalled, for example, in an SPS. If further forced splitting is necessary, only forced BT is used, which may in combination also be referred to as forced QTBT. In embodiments of the disclosure, e.g., the partition constraint MinQTSize is considered for the forced QT partitioning at picture boundaries and no additional signalling for the forced BT partitioning is required. Embodiments also allow harmonizing the partitioning for normal (non-boundary) blocks and boundary blocks. For example, in conventional solutions, two "MinQTSize" parameters are required, one for normal block partitioning and another one for boundary block partitioning. Embodiments only require one common "MinQTSize" parameter for both, normal block and boundary block partitioning, which may be flexibly set between encoder and decoder, e.g., by signalling one "MinQTSize" parameter. Furthermore, embodiments require less partitions than, e.g., forced QT.

Solutions for bottom boundary case and right boundary case.

In the bottom and right boundary case, if the block size is larger than MinQTSize, then the partition mode for picture boundary partitioning can be selected between forced BT partitioning and forced QT partitioning, e.g., based on RDO (rate-distortion optimization). Otherwise (i.e., if the block size is equal or smaller than the MinQTSize), only forced BT partitioning is used for picture boundary partitioning, more specifically, horizontal forced BT is used for a bottom boundary respectively for a boundary block located on the bottom boundary of a picture, and vertical forced BT is used for a right boundary respectively a for boundary block located on the right boundary of a picture.

The forced BT partitioning may comprise recursively partitioning the current block by a horizontal forced boundary partitioning until a sub-partition of the current block is located at the bottom boundary of the picture and recursively partitioning the sub-partition by a vertical forced boundary partitioning until a leaf node is entirely located at the right boundary of the picture. Alternatively, the forced BT partitioning may comprise recursively partitioning the current block by a vertical forced boundary partitioning until a sub-partition of the current block is located at the bottom boundary and recursively partitioning the sub-partition by a horizontal forced boundary partitioning until a leaf node is entirely located at the right boundary. MinQTSize may be applied also for controlling partitioning of a non-boundary block.

For instance, in the case shown in FIG. 17A, if the MinQTSize is, or is limited as, 32 while the size of a rectangular (non-square) block of height or width of 8 samples is needed to match the picture boundary, forced BT partitioning will be used for partitioning the 32×32 boundary located block. The BT partitions may be further partitioned using forced BT partitioning of the same type, e.g., in case forced vertical BT partitioning has been applied only further forced vertical BT partitioning is applied, and in case forced horizontal BT partitioning has been applied only further forced horizontal BT partitioning is applied. The forced BT portioning is continued until the leaf node is entirely within the picture.

Figure 17B:
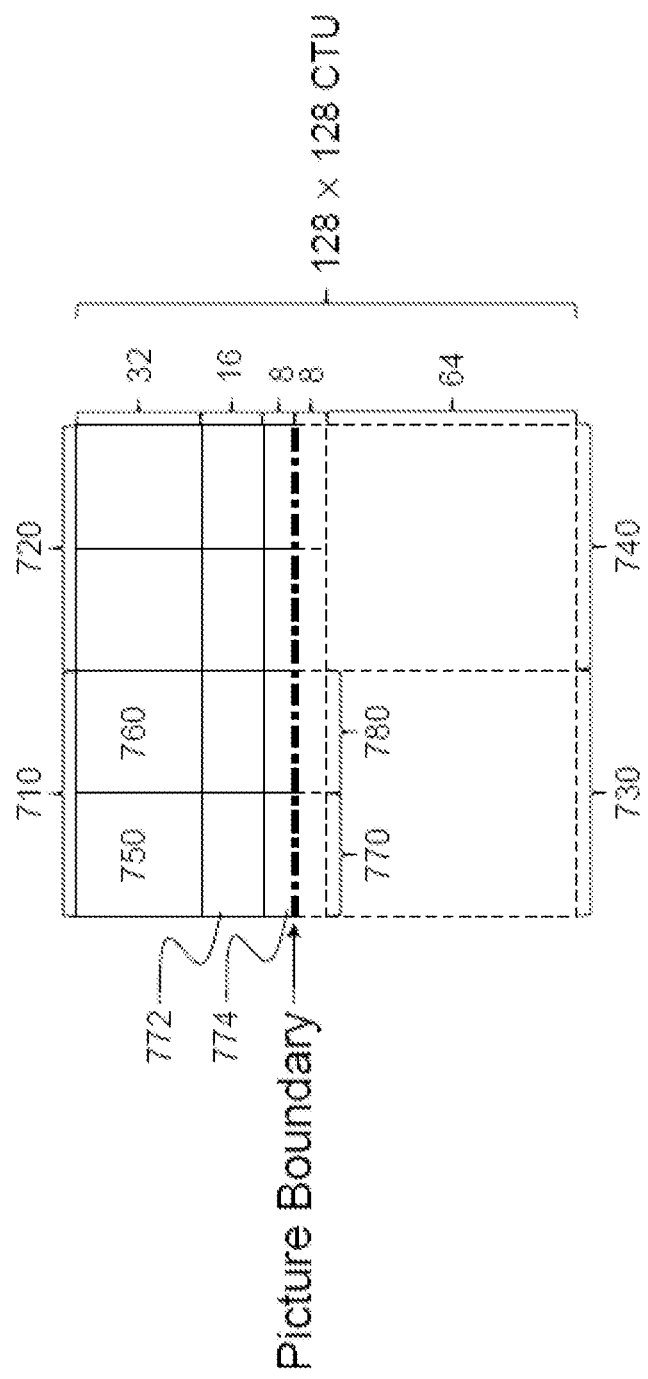
FIG. 17B shows an HD (1920×1080) bottom boundary CTU (128×128) forced BT partition according to an embodiment of the disclosure.

FIG. 17B shows an exemplary partitioning of a bottom boundary CTU with a size of 128×128 samples according to an embodiment of the disclosure. The bottom boundary CTU, which forms a root block or root node of a partitioning tree, is partitioned into smaller partitions, e.g., smaller blocks of square or rectangular size. These smaller partitions or blocks may be further partitioned into even smaller partitions or blocks. In FIG. 17B, the CTU is first quad-tree partitioned into four square blocks 710, 720, 730 and 740, each having a size of 64×64 samples. Of these blocks, blocks 710 and 720 are again bottom boundary blocks, whereas blocks 730 and 740 are outside of the picture (respectively are located outside of the picture) and are not processed.

Block 710 is further partitioned using quad-tree partitioning into four square blocks 750, 760, 770, and 780, each having a size of 32×32 samples. Blocks 750 and 760 are located inside of the picture, whereas blocks 770 and 780 again form bottom boundary blocks. As the size of block 770 is not larger than MinQTSize, which is for example 32, recursive horizontal forced binary partitioning is applied to block 770 until a leaf node is entirely within or located entirely inside the picture, e.g., until a leaf node block 772, a rectangular non-square block having 32×16 samples is within the picture (after one horizontal binary partitioning), or leaf node block 774, a rectangular non-square block located at the bottom boundary of the picture and having 32×8 samples is within the picture (after two horizontal binary partitionings). The same applies for block 780.

Embodiments of the disclosure allow harmonizing the partitioning for normal blocks located completely inside the picture and partitioning of boundary blocks. Boundary blocks are blocks which are not completely inside the picture and not completely outside of the picture. Put differently, boundary blocks are blocks that comprise a part that is located within the picture and a part that is located outside the picture. Furthermore, embodiments of the disclosure allow reducing the signalling as the forced BT partitioning at or below MinQTSize does not need to be signalled.

Solutions for corner case.

In the corner case, some approaches allow only a forced QT split, which also ignores the constraint of MinQTSize. Embodiments of the disclosure provide two solutions for the corner case. A corner case occurs when the currently processed block is at the corner of the picture. This is the case if the current block is crossed by or adjacent to two picture boundaries (vertical and horizontal).

Figure 20:
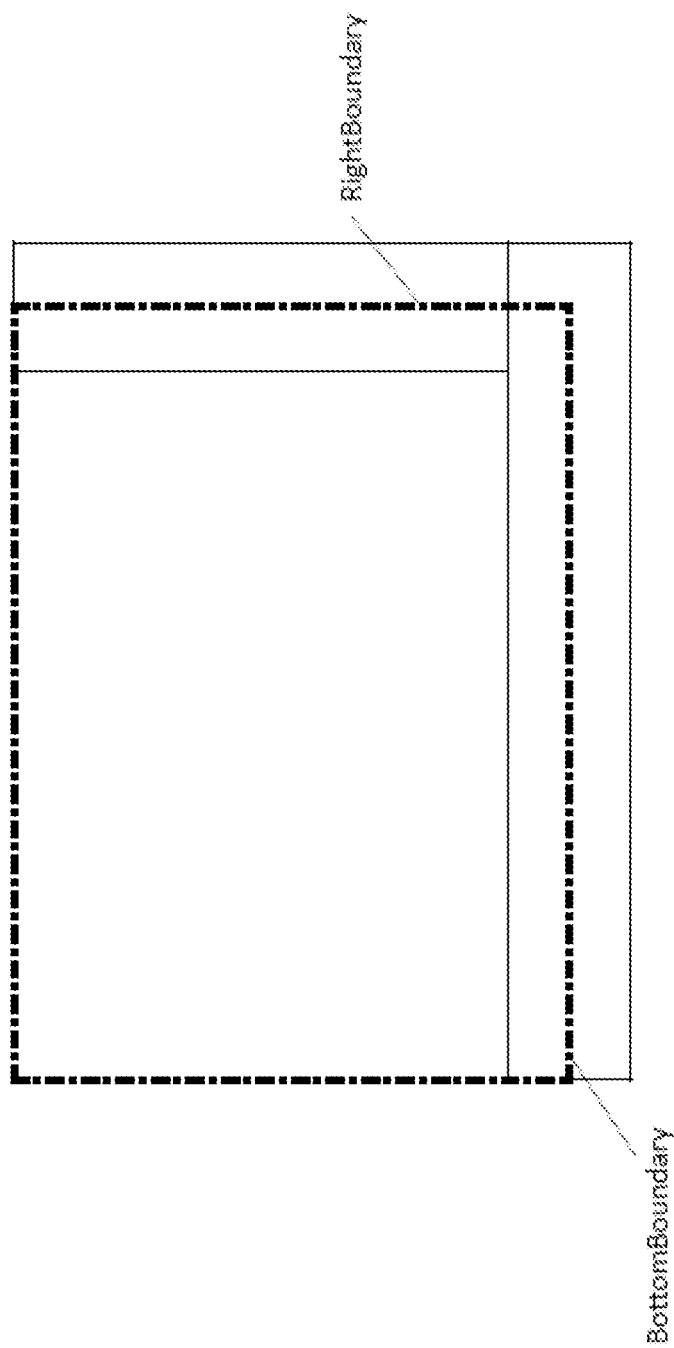
FIG. 20 shows an embodiment of a boundary definition.

Solution 1:

The corner case is considered as a bottom boundary case or a right boundary case. FIG. 20 shows an embodiment of a boundary definition. FIG. 20 shows the borders of a picture by dot-hashed lines and areas of boundary cases in straight lines. As shown, the corner case is defined as a bottom boundary case. Thus, the solution is the same as described for the bottom boundary case and right boundary case above. In other words, first a horizontal partitioning is applied (as described for the bottom boundary case) until the blocks or partitions are entirely within the picture (in vertical direction), and then a vertical partitioning is applied (as described for the right boundary case) until the leaf nodes are entirely within the picture (in horizontal direction).

Solution 2:

The definition of the boundary cases is still kept as is. If forced QT is constrained by MinQTSize (current block size equal or smaller then MinQTSize), use horizontal forced BT to match the bottom boundary, when the bottom boundary matches, use vertical forced BT to match the right boundary.

Figure 19A:
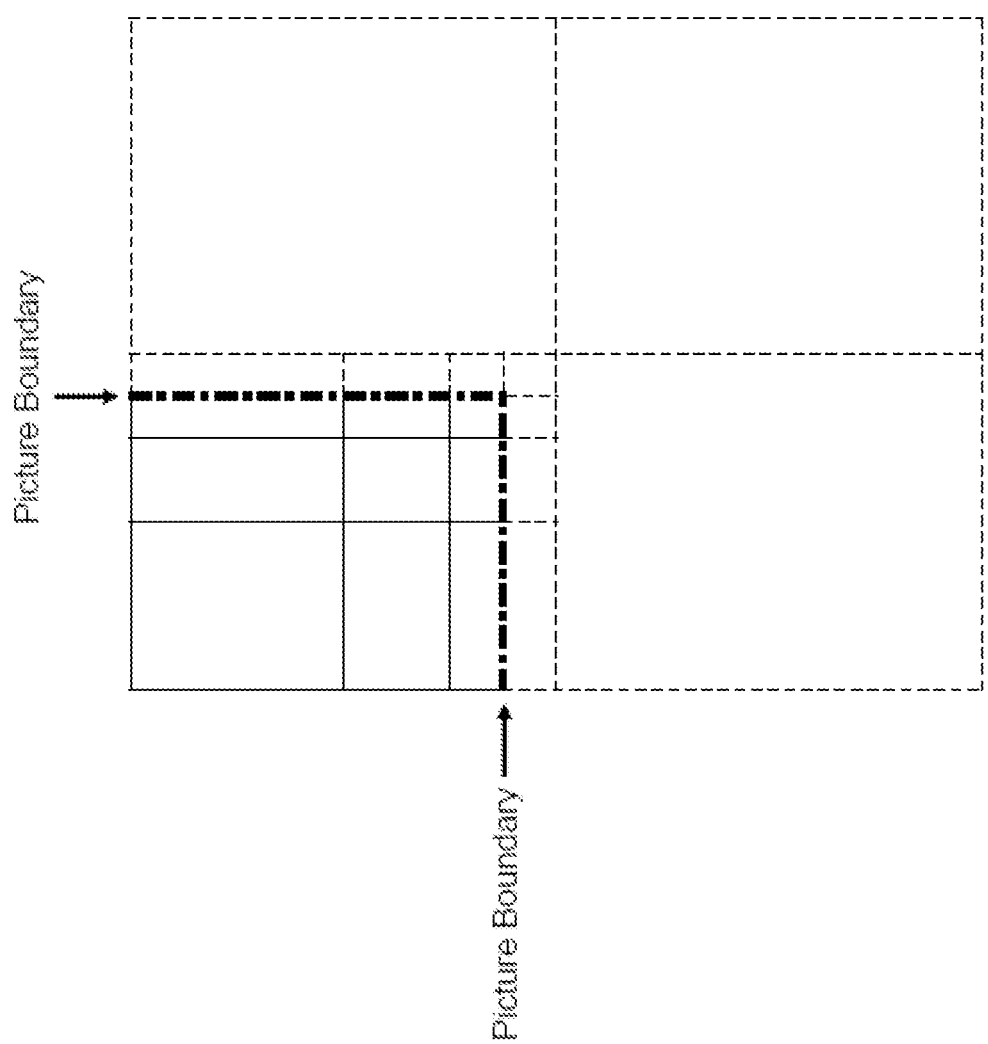
FIG. 19A shows an example of a corner case forced QTBT partition according to an embodiment of the disclosure.
Figure 19B:
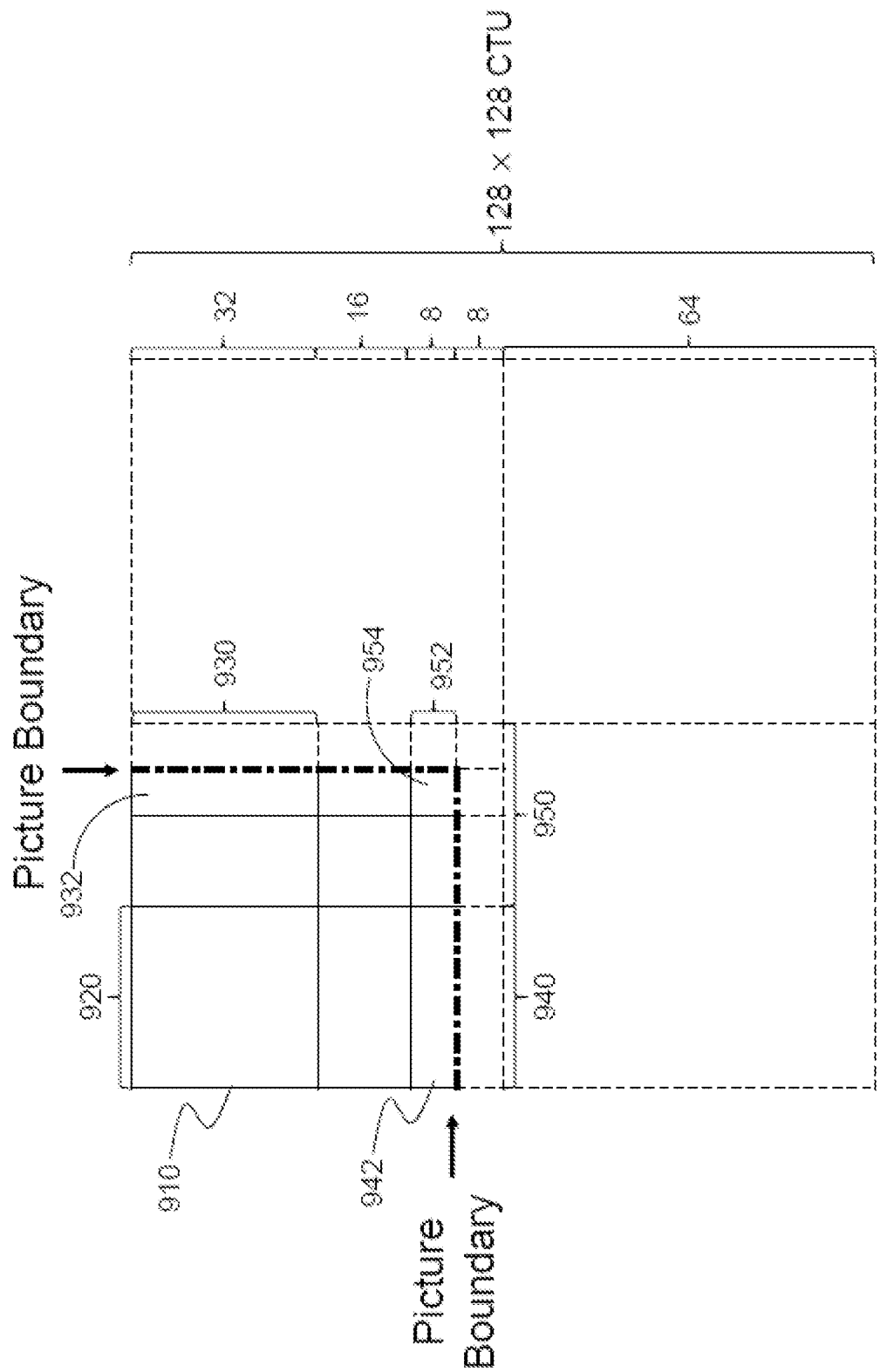
FIG. 19B shows an example of a forced QTBT partition for a block located at a corner according to an embodiment of the disclosure.

For example, in FIG. 19A, which shows an embodiment of a forced QTBT for a block located at a corner of a picture, if MinQTSize is, or is limited as, 32 for the corner case forced QT partition, further BT partition will be used after the partition of the 32×32 block until the forced partition is terminated.

FIG. 9B shows further details of an exemplary partitioning of a boundary CTU at or in a corner of a picture according to an embodiment of the disclosure, wherein the CTU has a size of 128×128 samples. The CTU is first quad-tree partitioned into four square blocks, each having a size of 64×64 samples. Of these blocks, only the top-left block 910 is a boundary block, whereas the other three are located outside (entirely outside) of the picture and are not further processed. Block 910 is further partitioned using quad-tree partitioning into four square blocks 920, 930, 940 and 950, each having a size of 32×32 samples. Block 920 is located inside of the picture, whereas blocks 930, 940 and 950 again form boundary blocks. As the size of these blocks 930, 940 and 950 is not larger than MinQTSize, which is 32, forced binary partitioning is applied to blocks 930, 940 and 950.

Block 930 is located on a right boundary and partitioned using recursive vertical forced binary partitioning until a leaf node is within the picture, e.g., block 932 located at the right boundary of the picture (here after two vertical binary partitionings).

Block 940 is located on a bottom boundary and partitioned using recursive horizontal forced binary partitioning until a leaf node is within the picture, e.g., block 942 located at the right boundary of the picture (here after two horizontal binary partitionings).

Block 950 is located at a corner boundary and is partitioned using first recursive horizontal forced binary partitioning until a sub-partition or block, here block 952, is located at a bottom boundary of the picture (here after two horizontal binary partitionings) and then recursive partitioning the sub-partition by a vertical forced boundary partitioning until a leaf node or block, e.g., block 954, is located at the right boundary of the picture (here after two vertical binary partitionings), or respectively, until a leaf node is located inside the picture.

The approaches above may be applied to both decoding and encoding. For decoding, MinQTSize may be received via an SPS. For encoding, MinQTSize may be transmitted via an SPS. Embodiments may use boundary definitions as shown in FIG. 18 or FIG. 20, or other boundary definitions.

Further embodiments of the present disclosure are provided in the following. It should be noted that the numbering used in the following section does not necessarily need to comply with the numbering used in the previous sections.

Embodiment 1: A partitioning method comprising:
determining whether the current block of a picture is a boundary block;
if the current block is a boundary block, determining whether the size of the current block is larger than a minimum allowed quadtree leaf node size;
if the size of the current block is not larger than the minimum allowed quadtree leaf node size, applying forced binary tree partitioning to the current block.

Embodiment 2: The partitioning method of embodiment 1, wherein the forced binary tree partitioning is a recursive horizontal forced binary partitioning in case the current block is located on a bottom boundary of the picture, or is a recursive vertical forced boundary partitioning in case the current block is located on a right boundary of the picture.

Embodiment 3: The partitioning method of embodiment 1 or 2, wherein the forced binary partitioning comprises recursively partitioning the current block by a horizontal forced boundary partitioning until a sub-partition of the current block is located directly at the bottom boundary of the picture, and recursively partitioning the sub-partition by a vertical forced boundary partitioning until a leaf node is entirely located directly at the right boundary of picture, or vice versa.

Embodiment 4: The partitioning method of any of embodiments 1 to 3, wherein the minimum allowed quadtree leaf node size is a minimum allowed quadtree leaf node size also applied for controlling the partitioning of a non-boundary block.

Embodiment 5: A decoding method for decoding a block by partitioning the block according to the portioning method of any of embodiments 1 to 4.

Embodiment 6: The decoding method of embodiment 5, wherein the minimum allowed quadtree leaf node size is received via an SPS.

Embodiment 7: An encoding method for encoding a block by partitioning the block according to the portioning method of any of embodiments 1 to 4.

Embodiment 8: The encoding method of embodiment 7, wherein the minimum allowed quadtree leaf node size is transmitted via an SPS.

Embodiment 9: A decoding device, comprising a logic circuitry configured to perform any one of the methods of embodiment 5 or 6.

Embodiment 10: An encoding device, comprising a logic circuitry configured to perform any one of the method of embodiment 7 or 8.

Embodiment 11: A non-transitory storage medium for storing instructions when executed by a processor cause the processor to perform any of the methods according to embodiments 1 to 8.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which correspond to a tangible medium such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code, or data structures for implementation of the techniques described in this disclosure. A computer program product may include a computer-readable medium.

By way of example and not limitation, such computer-readable storage media can comprise RAM, ROM, electrically-erasable programmable read-only memory (EEPROM), CD-ROM, or other optical disk storage, magnetic disk storage, other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

An apparatus comprises a memory element; and a processor element coupled to the memory element and configured to determine whether a current block of a picture is a boundary block, determine, when the current block is a boundary block, whether a size of the current block is larger than a minimum allowed quadtree (QT) leaf node size (MinQTSize), and apply, when the size of the current block is not larger than MinQTSize, forced binary tree (BT) partitioning to the current block.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Embodiments of the present application (or the present disclosure) provide apparatuses and methods for encoding and decoding.

A first aspect relates to a partitioning method comprising determining whether a current block of a picture is a boundary block and whether the size of the current block is larger than a minimum allowed quadtree leaf node size; and if the current block is the boundary block and the size of the current block is not larger than the minimum allowed quadtree leaf node size (MinQTSize), applying forced binary tree (BT) partitioning to the current block.

In a first implementation form of the method according to the first aspect as such, the forced binary tree partitioning is a recursive horizontal forced binary partitioning in case the current block is located on a bottom boundary of the picture or a recursive vertical forced boundary partitioning in case the current block is located on a right boundary of the picture.

In a second implementation form of the method according to the first aspect as such or any preceding implementation form of the first aspect, the forced binary tree partitioning is continued until a leaf node block is within the picture.

In a third implementation form of the method according to the first aspect as such or any preceding implementation form of the first aspect, the forced binary partitioning comprises recursively partitioning the current block by a horizontal forced boundary partitioning until a sub-partition of the current block is located at the bottom boundary of the picture; and recursively partitioning the sub-partition by a vertical forced boundary partitioning until a leaf node is entirely located at the right boundary of the picture.

In a fourth implementation form of the method according to the first aspect as such or any preceding implementation form of the first aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fifth implementation form of the method according to the first aspect as such or any preceding implementation form of the first aspect, the method further comprises applying the minimum allowed quadtree leaf node size for controlling a partitioning of a non-boundary block.

In a sixth implementation form of the method according to the first aspect as such or any preceding implementation form of the first aspect, the boundary block is a block which is not completely inside the picture and not completely outside the picture.

A second aspect relates to a decoding method for decoding a block by partitioning the block according to the first aspect as such or any preceding implementation form of the first aspect.

In a first implementation form of the method according to the second aspect as such, the method further comprises receiving the minimum allowed quadtree leaf node size via a sequence parameter set (SPS).

A third aspect relates to an encoding method for encoding a block by partitioning the block according to the first aspect as such or any preceding implementation form of the first aspect.

In a first implementation form of the method according to the third aspect as such, the method further comprises transmitting the minimum allowed quadtree leaf node size via a sequence parameter set (SPS).

A fourth aspect relates to a decoding device comprising logic circuitry configured to decode a block by partitioning the block according to the partitioning method of the first aspect as such or any preceding implementation form of the first aspect.

In a first implementation form of the decoding device according to the fourth aspect as such, the logic circuitry is further configured to receive the minimum allowed quadtree leaf node size via a sequence parameter set (SPS).

A fifth aspect relates to an encoding device comprising logic circuitry configured to encode a block by partitioning the block according to the partitioning method of the first aspect as such or any preceding implementation form of the first aspect.

In a first implementation form of the decoding device according to the fifth aspect as such, the logic circuitry is further configured to transmit the minimum allowed quadtree leaf node size via a sequence parameter set (SPS).

A sixth aspect relates to a non-transitory storage medium for storing instructions that when executed by a processor cause a processor to perform any of the first, second, or third aspect as such or any preceding implementation form of the first, second, or third aspect.

A seventh aspect relates to a method comprising making a determination that a current block of a picture is a boundary block and that a size of the current block is less than or equal to a minimum allowed quadtree (QT) leaf node size (MinQTSize); and applying, in response to the determination, forced binary tree (BT) partitioning to the current block.

In a first implementation form of the method according to the seventh aspect as such, the current block is located on a bottom boundary of the picture, and wherein the forced BT partitioning is a recursive horizontal forced BT partitioning.

In a second implementation form of the method according to the seventh aspect as such or any preceding implementation form of the seventh aspect, the current block is located on a right boundary of the picture, and wherein the forced BT partitioning is a recursive vertical forced BT partitioning.

In a third implementation form of the method according to the seventh aspect as such or any preceding implementation form of the seventh aspect, the forced BT partitioning comprises recursively partitioning the current block by a horizontal forced boundary partitioning until a sub-partition of the current block is located at the bottom boundary; and recursively partitioning the sub-partition by a vertical forced boundary partitioning until a leaf node is entirely located at the right boundary.

In a fourth implementation form of the method according to the seventh aspect as such or any preceding implementation form of the seventh aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fifth implementation form of the method according to the seventh aspect as such or any preceding implementation form of the seventh aspect, the method further comprises applying MinQTSize for controlling partitioning of a non-boundary block.

In a sixth implementation form of the method according to the seventh aspect as such or any preceding implementation form of the seventh aspect, the method further comprises receiving MinQTSize via a sequence parameter set (SPS).

In a seventh implementation form of the method according to the seventh aspect as such or any preceding implementation form of the seventh aspect, the method further comprises transmitting MinQTSize via a sequence parameter set (SPS).

An eighth aspect relates to an apparatus comprising a memory; and a processor coupled to the memory and configured to determine whether a current block of a picture is a boundary block, determine, when the current block is a boundary block, whether a size of the current block is larger than a minimum allowed quadtree (QT) leaf node size (MinQTSize), and apply, when the size of the current block is not larger than MinQTSize, forced binary tree (BT) partitioning to the current block.

In a first implementation form of the apparatus according to the eighth aspect as such, the forced BT partitioning is a recursive horizontal forced BT partitioning when the current block is located on a bottom boundary of the picture or a recursive vertical forced BT partitioning when the current block is located on a right boundary of the picture.

In a second implementation form of the apparatus according to the eighth aspect as such or any preceding implementation form of the eighth aspect, the forced BT partitioning comprises recursively partitioning the current block by a horizontal forced boundary partitioning until a sub-partition of the current block is located at the bottom boundary; and recursively partitioning the sub-partition by a vertical forced boundary partitioning until a leaf node is entirely located at the right boundary.

In a third implementation form of the apparatus according to the eighth aspect as such or any preceding implementation form of the eighth aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fourth implementation form of the apparatus according to the eighth aspect as such or any preceding implementation form of the eighth aspect, the processor is further configured to apply MinQTSize for controlling partitioning of a non-boundary block.

In a fifth implementation form of the apparatus according to the eighth aspect as such or any preceding implementation form of the eighth aspect, the apparatus further comprises a receiver coupled to the processor and configured to receive MinQTSize via a sequence parameter set (SPS).

In a sixth implementation form of the apparatus according to the eighth aspect as such or any preceding implementation form of the eighth aspect, the apparatus further comprises a transmitter coupled to the processor and configured to transmit MinQTSize via a sequence parameter set (SPS).

A ninth aspect relates to a computer program product comprising computer executable instructions stored on a non-transitory medium that when executed by a processor cause an apparatus to determine whether a current block of a picture is a boundary block; determine, when the current block is a boundary block, whether a size of the current block is larger than a minimum allowed quadtree (QT) leaf node size (MinQTSize); and apply, when the size of the current block 0 is not larger than MinQTSize, forced binary tree (BT) partitioning to the current block.

In a first implementation form of the apparatus according to the eighth aspect as such, the forced BT partitioning is a recursive horizontal forced BT partitioning when the current block is located on a bottom boundary of the picture or a recursive vertical forced BT partitioning when the current block is located on a right boundary of the picture.

In a second implementation form of the apparatus according to the ninth aspect as such or any preceding implementation form of the ninth aspect, the forced BT partitioning comprises recursively partitioning the current block by a horizontal forced boundary partitioning until a sub-partition of the current block is located at the bottom boundary; and recursively partitioning the sub-partition by a vertical forced boundary partitioning until a leaf node is entirely located at the right boundary.

In a third implementation form of the apparatus according to the ninth aspect as such or any preceding implementation form of the ninth aspect, the forced BT partitioning comprises recursively partitioning the current block by a vertical forced boundary partitioning until a sub-partition of the current block is located at the bottom boundary; and recursively partitioning the sub-partition by a horizontal forced boundary partitioning until a leaf node is entirely located at the right boundary.

In a fourth implementation form of the apparatus according to the ninth aspect as such or any preceding implementation form of the ninth aspect, the instructions further cause the apparatus to apply MinQTSize for controlling partitioning of a non-boundary block.

In a fifth implementation form of the apparatus according to the ninth aspect as such or any preceding implementation form of the ninth aspect, the instructions further cause the apparatus to receive MinQTSize via a sequence parameter set (SPS).

In a sixth implementation form of the apparatus according to the ninth aspect as such or any preceding implementation form of the ninth aspect, the instructions further cause the apparatus to transmit MinQTSize via a sequence parameter set (SPS).

Embodiments Regarding Relation Between the
Partition Constraints for Non_Boundary and
Boundary Blocks Next Generation Video Coding (NGVC) removes the separation of the CU, PU and TU concepts, and supports more flexibility for CU partition shapes. A size of the CU corresponds to a size of the coding node and may be square or non-square (e.g., rectangular) in shape.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC. In HEVC, inter prediction for small blocks is restricted to reduce the memory access of motion compensation, and inter prediction is not supported for 4×4 blocks. In the QTBT of the JEM, these restrictions are removed.

In the QTBT, a CU can have either a square or rectangular shape. As shown in FIG. 21, a coding tree unit (CTU) is first partitioned by a quadtree structure. The quadtree leaf nodes can be further partitioned by a binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different colour components, e.g., one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
CTU size: the root node size of a quadtree, the same concept as in HEVC
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one example of the QTBT partitioning structure, when the quadtree node has size equal to or smaller than MinQTSize, no further quadtree splitting is considered. It will not be further split by the binary tree since the size (MinQTSize) exceeds the MaxBTSize. Otherwise, the leaf quadtree node could be further partitioned by the binary tree. Therefore, the quadtree leaf node is also the root node for the binary tree and it has the binary tree depth as 0 (zero). When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

FIG. 21 illustrates an example of a block 2130 (e.g., a CTB) partitioned using QTBT partitioning techniques. As shown in FIG. 21, using QTBT partition techniques, each of the blocks is split symmetrically through the center of each block. FIG. 22 illustrates the tree structure corresponding to the block partitioning of FIG. 21. The solid lines in FIG. 22 indicate quad-tree splitting and dotted lines indicate binary-tree splitting. In one example, in each splitting (i.e., non-leaf) node of the binary-tree, a syntax element (e.g., a flag) is signalled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

As shown in FIG. 22, at node 50, block 2130 (corresponding to root 50) is split into the four blocks 2131, 2132, 2133, and 2134, shown in FIG. 21, using QT partitioning. Block 2134 is not further split, and is therefore a leaf node. At node 52, block 2131 is further split into two blocks using BT partitioning. As shown in FIG. 22, node 52 is marked with a 1, indicating vertical splitting. As such, the splitting at node 52 results in block 2137 and the block including both blocks 2135 and 2136. Blocks 2135 and 2136 are created by a further vertical splitting at node 54. At node 56, block 2132 is further split into two blocks 2138 and 2139 using BT partitioning.

At node 58, block 2133 is split into 4 equal size blocks using QT partitioning. Blocks 2143 and 2144 are created from this QT partitioning and are not further split. At node 60, the upper left block is first split using vertical binary-tree splitting resulting in block 2140 and a right vertical block. The right vertical block is then split using horizontal binary-tree splitting into blocks 2141 and 2142. The lower right block created from the quad-tree splitting at node 58, is split at node 62 using horizontal binary-tree splitting into blocks 2145 and 2146. As shown in FIG. 22, node 62 is marked with a 0, indicating horizontal splitting.

In addition to QTBT, a block partitioning structure named multi-type-tree (MTT) is proposed to replace BT in QTBT based CU structures, that means a CTU may be split by QT partitioning firstly to obtain a block of the CTU, and then the block may be split by MTT partitioning secondly.

The MTT partitioning structure is still a recursive tree structure. In MTT, multiple different partition structures (e.g., two or more) are used. For example, according to the MTT techniques, two or more different partition structures may be used for each respective non-leaf node of a tree structure, at each depth of the tree structure. The depth of a node in a tree structure may refer to the length of the path (e.g., the number of splits) from the node to the root of the tree structure.

In MTT, there are two partition types, BT partitioning and ternary-tree (TT) partitioning. Partition type can be selected from BT partitioning and TT partitioning. The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric ternary-tree, vertical even/uniform symmetric ternary-tree, horizontal uneven/non-uniform symmetric ternary-tree, vertical uneven/non-uniform symmetric ternary-tree, horizontal uneven/non-uniform asymmetric ternary-tree, or vertical uneven/non-uniform asymmetric ternary-tree partition types.

In general, an uneven/non-uniform symmetric ternary-tree partition type is a partition type that is symmetric about a center line of the block, but where at least one of the resultant three blocks is not the same size as the other two. One preferred example is where the side blocks are ¼ the size of the block, and the center block is ½ the size of the block. An even/uniform symmetric ternary-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric ternary-tree partition type is a partition type that is not symmetric about a center line of the block, and where at least one of the resultant blocks is not the same size as the other two.

Figure 23:
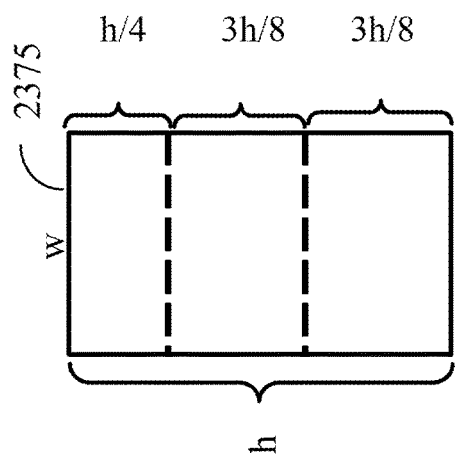
FIG. 23 is an illustrative diagram of an example of horizontal ternary-tree partition types.
Figure 24:
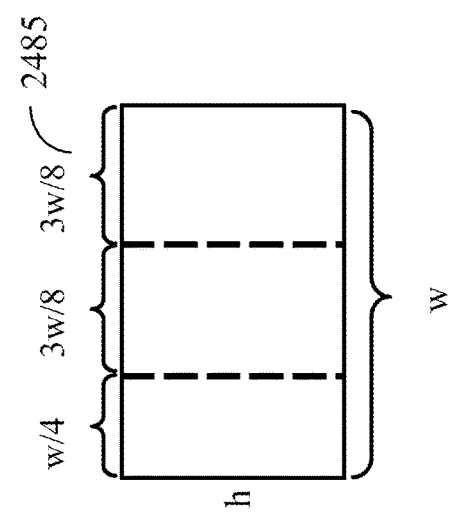
FIG. 24 is an illustrative diagram of an example of vertical ternary-tree partition types.

FIG. 23 is a conceptual diagram illustrating optional example horizontal ternary-tree partition types. FIG. 24 is a conceptual diagram illustrating optional example vertical ternary-tree partition types. In both FIG. 23 and FIG. 24, h represents the height of the block in luma or chroma samples and w represents the width of the block in luma or chroma samples. Note that the respective center line of a block do not represent the boundary of the block (i.e., the ternary-tree partitions do not split a block through the center line). Rather, the center line are used to depict whether or not a particular partition type is symmetric or asymmetric relative to the center line of the original block. The center line are also along the direction of the split.

As shown in FIG. 23, block 2371 is partitioned with a horizontal even/uniform symmetric partition type. The horizontal even/uniform symmetric partition type produces symmetrical top and bottom halves relative to the center line of block 2371. The horizontal even/uniform symmetric partition type produces three sub-blocks of equal size, each with a height of h/3 and a width of w. The horizontal even/uniform symmetric partition type is possible when the height of block 2371 is evenly divisible by 3.

Block 2373 is partitioned with a horizontal uneven/non-uniform symmetric partition type. The horizontal uneven/non-uniform symmetric partition type produces symmetrical top and bottom halves relative to the center line of block 2373. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Block 2375 is partitioned with a horizontal uneven/non-uniform asymmetric partition type. The horizontal uneven/non-uniform asymmetric partition type does not produce a symmetrical top and bottom half relative to the center line of block 2375 (i.e., the top and bottom halves are asymmetric). In the example of FIG. 23, the horizontal uneven/non-uniform asymmetric partition type produces a top block with height of h/4, a center block with height of 3h/8, and a bottom block with a height of 3h/8. Of course, other asymmetric arrangements may be used.

As shown in FIG. 24, block 2481 is partitioned with a vertical even/uniform symmetric partition type. The vertical even/uniform symmetric partition type produces symmetrical left and right halves relative to the center line of block 2481. The vertical even/uniform symmetric partition type produces three sub-blocks of equal size, each with a width of w/3 and a height of h. The vertical even/uniform symmetric partition type is possible when the width of block 2481 is evenly divisible by 3.

Block 2483 is partitioned with a vertical uneven/non-uniform symmetric partition type. The vertical uneven/non-uniform symmetric partition type produces symmetrical left and right halves relative to the center line of block 2483. The vertical uneven/non-uniform symmetric partition type produces symmetrical left and right halves relative to the center line of 2483. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Block 2485 is partitioned with a vertical uneven/non-uniform asymmetric partition type. The vertical uneven/non-uniform asymmetric partition type does not produce a symmetrical left and right half relative to the center line of block 2485 (i.e., the left and right halves are asymmetric). In the example of FIG. 24, the vertical uneven/non-uniform asymmetric partition type produces a left block with width of w/4, a center block with width of 3w/8, and a right block with a width of 3w/8. Of course, other asymmetric arrangements may be used.

In addition (or alternatively) to the parameters for QTBT defined above, the following parameters are defined for the MTT partitioning scheme.

MaxBTSize: the maximum allowed binary tree root node size

MinBtSize: the minimum allowed binary tree root node size

MaxMttDepth: the maximum multi-type tree depth

MaxMttDepth offset: the maximum multi-type tree depth offset

MaxTtSize: the maximum allowed ternary tree root node size

MinTtSize: the minimum allowed ternary tree root node size

MinCbSize: the minimum allowed coding block size

The embodiments of the disclosure, may be implemented by a video encoder or a video decoder, such as video encoder 20 of FIG. 12 or video decoder 30 of FIG. 13, in accordance with an embodiment of the present application. One or more structural elements of video encoder 20 or video decoder 30, including partition unit, may be configured to perform the techniques of embodiments of the disclosure.

In an embodiments of the disclosure:

In JVET-K1001-v4, log2_ctu_size_minus2, log2_min_qt_size_intra_slices_minus2 and log2_min_qt_size_inter_slices_minus2 are signalled in SPS (as syntax elements).

Parameter log2_ctu_size_minus2 plus 2 specifies the luma coding tree block size of each CTU. In particular:

$$CtbLog2SizeY = log2\_ctu\_size\_minus2 + 2 \qquad (7\text{-}5)$$

$$CtbSizeY = 1 << CtbLog2SizeY \qquad (7\text{-}6)$$

In other words, CtbLog2SizeY specifies the log 2 value of the CTU size CtbSizeY, corresponding to the coding tree block (CTB) size for luma (Y).

Further settings are provided as follows:

$$MinCbLog2SizeY = 2 \qquad (7\text{-}7)$$

$$MinCbSizeY = 1 << MinCbLog2SizeY \qquad (7\text{-}8)$$

$$MinTbSizeY = 4 \qquad (7\text{-}9)$$

$$MaxTbSizeY = 64 \qquad (7\text{-}10)$$

Parameter log2_min_qt_size_intra_slices_minus2 plus 2 specifies the minimum luma size of a leaf block resulting from quadtree splitting of a CTU in slices with slice_type equal to 2 (I), i.e., intra slices. The value of log2_min_qt_size_intra_slices_minus2 shall be in the range of 0 to CtbLog2SizeY−2, inclusive.

MinQtLog2SizeIntraY=log2_mm_qt_size_intra_slices_minus2(7-22)

Parameter log2_min_qt_size_inter_slices_minus2 plus 2 specifies the minimum luma size of a leaf block resulting from quadtree splitting of a CTU in slices with slice_type equal to 0 (B) or 1 (P), i.e., inter slices. The value of log2_min_qt_size_inter_slices_minus2 shall be in the range of 0 to CtbLog2SizeY−2, inclusive.

MinQtLog2SizeInterY=log2_mm_qt_size_inter_slices_minus2(7-23)

The MinQtSizeY is defined in (7-30), which means the minimum allowed quadtree split size in luma sample. If the coding block size is smaller than or equal to MinQtSizeY, quadtree split is not allowed. Further settings are provided as follows:

MinQtLog2SizeY=(slice_type==I)?MinQtLog2SizeIntraY MinQtLog2SizeInterY  (7-25)

MaxBtLog2SizeY=CtbLog2SizeY−log2_diff_ctu_max_bt_size  (7-26)

MinBtLog2SizeY=MinCbLog2SizeY  (7-27)

MaxTtLog2SizeY=(slice_type==I)?5:6  (7-28)

MinTtLog2SizeY=MinCbLog2SizeY  (7-29)

MinQtSizeY=1<<MinQtLog2SizeY  (7-30)

MaxBtSizeY=1<<MaxBtLog2SizeY  (7-31)

MinBtSizeY=1<<MinBtLog2SizeY  (7-32)

MaxTtSizeY=1<<MaxTtLog2SizeY  (7-33)

MinTtSizeY=1<<MinTtLog2SizeY  (7-34)

MaxMttDepth=(slice_type==I)?max_mtt_hierarchy_depth_intra_slices:max_mtt_hierarchy_depth_inter_slices  (7-35)

Parameters max_mtt_hierarchy_depth_intra_slices and max_mtt_hierarchy_depth_inter_slices denote the maximum hierarchy depth for MTT-type splitting for intra and inter slices, respectively.

Based on the semantic of log2_min_qt_size_intra_slices_minus2 and log2_min_qt_size_inter_slices_minus2, the ranges of log2_min_qt_size_intra_slices_minus2 and log2_mm_qt_size_inter_slices_minus2 are from 0 to CtbLog2SizeY−2

Here the CtbLog2SizeY is defined in the semantic of log2_ctu_size_minus2, which means the log 2 value of luma coding tree block size of each CTU, the CtbLog2SizeY in VTM2.0 is equal to 7.

Based on (7-22) and (7-23), the range of MinQtLog2SizeIntraY and MinQtLog2SizeInterY are from 2 to CtbLog2SizeY.

Based on (7-25), the range of MinQtLog2SizeY is from 2 to CtbLog2SizeY.

Based on (7-30), the range of MinQtSizeY, in JVET-K1001-v4, is from (1<<2) to (1<<CtbLog2SizeY), in VTM2.0 the range is from (1<<2) to (1<<7), which is equal to from 4 to 128.

In JVET-K1001-v4, log2_diff_ctu_max_bt_size is conditionally signalled in Slice header.

Parameter log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive.

When log2_diff_ctu_max_bt_size is not present, the value of log2_diff_ctu_max_bt_size is inferred to be equal to 2.

The MinCbLog2SizeY is defined in (7-7), which is meaning the minimum allowed coding block size.

Based on the semantic of log2_diff_ctu_max_bt_size, the range of log2_diff_ctu_max_bt_size is from 0 to CtbLog2SizeY−MinCbLog2SizeY.

Based on (7-26), the range of MaxBtLog2SizeY is from CtbLog2SizeY to MinCbLog2SizeY Based on (7-31), the range of MaxBtSizeY is from (1<<CtbLog2SizeY) to (1<<MinCbLog2SizeY).

Based on (7-7), the range of MaxBtSizeY, in JVET-K1001-v4, is from (1<<CtbLog2SizeY) to (1<<2), since in VTM2.0 CtbLog2SizeY is equal to 7, the range of MaxBtSizeY in VTM2.0 is equal to from 128 to 4.

Therefore, MinQtSizeY has the range from 4 to (1<<CtbLog2SizeY), in VTM2.0 from 4 to 128, MaxBtSizeY has the range from (1<<CtbLog2SizeY) to 4, in VTM2.0 from 128 to 4.

Accordingly, there is the possibility that MinQtSizeY is larger than MaxBtSizeY.

Moreover, based on current boundary handling in VVC 2.0, only QT and BT partitioning is allowed for boundary located blocks (not allowed TT, not allowed no splitting).

If the current coding block is located on the boundary, and the current coding block size cbSizeY fulfills the condition:
MinQtSizeY>cbSizeY>MaxBtSizeY,
there is neither QT nor BT split possible for the current coding block. Therefore, there is no available partition mode for the current block.

Embodiment 1

Solution (embodiments of the disclosure) of the above-mentioned issues, including the problem of boundary case are described below in more detail.

According to an embodiment, to solve the mentioned problem, the lower bound of MaxBtSizeY should be limited to MinQtSizeY, to make sure MaxBtSizeY is not smaller than MinQtSizeY. In particular, the lower bound of MaxBtSizeY may be equal to MinQtSizeY, so the range of MaxBtSizeY should be from (1<<CtbLog2SizeY) to (1<<MinQtLog2SizeY), so the range of MaxBtLog2SizeY should be from CtbLog2SizeY to MinQtLog2SizeY, so the range of log2_diff_ctu_max_bt_size should be from 0 to CtbLog2SizeY−MinQtLog2SizeY.

The corresponding change in the draft text (of the video standard) is in the semantic of log2_diff_ctu_max_bt_size as follow:

log2_diff_ctu_max_bt_size specifies the difference between the luma CTB size and the maximum luma size (width or height) of a coding block that can be split using a binary splitting. The value of log2_diff_ctu_max_bt_size shall be in the range of 0 to CtbLog2SizeY−MinQtLog2SizeY, inclusive. So information for MinQtSizeY may be used to determine the validity of MaxBtSizeY. In other words, MaxBtSizeY may be determined based on information for MinQtSizeY.

The corresponding method of coding implemented by a coding device (decoder or encoder) may be as following:

determining whether the current block of a picture is a boundary block;

determining whether the size of the current block is larger than a minimum allowed quadtree leaf node size;

if the current block is a boundary block and the size of the current block is not larger than the minimum allowed quadtree leaf node size, applying binary splitting to the current block; wherein the minimum allowed quadtree leaf node size is not larger than a maximum allowed binary tree root node size.

Wherein applying binary splitting to the current block may comprise applying forced binary splitting to the current block.

Wherein the current block may be obtained by dividing an image or a coding tree unit (CTU).

Wherein the method may comprise two cases: 1) treeType is equal to SINGLE_TREE or DUAL_TREE_LUMA; 2) treeType is equal to DUAL_TREE_CHROMA. For case 1), the current block is a luma block, and for case 2), the current block is a chroma block.

Wherein the maximum allowed binary tree root node size may be maximum luma size in luma samples of a luma coding root block to can be split using a binary tree splitting.

Wherein the maximum allowed ternary tree root node size may be a maximum luma size in luma samples of a luma coding root block to can be split using a ternary tree splitting.

Wherein the minimum allowed quadtree leaf node size may be a minimum luma size in luma samples of a luma leaf block resulting from quadtree splitting.

Herein, the coding corresponds to image, video or motion picture coding.

Being a boundary block means that the image/frame boundary cuts the block, or, in other words that the block is at the image/frame boundary. In the above embodiment binary splitting is applied to the current block if the current block is a boundary block (condition 1) and its size is not larger than the minimum allowed quadtree leaf node size (condition 2). It is noted that in some embodiments, ternary or other splitting may be used instead of the binary splitting. Moreover, in some embodiments, the binary splitting may be applied under condition 2 irrespectively of condition 1. In other words, condition 1 does not need to be evaluated. If the size of the current block is indeed larger than the minimum allowed quadtree leaf node size (i.e., condition 2 not fulfilled), the quadtree splitting may be applied.

It is noted that there are embodiments in which the binary splitting is used only for the boundary blocks (condition 1). For non-boundary blocks, the quadtree splitting may be the only splitting used. Applying binary (or ternary) splitting at the boundary of image/frame provides an advantage of possibly more efficient splitting, e.g., horizontal binary/ternary partitions at the horizontal boundary and vertical binary/ternary partitions at the vertical boundary.

Another corresponding method of coding implemented by a coding device (decoder or encoder) may be as following: Determining whether the size of a boundary block is larger than a minimum allowed quadtree leaf node size. If the size of the boundary block is not larger than the minimum allowed quadtree leaf node size, the minimum allowed quadtree leaf node size is not larger than a maximum allowed binary tree root node size (e.g., by standard specification) and binary splitting is applied to the boundary block.

Optionally, boundary block may not comprises corner block. In other words, the corner block which is cut by both the vertical and the horizontal image/frame boundary, is not considered as boundary block for the purpose of the above-mentioned condition 1.

Embodiment 2

Other embodiments of the disclosure (combinable with the above-mentioned embodiments) are described below.

In JVET-K1001-v4, max_mtt_hierarchy_depth_inter_slices and max_mtt_hierarchy_depth_intra_slices is signalled in SPS. In other words, max_mtt_hierarchy_depth_inter_slicesandmax_mtt_hierarchy_depth_intra_slicesaresyntax elements, meaning that their value is included into the bitstream including also the encoded image or video.

In particular, max_mit_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 0 to CtbLog2SizeY−MinTbLog2SizeY, inclusive.

The syntax element max_mt_hierarchy_depth_intra_slices specifies the maximum hierarchy depth for coding units resulting from multi-type tree splitting of a quadtree leaf in slices with slice_type equal to 2 (I). The value of max_mt_hierarchy_depth_intra_slices shall be in the range of 0 to CtbLog2SizeY−MinTbLog2SizeY, inclusive.

The syntax element MinTbSizeY is defined in (7-9), which is fixed as 4, therefore MinTbLog2SizeY=log 2 MinTbSizeY which is fixed as 2.

The syntax element MaxMttDepth is defined which means the maximum allowed depth of Multi-type tree partition. If the current multi-type tree partition depth greater than or equal to MaxMttDepth, Multi-type tree partition is not allowed (applied).

Based on the semantic of max_mtt_hierarchy_depth_inter_slices and max_mt_hierarchy_depth_intra_slices, the range of max_mtt_hierarchy_depth_inter_slices and max_mtthierarchy_depth_intra_slices is from 0 to CtbLog2SizeY−MinTbLog2SizeY.

Based on (7-35), the range of MaxMttDepth is from 0 to CtbLog2SizeY−MinTbLog2SizeY. Since in VTM2.0 CtbLog2SizeY is equal to 7, the range of MaxMttDepth is from 0 to 5.

Therefore, MaxMttDepth has the range from 0 to CtbLog2SizeY−MinTbLog2SizeY, in VTM2.0 from 0 to 5

Based on current boundary handling in VVC 2.0, only QT and BT partitioning is allowed for a boundary located block (not allowed TT, not allowed no splitting).

If the first problem mentioned above is solved (MaxBtSizeY>=MinQtSizeY), still the following condition is fulfiled:

cbSizeY<=MinQtSizeY

MaxMttDepth=0

There is no enough levels of BT (in general any MTT, including TT) partitions for the boundary handling.

For example, MinQtSizeY is equal to 16, MinTbSizeY is equal to 4, MaxMttDepth is 0.

If a boundary block with cbSizeY=16, and the parent partition is QT, and this block is still located on the boundary, no further partition can be performed, because the Mttdepth of current block is reached MaxMttDepth.

Solution (an Embodiment of the Disclosure) of this problem of boundary case: to solve the mentioned problem, the lower bound of MaxMttDepth should be limited to 1 (in other words, cannot take value of zero), to make sure after QT partition, there are enough levels of multi-type tree partition for boundary case. Or, even further, the lower bound of MaxMttDepth should be limited to (MinQtLog2SizeY−MinTbLog2SizeY), to make sure that after QT partitioning, there are enough levels of multi-type tree partitions for both boundary and non-boundary case.

The corresponding change in the (standard) draft text is in the semantic of max_mtt_hierarchy_depth_inter_slices and max_mtt_hierarchy_depth_intra_slices as follows:

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of 1 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of 1 to CtbLog2SizeY−MinTbLog2SizeY, inclusive.

or, max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of MinQtLog2SizeY−MinTbLog2SizeY to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mt_hierarchy_depth_intra_slices shall be in the range of MinQtLog2SizeY−MinTbLog2SizeY to CtbLog2SizeY−MinTbLog2SizeY, inclusive.

The corresponding method of coding implemented by a coding device (decoder or encoder) may be as following:

Dividing an image into blocks, wherein the blocks comprising a boundary block; Applying binary splitting to the boundary block with a maximum boundary multi-type partition depth, wherein the maximum boundary multi-type partition depth is a sum of at least a maximum multi-type tree depth and a maximum multi-type tree depth offset, wherein the maximum multi-type tree depth is larger than 0. This embodiment may be combined with the EMBODIMENT 1 or may be applied without EMBODIMENT 1.

Optionally, the maximum multi-type tree depth is larger than 0 when applying the binary splitting to the boundary block.

Optionally, boundary block may not comprises corner block.

Embodiment 3

In another embodiment of the disclosure:
In JVET-K1001-v4, If MinQtSizeY>MaxBtSizeY and MinQtSizeY>MaxTtSizeY.

If cbSize=MinQtsizeY, the partition cannot reach the MinCbSizeY (MinTbSizeY and MinCbsizeY are fixed and equal to 4), because there is no possible partition mode available.

Solution of this problem of non-boundary case or boundary case: to solve the mentioned problem, the lower bound of MaxBtSizeY should be limited to MinQtSizeY, to make sure that MaxBtSizeY is not smaller than MinQtSizeY. Or, the lower bound of MaxTtSizeY should be limited to MinQtSizeY, to make sure that MaxTtSizeY is not smaller than MinQtSizeY.

The corresponding change in the draft text is in the semantic of log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinQtLog2SizeY, inclusive.

And/or, log2_min_qt_size_intra_slices_minus2 plus 2 specifies the minimum luma size of a leaf block resulting from quadtree splitting of a CTU in slices with slice_type equal to 2 (I). The value of log2_min_qt_size_intra_slices_minus2 shall be in the range of 0 to MaxTtLog2SizeY−2, inclusive.

log2_min_qt_size_inter_slices_minus2 plus 2 specifies the minimum luma size of a leaf block resulting from quadtree splitting of a CTU in slices with slice_type equal to 0 (B) or 1 (P). The value of log2_min_qt_size_ inter_slices_minus2 shall be in the range of 0 to MaxTtLog2SizeY−2, inclusive.

The corresponding method of coding implemented by a coding device (decoder or encoder) may be as following:

Determining whether the size of a current block is larger than a minimum allowed quadtree leaf node size;

If the size of the current block is not larger than the minimum allowed quadtree leaf node size, applying multi-type tree splitting to the current block;

Wherein the minimum allowed quadtree leaf node size is not larger than a maximum allowed binary tree root node size or the minimum allowed quadtree leaf node size is not larger than a maximum allowed ternary tree root node size.

Optionally, the minimum allowed quadtree leaf node size is not larger than a maximum allowed binary tree root node size and the minimum allowed quadtree leaf node size is not larger than a maximum allowed ternary tree root node size.

Optionally, the applying multi-type tree splitting to the current block comprising applying ternary splitting to the current block, or applying binary splitting to the current block.

Optionally, boundary block may not comprises corner block.

Embodiment 4

In another embodiments of the disclosure:
If MaxBtSizeY>=MinQtSizeY, MinQtSizeY>MinTbLog2SizeY and MaxMttDepth<(MinQtLog2SizeY−MinTbLog2SizeY), If cbSize=MinQtsizeY, the partition cannot reach the MinCbSizeY, because there are no enough levels of multi-type tree partition that are allowed.

Solution of this problem of non-boundary case or boundary case: To solve the mentioned problem, the lower bound of MaxMttDepth should be limited to (MinQtLog2SizeY-MinTbLog2SizeY), to make sure that after QT partition, there are enough levels of multi-type tree partition for both boundary and non-boundary case.

The corresponding change in the draft text is in the semantic of max_mtt_hierarchy_depth_inter_slices and max_mtt_hierarchy_depth_intra_slices as follow:

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices shall be in the range of MinQtLog2SizeY−MinTbLog2SizeY to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices shall be in the range of MinQtLog2SizeY−MinTbLog2SizeY to CtbLog2SizeY−MinTbLog2SizeY, inclusive.

The corresponding method of coding implemented by a coding device (decoder or encoder) may be as following:

Dividing an image into blocks;

Applying multi-type tree splitting to a block of the blocks with a final maximum multi-type tree depth, wherein the final maximum multi-type tree depth is a sum of at least a maximum multi-type tree depth and a maximum multi-type tree depth offset, wherein the maximum multi-type tree depth is larger than or equal to subtraction of Log2 value of minimum allowed transform block size from Log2 value of minimum allowed quadtree leaf node size, or the maximum multi-type tree depth is larger than or equal to subtraction of Log2 value of minimum allowed coding block size from Log2 value of minimum allowed quadtree leaf node size.

Optionally, the block is a non-boundary block.

Optionally, the maximum multi-type tree depth offset is 0.

Optionally, the block is a boundary block and the multi-type tree splitting is binary splitting.

Optionally, the multi-type tree splitting is (or includes) ternary splitting.

Optionally, boundary block may not comprises corner block.

The embodiments 1 to 4 can be applied at the encoder side for partitioning the image/frame into coding units and for coding the coding units. The embodiments 1 to 4 can be applied at the decoder side for providing partitions of the image/frame, namely coding units and for decoding the coding units accordingly (e.g., parsing the coding units correctly from the stream and decoding them).

According to some embodiments, a decoder is provided, comprising one or more processors; and a non-transitory computer-readable storage medium coupled to the processors and storing programming for execution by the processors, wherein the programming, when executed by the processors, configures the decoder to carry out any of the methods described above with reference to embodiments 1 to 4.

Moreover, an encoder is provided, comprising one or more processors; and a non-transitory computer-readable storage medium coupled to the processors and storing programming for execution by the processors, wherein the programming, when executed by the processors, configures the encoder to carry out any of the methods described above with reference to embodiments 1 to 4.

In summary, a method is provided for coding implemented by a decoding device, the method comprising: determining whether the size of a current block is larger than a minimum allowed quadtree leaf node size; if the size of the current block is not larger than the minimum allowed quadtree leaf node size, applying multi-type tree splitting to the current block; wherein the minimum allowed quadtree leaf node size is not larger than a maximum allowed binary tree root node size or the minimum allowed quadtree leaf node size is not larger than a maximum allowed ternary tree root node size.

This approach facilitates efficient splitting and signalling of the splitting parameters for image/video blocks.

Moreover, in some implementations, the method also comprises the steps of determining whether the current block of a picture is a boundary block. If the current block is a boundary block and the size of the current block is not larger than the minimum allowed quadtree leaf node size, the method also includes applying binary splitting to the current block. It is noted that in this case, the minimum allowed quadtree leaf node size is not larger than a maximum allowed binary tree root node size. For example, if the size of the current block is not larger than the minimum allowed quadtree leaf node size, the above mentioned applying multi-type tree splitting to the current block comprises applying binary splitting to the current block, if the current block is a boundary block and the size of the current block is not larger than the minimum allowed quadtree leaf node size.

Provision of the binary splitting may be particularly advantageous for the blocks at the image/video frame boundary, e.g., for blocks which are cut by the boundary. Thus, in some implementations, it may be beneficial to apply the approach for the boundary blocks and not to apply it for the remaining blocks. However, the present disclosure is not limited thereto and, as mentioned above, the approach of applying binary splitting for the greater splitting depth may also be applied for non-boundary blocks and signalled efficiently.

In addition or alternatively to the above-mentioned embodiments, the minimum allowed quadtree leaf node size is not larger than a maximum allowed binary tree root node size and the minimum allowed quadtree leaf node size is not larger than a maximum allowed ternary tree root node size.

The applying of the multi-type tree splitting to the current block may comprise applying ternary splitting to the current block, or applying binary splitting to the current block. However, the present disclosure is not limited thereby and, in general, the multi-type tree splitting may also include further or other different kinds of splitting.

The method may further include determining the maximum allowed binary tree root node size based on the minimum allowed quadtree leaf node size. This facilitates efficient signaling/storage of the parameters. For example, the maximum allowed binary tree root node size may be deemed equal to the minimum allowed quadtree leaf node size. However, the present disclosure is not limited thereby and another relation may be assume to derive the maximum allowed binary tree root node size.

According to an exemplary embodiment, in addition or alternatively to the above-described embodiments, the method may comprise the steps of dividing an image into blocks, wherein the blocks comprise the current block. The applying binary splitting to the current block comprises applying binary splitting to the boundary block with a maximum boundary multi-type partition depth, wherein the maximum boundary multi-type partition depth is a sum of at least a maximum multi-type tree depth and a maximum multi-type tree depth offset, wherein the maximum multi-type tree depth is larger than 0. Moreover, in some implementations, the maximum multi-type tree depth is larger than 0 when applying the binary splitting to the boundary block.

According to an embodiment, the method includes dividing an image into blocks (the blocks comprising the current block). The applying multi-type tree splitting to the current block comprises applying multi-type tree splitting to the current block of the blocks with a final maximum multi-type tree depth, wherein the final maximum multi-type tree depth is a sum of at least a maximum multi-type tree depth and a maximum multi-type tree depth offset, wherein the maximum multi-type tree depth is larger than or equal to subtraction of Log2 value of minimum allowed transform block size from Log2 value of minimum allowed quadtree leaf node size, or the maximum multi-type tree depth is larger than or equal to subtraction of Log2 value of minimum allowed coding block size from Log2 value of minimum allowed quadtree leaf node size. This facilitates further splitting even for the greater partitioning depths.

The current block may be a non-boundary block. The maximum multi-type tree depth offset may be 0. The current block may be, alternatively or in addition, a boundary block and the multi-type tree splitting is binary splitting. The multi-type tree splitting may be or include ternary splitting.

According to an embodiment, an encoding method is provided, comprising the steps of: determining whether the size of a current block is larger than a minimum allowed quadtree leaf node size; if the size of the current block is not larger than the minimum allowed quadtree leaf node size, applying multi-type tree splitting to the current block; wherein the minimum allowed quadtree leaf node size is not larger than a maximum allowed binary tree root node size or the minimum allowed quadtree leaf node size is not larger than a maximum allowed ternary tree root node size.

The encoding method may apply any of the above-mentioned rules and constraints described with regard to the decoding method. Since the encoder side and the decoder side have to share the bitstream. In particular, encoding side generates the bitstream after coding the partitions resulting from the partitioning described above, while the decoding side parses the bitstream and reconstructs the decoded partitions accordingly. The same applies for the embodiments related to the encoding device (encoder) and decoding device (decoder) described in the following.

According to an embodiment, a decoding device is provided, comprising circuitry configured to: determine whether the size of a current block is larger than a minimum allowed quadtree leaf node size; if the size of the current block is not larger than the minimum allowed quadtree leaf node size, apply multi-type tree splitting to the current block; wherein the minimum allowed quadtree leaf node size is not larger than a maximum allowed binary tree root node size or the minimum allowed quadtree leaf node size is not larger than a maximum allowed ternary tree root node size. It is noted that the determining whether the size of a current block is larger than a minimum allowed quadtree leaf node size may be performed based on signaling in the bitstream at the decoding side.

Also provided is an encoding device which comprises circuitry configured to: determine whether the size of a current block is larger than a minimum allowed quadtree leaf node size; if the size of the current block is not larger than the minimum allowed quadtree leaf node size, apply multi-type tree splitting to the current block; wherein the minimum allowed quadtree leaf node size is not larger than a maximum allowed binary tree root node size or the minimum allowed quadtree leaf node size is not larger than a maximum allowed ternary tree root node size.

According to an embodiment, a non-transitory computer-readable storage medium is provided, storing programming for execution by a processing circuitry, wherein the programming, when executed by the processing circuitry, configures the processing circuitry to carry out any of the methods mentioned above.

The devices described in this disclosure may comprise processing circuitry for performing the various operations and methods described herein. The processing circuitry may comprise hardware and software. For example, the processing circuitry may comprise one or more processors and a non-volatile memory connected to the one or more processors. The memory may carry program code which, when executed by the one or more processors, causes the device to perform said operations or methods.

The disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Following is an explanation of the applications of the encoding method as well as the decoding method as shown in the above-mentioned embodiments, and a system using them.

Figure 27:
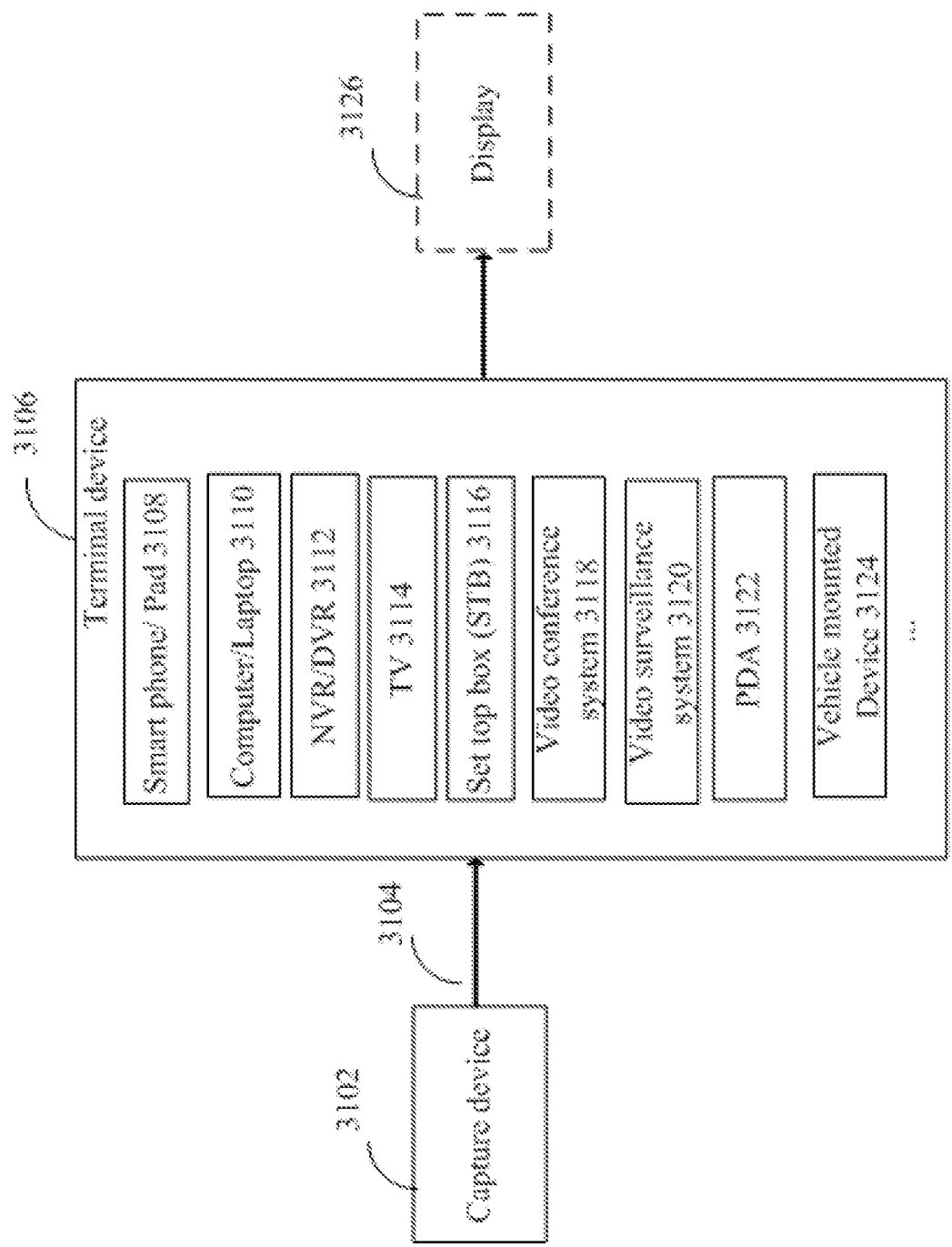
FIG. 27 is a block diagram showing an example structure of a content supply system 3100 which realizes a content delivery service.

FIG. 27 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 28:
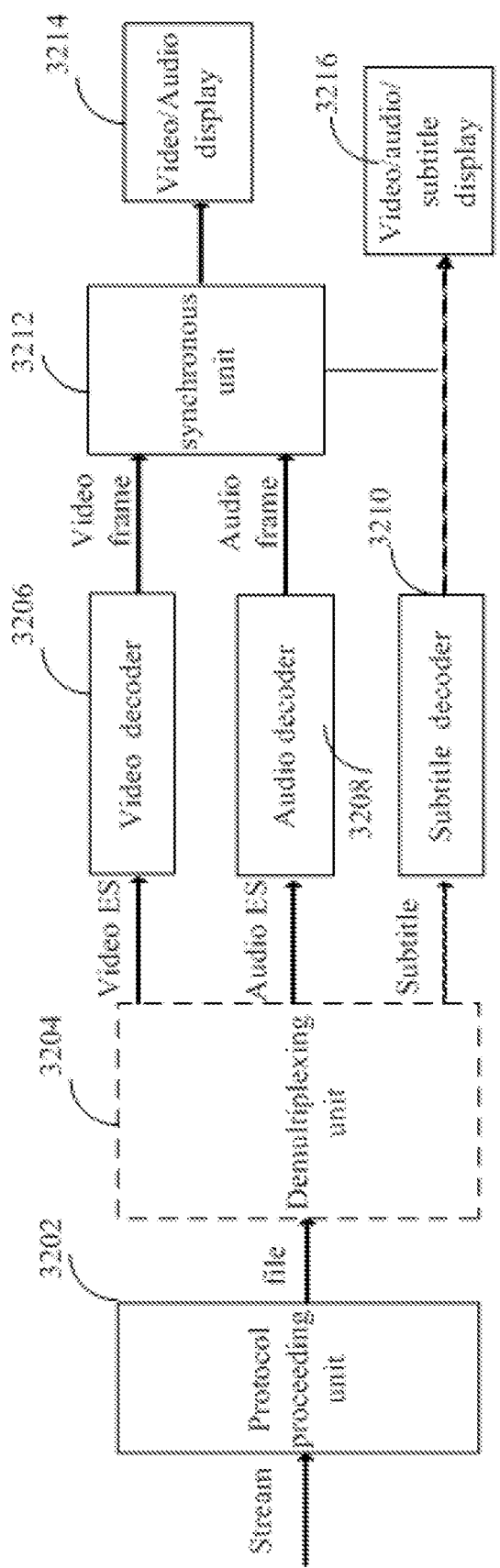
FIG. 28 is a block diagram showing a structure of an example of a terminal device.

FIG. 28 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 28) before feeding it to the synchronous unit 3212. Similarly, the audio frame may store in a buffer (not shown in FIG. 28) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitles are included in the bitstream, the subtitle decoder 3210 decodes the subtitles, and synchronizes the subtitles with the video frame and the audio frame, and supplies the video/audio/subtitles to a video/audio/subtitle display 3216.

The present disclosure is not limited to the above-mentioned system, and either the picture encoding device or the picture decoding device in the above-mentioned embodiments can be incorporated into other systems, for example, a car system.

Although embodiments of the disclosure have been primarily described based on video coding, it should be noted that embodiments of the coding system 40, encoder 20 and decoder 30 (and correspondingly the device 10) and the other embodiments described herein may also be configured for still picture processing or coding, i.e., the processing or coding of an individual picture independent of any preceding or consecutive picture as in video coding. In general only inter-prediction units 244 (encoder) and 344 (decoder) may not be available in case the picture processing coding is limited to a single picture 27. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The following logical operators or mathematical Operators are defined as follows:

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)

Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y x || y Boolean logical "or" of x and y

! Boolean logical "not"

x ? y:z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z  x takes on integer values starting from y to z, inclusive, with x, y, and z being integer numbers and z being greater than y.

Mathematical Functions

The following mathematical functions are defined:

$$\mathrm{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\mathrm{Atan2}(y, x) = \begin{cases} \mathrm{Atan}\left(\frac{y}{x}\right); & x > 0 \\ \mathrm{Atan}\left(\frac{y}{x}\right) + \pi; & x < 0 \;\&\&\; y >= 0 \\ \mathrm{Atan}\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil(x) the smallest integer greater than or equal to x.

Clip1$_Y$(x)=Clip3(0, (1<<BitDepth$_Y$)−1, x)

Clip1$_C$(x)=Clip3(0, (1<<BitDepth$_C$)−1, x)

$$\mathrm{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log2(x) the base-2 logarithm of x.

Log10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)
operations (with operands x, y, and z)

"x++", "x− −"

"!x", "−x" (as a unary prefix operator)

$x^y$

"$x*y$", "$x/y$", "$x \div y$", "$\frac{x}{y}$", "$x \% y$"

"x + y", "x − y" (as a two-argument operator), "

$\sum_{i=x}^{y} f(i)$"

TABLE-continued

Operation precedence from highest (at top of table) to lowest (at bottom of table)
operations (with operands x, y, and z)

"x << y", "x >> y"

"x < y ", "x <= y", "x > y", "x >= y"

"x = = y", "x != y"

"x & y"

"x | y"

"x && y"

"x || y"

"x ? y : z"

"x..y"

"x = y", "x += y", "x −= y"

Text Description of Logical Operations

In the text, a statement of logical operations as would be described mathematically in the following form:

if(condition 0)
        statement 0
    else if(condition 1)
        statement 1
    . . .
    else /* informative remark on remaining condition*/
        statement n may be described in the following manner:

. . . as follows/ . . . the following applies:
        If condition 0, statement 0
        Otherwise, if condition 1, statement 1
        . . .
        Otherwise (informative remark on remaining condition), statement n Each "If . . . Otherwise, if . . . Otherwise, . . . "statement in the text is introduced with" . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

if(condition 0a && condition 0b)
        statement 0
    else if(condition 1a||condition 1b)
        statement 1
    . . .
    else
        statement n may be described in the following manner:

. . . as follows/ . . . the following applies:
        If all of the following conditions are true, statement 0:
            condition 0a
            condition 0b
        Otherwise, if one or more of the following conditions are true, statement 1:
            condition 1a
            condition 1b
        . . .
        Otherwise, statement n In the text, a statement of logical operations as would be described mathematically in the following form:

if(condition 0)
        statement 0
    if(condition 1)
        statement 1 may be described in the following manner:
When condition 0, statement 0
When condition 1, statement 1

Definitions of Acronyms & Glossary

HEVC—High-Efficiency Video Coding
VVC—Versatile Video Coding
VTM—VVC Test Model
JEM—Joint Exploration Model
CTU—Coding Tree Unit
CU—Coding Unit
BT—Binary Tree
TT—Ternary Tree
QT—Quad Tree or Quaternary Tree
ABT—Asymmetric BT
MTT—Multi-type Tree
AMP—Asymmetric Partition
SH—Slice Header
SPS—Sequence Parameter Set
PPS—Picture Parameter Set
CE—Core Experiment
SubCE—SubCore Experiment (part of a Core Experiment)

What is claimed is:

1. A device for decoding or processing a video bitstream, the device comprising circuitry configured to:
   obtain, from the bitstream, a syntax element;
   obtain information for a minimum size in luma samples of a luma leaf block resulting from quadtree splitting; and
   determine a maximum size in luma samples of a luma root block where partitioning using binary tree splitting is allowed based on the information for the minimum size in luma samples of the luma leaf block resulting from quadtree splitting and the obtained syntax element;
   wherein the syntax element is a syntax element of a difference between the base 2 logarithm of the minimum size in luma samples of the luma leaf block resulting from quadtree splitting and the base 2 logarithm of the maximum size in luma samples of the luma root block where partitioning using binary tree splitting is allowed; or
   wherein the syntax element is a syntax element of a difference between the minimum size in luma samples of the luma leaf block resulting from quadtree splitting and the maximum size in luma samples of the luma root block where partitioning using binary tree splitting is allowed, wherein the syntax element of the difference is signaling said difference in logarithmic scale with base 2.

2. The device according to claim 1, wherein the circuitry is configured to determine the maximum size in luma samples of the luma root block where partitioning using binary tree splitting is allowed considering that its lower limit is the minimum size in luma samples of the luma leaf block resulting from quadtree splitting.

3. The device according to claims 1, wherein the circuitry is configured to obtain the syntax element from the bitstream dependent on a maximum hierarchy depth for coding units resulting from multi-type tree splitting.

4. The device according to claim 3, wherein the circuitry is configured to obtain the syntax element from the bitstream, responsive to determining that the maximum hierarchy depth for coding units resulting from multi-type tree splitting is not equal to zero.

5. A device for encoding or generating a video bitstream, the device comprising circuitry configured to:
   determine a minimum luma size of a leaf block resulting from quadtree splitting;
   determine a maximum luma size of a coding block where partitioning using binary tree splitting is allowed based on the minimum luma size of the leaf block resulting from quadtree splitting;
   include information for the determined minimum luma size of the leaf block resulting from quadtree splitting into the bitstream; and
   include into the bitstream:
   (i) a syntax element of a difference between the base 2 logarithm of the minimum luma size of the leaf block resulting from quadtree splitting and the base 2 logarithm of the maximum size in luma samples of the luma root block where partitioning using binary tree splitting is allowed, or
   (ii) a syntax element of the difference between the minimum luma size of the leaf block resulting from quadtree splitting and the maximum size in luma samples of the luma root block where partitioning using binary tree splitting is allowed, wherein the syntax element of the difference is signaling said difference in logarithmic scale with base 2.

6. The device according to claim 5, wherein the circuitry is further configured to:
   determine the maximum size in luma samples of the luma root block where partitioning using binary tree splitting is allowed considering that its lower limit is the minimum size in luma samples of the luma leaf block resulting from quadtree splitting.

7. The device according to claims 5, wherein the circuitry is further configured to:
   include the syntax element into the bitstream, dependent on a maximum hierarchy depth for coding units resulting from multi-type tree splitting.

8. The device according to claim 7, wherein the circuitry is further configured to:
   include the syntax element into the bitstream, responsive to determining that the maximum hierarchy depth for coding units resulting from multi-type tree splitting is not equal to zero.

9. A method for generating a video bitstream, the method comprising:
   determining a minimum luma size of a leaf block resulting from quadtree splitting;
   determining a maximum luma size of a coding block where partitioning using binary tree splitting is allowed, based on the minimum luma size of the leaf block resulting from quadtree splitting;
   including information for the determined minimum luma size of the leaf block resulting from quadtree splitting into the bitstream; and
   including into the bitstream:
   (i) a syntax element of a difference between the base 2 logarithm of the minimum luma size of the leaf block resulting from quadtree splitting and the base 2 logarithm of the maximum size in luma samples of the luma root block where partitioning using binary tree splitting is allowed, or
   (ii) a syntax element of the difference between the minimum luma size of the leaf block resulting from quadtree splitting and the maximum size in luma samples of the luma root block where partitioning using binary tree splitting is allowed, wherein the syntax element of the difference is signaling said difference in logarithmic scale with base 2.

10. A method for decoding or processing a video bitstream, the method comprising:
- obtaining, from the bitstream, a syntax element;
- obtaining information for a minimum size in luma samples of a luma leaf block resulting from quadtree splitting; and
- determining a maximum size in luma samples of a luma root block where partitioning using binary tree splitting is allowed, based on the minimum size in luma samples of the luma leaf block resulting from quadtree splitting and the syntax element
- wherein the syntax element is a syntax element of a difference between the base 2 logarithm of the minimum size in luma samples of the luma leaf block resulting from quadtree splitting and the base 2 logarithm of the maximum size in luma samples of the luma root block where partitioning using binary tree splitting is allowed; or wherein the syntax element is a syntax element of a difference between the minimum size in luma samples of the luma leaf block resulting from quadtree splitting and the maximum size in luma samples of the luma root block where partitioning using binary tree splitting is allowed, wherein the syntax element of the difference is signaling said difference in logarithmic scale with base 2.

11. A computer program product comprising program code for controlling a device to perform the method of claim 10 when the program code is executed by one or more processors of the device.

12. A computer program product comprising program code for controlling a device to perform the method of claim 9 when the program code is executed by one or more processors of the device.

* * * * *

UNITED STATES PATENT AND TRADEMARK OFFICE
CERTIFICATE OF CORRECTION

PATENT NO. : 11,477,494 B2
APPLICATION NO. : 17/169175
DATED : October 18, 2022
INVENTOR(S) : Gao et al.

It is certified that error appears in the above-identified patent and that said Letters Patent is hereby corrected as shown below:

In the Claims

Claim 3: Column 75, Line 57: "The device according to claims 1, wherein the circuitry" should read -- The device according to claim 1, wherein the circuitry --.

Claim 7: Column 76, Line 32: "The device according to claims 5, wherein the circuitry" should read -- The device according to claim 5, wherein the circuitry --.

Signed and Sealed this
Fourteenth Day of March, 2023

Katherine Kelly Vidal
*Director of the United States Patent and Trademark Office*